United States Patent [19]
Miyamoto et al.

[11] Patent Number: 6,002,888
[45] Date of Patent: *Dec. 14, 1999

[54] CAMERA HAVING MULTIPLE DISPLAY FUNCTIONS AND/OR A DATE IMPRINTING FUNCTION

[75] Inventors: Hidenori Miyamoto, Urayasu; Isao Soshi; Toshiyuki Nakamura, both of Tokyo; Seijiro Noda; Hiroshi Wakabayashi, both of Yokohama, all of Japan

[73] Assignee: Nikon Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/763,796

[22] Filed: Dec. 11, 1996

Related U.S. Application Data

[63] Continuation of application No. 08/588,226, Jan. 18, 1996, abandoned, which is a continuation of application No. 08/187,388, Jan. 27, 1994, abandoned.

[30] Foreign Application Priority Data

| Jan. 27, 1993 | [JP] | Japan | 5-031363 |
| Jan. 27, 1993 | [JP] | Japan | 5-031364 |
| Jan. 28, 1993 | [JP] | Japan | 5-012795 |
| Jan. 28, 1993 | [JP] | Japan | 5-012900 |
| Jan. 28, 1993 | [JP] | Japan | 5-012901 |

[51] Int. Cl.$^6$ .............................. G03B 1/66; G03B 17/36
[52] U.S. Cl. ........................................... 396/284; 396/287
[58] Field of Search ..................... 396/277, 279, 396/281, 284, 287–292, 301, 303

[56] References Cited

U.S. PATENT DOCUMENTS

| 4,219,265 | 8/1980 | Waaske . |
| 4,423,938 | 1/1984 | Tominaga ............................ 396/284 X |
| 4,999,665 | 3/1991 | Kuroda et al. . |
| 5,019,843 | 5/1991 | Ogawa et al. . |
| 5,019,846 | 5/1991 | Goto et al. . |
| 5,040,006 | 8/1991 | Matsumura et al. . |
| 5,060,006 | 10/1991 | Taniguchi et al. . |
| 5,103,250 | 4/1992 | Arifuku et al. . |
| 5,107,290 | 4/1992 | Ohsawa . |
| 5,119,119 | 6/1992 | Amano et al. . |
| 5,189,466 | 2/1993 | Yasukawa et al. ..................... 354/412 |
| 5,363,169 | 11/1994 | Ishida et al. ........................... 354/442 |

*Primary Examiner*—Howard B. Blankenship

[57] ABSTRACT

A camera having multiple display functions and/or a date imprinting function wherein the display can alternately switch between displaying the date and the film frame number. The frame number is displayed when winding blank film and the date is displayed at other times. The display also has an indicator which lights up or flashes to indicate the status of the camera power source. The display also shows the date and this date can be imprinted on film when a photograph is taken. The date can be imprinted whether or not the camera is in a date correction mode when the photograph is taken. A multiple function button is used to change photographic information shown on the display, wherein different functions correspond to different camera modes. Adequate safeguards are therefore provided by this camera to prevent accidental changing of information.

11 Claims, 39 Drawing Sheets

DATE MODE SWITCHING

PHOTOGRAPHIC MODE SWITCHING

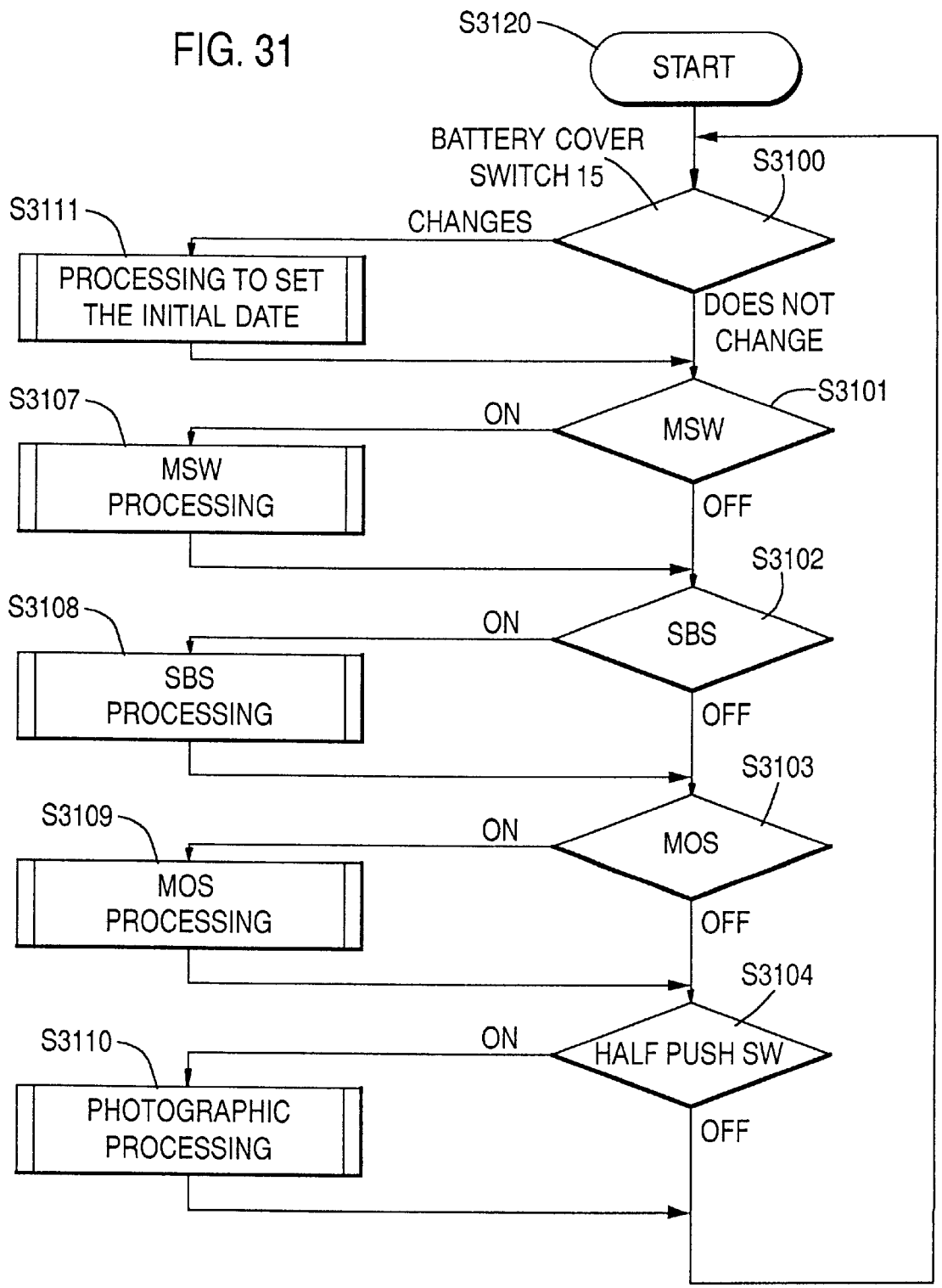

| FLASH MODE | DISPLAY |
|---|---|
| AUTOMATIC FLASH | AUTO ⚡ |
| RED EYE REDUCTION | AUTO ⚡ 👁 |
| FLASH PROHIBIT | ⊘⚡ |
| FORCED FLASH | ⚡ |
| SLOW SYNCRO | AUTO SLOW ⚡ |

| PHOTOGRAPHIC MODE | DISPLAY |
|---|---|
| FORCED INFINITY | ⛰ |
| SINGLE SELF | ⊙ |
| DOUBLE SELF | ⊙ ⊙ |

CAMERA HAVING MULTIPLE DISPLAY FUNCTIONS AND/OR A DATE IMPRINTING FUNCTION

This application is a continuation of application Ser. No. 08/588,226, filed Jan. 18, 1996, now abandoned, which is a continuation of application Ser. No. 08/187,388, now abandoned filed on Jan. 27, 1994.

BACKGROUND OF THE INVENTION

1. Field of the Invention

This invention relates to cameras, and more particularly, to cameras having multiple display functions and/or a date imprinting function.

2. Description of the Related Art

As camera technology progresses, cameras are provided with sophisticated displays, usually liquid crystal displays (LCD), for displaying information such as the photograph frame number, date and power source (battery) status.

However, an LCD which displays a large amount of information simultaneously can require a larger surface area, thereby increasing the size and cost of the camera.

In addition, complicated displays usually require numerous buttons corresponding to each type of information which can be displayed. For example, there is usually a separate button corresponding to a date mode and a separate button corresponding to the photographic mode. These numerous buttons increase the size, cost and complexity of a camera.

Furthermore, there are problems associated with displaying various types of information. For example, cameras which display the power source (battery) status typically display the status only when the camera main power source is switched ON. However, a photographer cannot confirm the status of the power source when the power source is OFF. Therefore, when the main power source is OFF, a photographer may not realize that the power source is weak. This can cause a serious problem when the photographer decides to use the camera in the future and the power source is not strong enough to allow proper camera operation.

Many cameras also display the date and provide a mechanism for imprinting the displayed date on film. This date imprinting function is very popular among amateur photographers. By comparison, professional photographers are more concerned with the quality of the photograph and do not desire a date imprinting function since professionals consider the function unnecessary while also introducing the possibility of reduced photograph quality due to improper imprinting. Therefore, a camera manufacturer normally must provides two models of the same basic camera in order to satisfy professional and amateur photographers.

In addition, cameras with a date imprinting function typically have a date correction mode for correcting the date. However, the date will not be imprinted if a photographer corrects the date in the date correction mode and then takes a photograph while forgetting to cancel the date correction mode.

SUMMARY OF THE INVENTION

Accordingly, it is an object of the present invention to provide a camera with a switchable display that alternately displays either the photograph frame number or the date, thereby reducing the size and cost of a display since the frame number and date do not have to be simultaneously displayed and separate LCD segments are not required for each type of information.

It is an advantage of the present invention to recognize that it is not necessary to display both the date and frame number at the same time. For example, the frame number is necessary while actually taking photographs and should, therefore, be displayed during that time. When no pictures are being taken, the frame number is not necessary and the date can be displayed.

It is also an object of the present invention to provide a switchable display that displays the frame number instead of the date when winding blank film at the beginning of a roll of film, thereby allowing a photographer to confirm that the film loading process if proceeding properly.

It is a further object of the present invention to display the frame number on a switchable display when a camera is executing blank feeding when the camera is in a non-photographic or "inactive" state, wherein the frame number can be displayed even if the back cover is open.

It is an additional object of the present invention to provide a power source status display which can be displayed when the power source is ON or OFF.

It is a further object to provide a single button having multiple modes corresponding to multiple functions and to provide safeguards so that the functions or modes are not accidentally changed or operated, for example, while a camera is being carried around in a camera carrying case or bag.

It is a still further object to provide a camera which can display the date and also imprint this date on film, wherein the date can be imprinted whether the camera is in or out of a date correction mode. Therefore, the date can be imprinted when a photograph is taken even if a photographer forgets to cancel the date correction mode or if the date correction mode is inadvertently activated.

It is also an object to provide a single camera body for use as a camera with a date imprinting function and for use as a camera without a date imprinting function, and therefore without the need for external add-on parts.

Additional objects and advantages of the invention will be set forth in part in the description which follows, and, in part, will be obvious from the description, or may be learned by practice of the invention.

The present invention relates to a camera comprising a display mechanism that switchably displays either the date or the frame number, a blank feed mechanism that feeds blanks of film, and a control mechanism that displays the frame number on the display mechanism when feeding blanks by the blank feed mechanism.

The invention also relates to a date imprinting mechanism for imprinting the date, the date imprinting mechanism capable of being enabled, a memory mechanism for storing data relating to the date imprinting mechanism, and a control mechanism for enabling the date imprinting function based on data stored in the memory mechanism.

The invention further relates to an imprinting mechanism for imprinting data, correction mechanism for correcting the data, the correction mechanism having a correction mode for use in correcting data, wherein the imprinting mechanism can imprint the data when the correction mechanism is in the correction mode and when the correction mechanism is not in the correction mode.

Furthermore, the invention relates to a detection mechanism to detect the status of a power source, a display mechanism to display information based on output from the detection mechanism, and a control mechanism for controlling the display mechanism so that the information is displayed irrespective of whether the camera is an active mode or an inactive mode.

In addition, an operational member is disclosed which is capable of changing a first type of information when the camera is in an active mode, and capable of changing a second type of information when the camera is in an inactive mode, and a control mechanism for controlling a changing of information so that, when the camera is in an active mode, the operational unit can change the first type of information but cannot change the second type of information and, when the camera is in an inactive mode, the operational unit changes the second type of information but cannot change the first type of information, wherein, when in the inactive mode, the operational unit must be operated to meet a predetermined condition before the second type of information is changed.

BRIEF DESCRIPTION OF THE DRAWINGS

These and other objects and advantages of the invention will become apparent and more readily appreciated from the following description of the preferred embodiments, taken in conjunction with the accompanying drawings which:

FIG. 31 is a flow chart of the overall operation of a further embodiment of a camera in accordance with the present invention based on the hardware system illustrated in FIG. 15.

DESCRIPTION OF THE PREFERRED EMBODIMENTS

Figure 1:
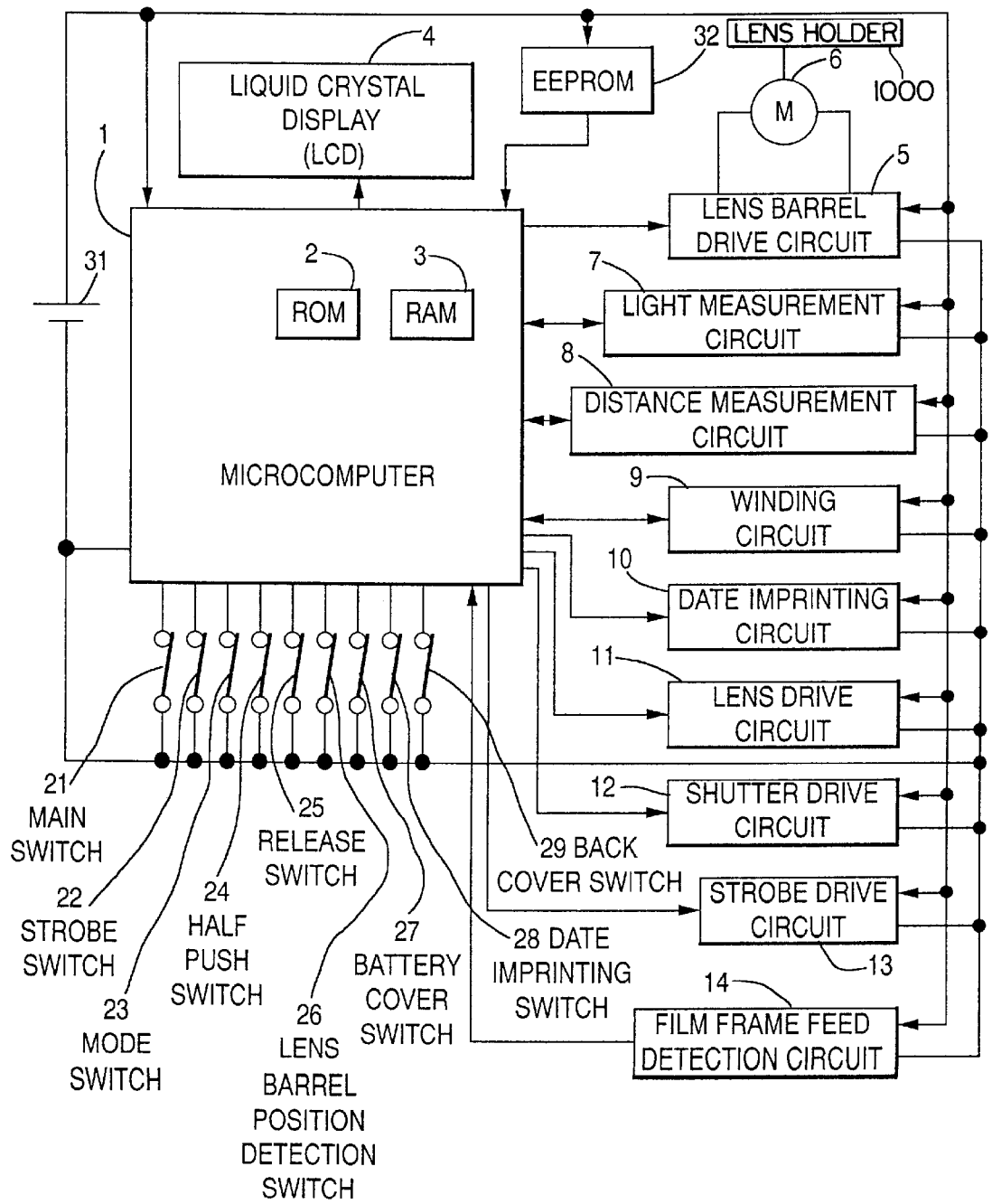
FIG. 1 is a block diagram of an embodiment of a hardware system for a camera in accordance with the present invention.

Reference will now be made in detail to the present preferred embodiments of the present invention, examples of which are illustrated in the accompanying drawings, wherein like reference numerals refer to like elements throughout.

FIG. 1 is a block diagram indicating the hardware system for a preferred embodiment of a camera with a display function of the present invention.

In FIG. 1, switches connected to microcomputer 1 control all activities of the camera. These switches include: main switch (MSW) 21, strobe switch (SBS) 22, mode switch (MOS) 23, half push switch 24, release switch 25, lens barrel position detection switch 26, battery cover switch 27, date imprinting switch 28, and back cover switch 29.

Main switch 21 is operated to extend the lens barrel when beginning photographic action and to retract the lens barrel when ending photographic action, strobe switch (SBS) 22 is operated when selecting a strobe photographic mode, and mode switch (MOS) 23 is operated when selecting a self-timer photographic mode. Half push switch 24 goes ON when a release button (not illustrated) is pushed half way, and release switch 25 goes ON when the release button is pushed all the way.

Lens barrel detection switch 26 detects the position of a lens barrel (not illustrated) or lens holder 1000 containing a photographic lens; battery cover switch 27 goes ON or OFF depending on whether a battery cover (not illustrated) is open or closed; and date imprinting switch 28 is operated when the date is imprinted on film (not illustrated). Back cover switch 29 goes ON or OFF depending on whether the back cover, which is opened and closed when loading film in the camera body, is open or closed.

In addition, except for lens barrel position detection switch 26 and back cover switch 29, all of the previously mentioned switches 21 through 29 are momentary switches and therefore automatically return when pressed by a photographer.

Moreover, liquid crystal display (LCD) 4, lens barrel drive circuit 5, light measurement circuit 7, distance measurement circuit 8, winding circuit 9, date imprinting circuit 10, lens drive circuit 11, shutter drive circuit 1 2, strobe drive circuit 13, film frame feed detection circuit 14, and EEPROM 32 are individual devices which are all well known in the art and each is connected to microcomputer 1.

LCD 4 is arranged on the camera body (not illustrated), and when setting the photographic mode and the date imprinting mode, the necessary information is displayed on the LCD 4 according to signals output from microcomputer 1. The lens barrel (not illustrated) contains a photographic lens and is connected to lens barrel drive circuit 5. Motor 6 for driving the lens barrel is interfaced to lens barrel drive circuit 5. The lens barrel is driven at the necessary timing based on the directions from microcomputer 1.

Light measurement circuit 7 measures the brightness and amount of light of a subject at the necessary time based on directions from microcomputer 1 and sends the results of this light measurement to microcomputer 1. Distance measurement circuit 8 measures the distance up to a subject based on the directions from microcomputer 1 and sends the distance measurement results to microcomputer 1.

Winding circuit 9 winds one frame of film, or rewinds the film into a cartridge (not illustrated) based on directions from microcomputer 1. Date imprinting circuit 10 imprints date data contained within microcomputer 1 on the film surface based on directions from microcomputer 1.

Lens drive circuit 11 drives the lens corresponding to the directions from microcomputer 1. Shutter drive circuit 12 drives a shutter (not illustrated) corresponding to directions from microcomputer 1. Strobe drive circuit 13 drives a strobe (not illustrated) corresponding to directions from microcomputer 1. Film frame feed detection circuit 14 detects that one frame of film has advanced, or that rewinding of the film into the cartridge has been completed.

Data for determining whether or not this camera has a date imprinting function is written into EEPROM 32.

Moreover, battery 31 is connected to and supplies power for microcomputer 1, LCD 4, lens barrel drive circuit 5, light measurement circuit 7, distance measurement circuit 8, winding circuit 9, date imprinting circuit 1 0, lens drive circuit 11, shutter drive circuit 1 2, strobe drive circuit 13, film frame feed detection circuit 14 and EEPROM 32.

Microcomputer 1 is preferably a one chip microcomputer containing ROM 2 and RAM 3. Microcomputer 1 controls all sequences of the camera and drives LCD 4.

There are five strobe modes in this embodiment: automatic flash, red eye reduction, flash prohibit, forced flash, and slow syncro.

In addition, there are five date modes: "year-month-day," "month-day-year," "day-month-year," "day-hour-minute," and "off." Also, in order to set the date mode, there is a selection mode and a correction mode. In the selection mode, any of the above-mentioned five date modes can be selected. In the correction mode, the settings for the date data to be imprinted (year, month, day, hour, minute) are corrected. The display of the date (such as year- month-day) will sometimes simply be called "date display," and the display of the frame number will sometimes simply be called "counter display."

Figure 2:
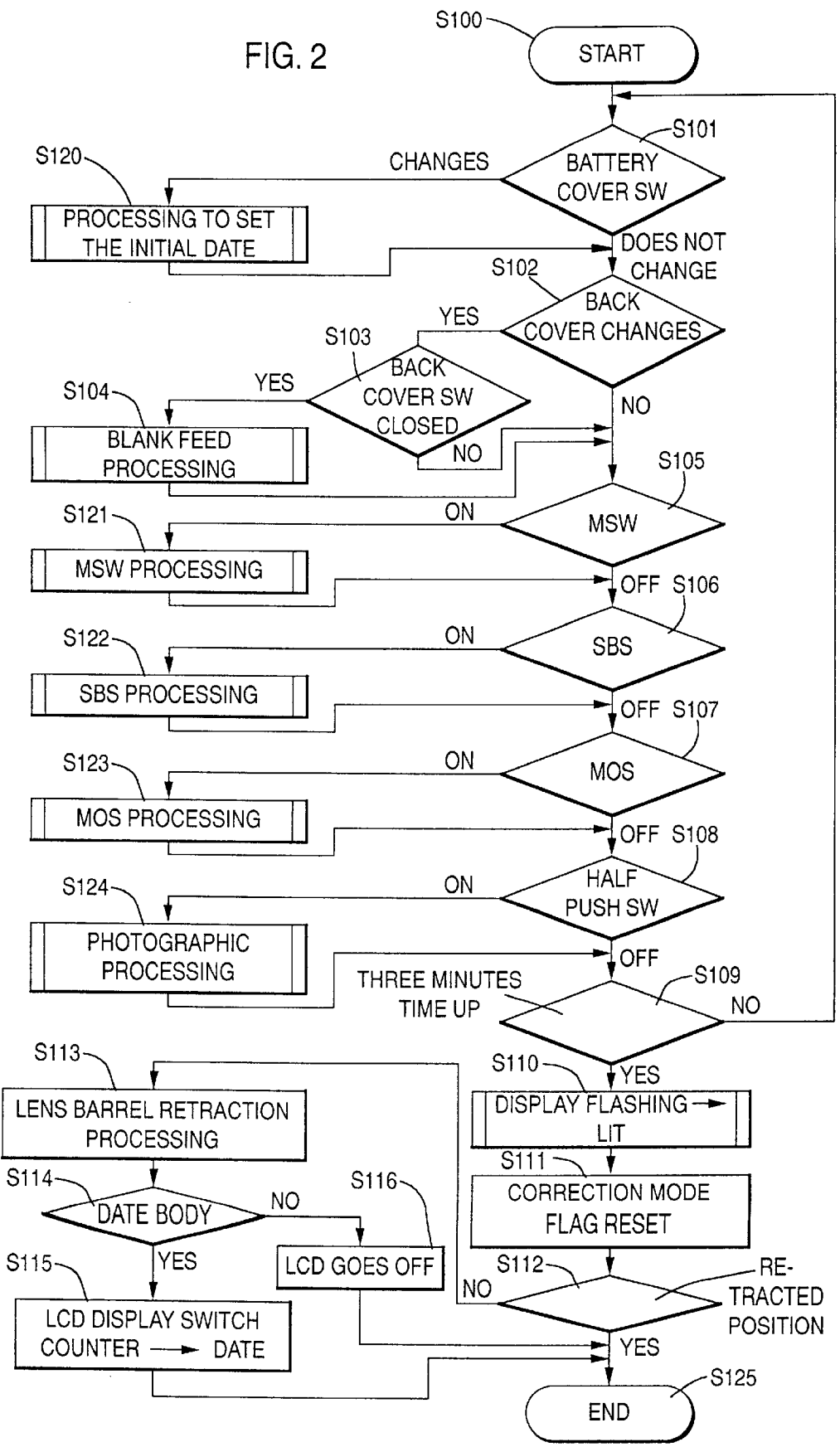
FIG. 2 is a flow chart of the overall operation of the system in FIG. 1.

FIG. 2 is a flow chart of an overall system operation of the system in FIG. 1. The code "S" indicates a flow chart step.

Processing begins from S100. At S101, the battery is installed and, when battery cover switch 27 turns ON (changes), the flow branches to S120 for processing to set the initial date. Processing to set the initial date (S120) is described later. After S120, a change of back cover switch 29 is confirmed at S102. If the status of battery cover switch 27 has not changed at S101, a back cover change check is conducted at S102.

If the status of back cover switch 29 has changed at S102, the process moves to S103 and it is determined whether or not back cover switch 29 is closed. If back cover switch 29 is closed, blank film is wound at S104 and then it is detected whether or not the main switch is ON at S105.

When the back cover has not changed at S102 or the back cover switch is not closed at S103, processing as to whether or not the main switch is ON is immediately conducted at S105.

At S105, when it is detected that main switch 21 is ON, the flow branches to S121 and main switch processing (MSW processing) is executed.

After main switch processing has been completed, or when main switch 21 is not ON at S105, the flow enters a loop to confirm the status of the switches at S106 through S108 and to confirm a three minute timer (S109) which checks whether three minutes has elapsed on a timer set in a date correction mode state described later (see FIG. 6, S311); specifically, it is confirmed whether strobe switch 22 (S106), mode switch 23 (S107), or half push switch 24 (S108) is ON, or whether or not three minutes of time is up (S109).

When it is detected at S106 that strobe switch (SBS) 22 is ON, the flow branches to S122 and strobe switch processing (SBS processing) is initiated. When it is detected at S107 that mode switch (MOS) 23 is ON, the flow branches to S123 and mode switch processing (MOS processing) is initiated. When it is detected at S108 that half push switch 24 is ON, the flow branches to S124 and photographic processing is initiated.

Next, it is confirmed at S109 whether three minutes have elapsed on the timer set in the date correction mode state (see FIG. 6, S311), and if the time is up, a lighted display on LCD 4 is changed to a flashing display at S110. The correction mode flag is reset at S111 and then the status of the lens barrel is determined at S112.

If the lens barrel is not in the retracted position at S112, lens barrel retraction processing is executed at S113 and it is determined at S114 whether or not the camera has a date imprinting function.

Whether or not the camera has a date imprinting function is determined at S114. If the camera is a date body (i.e, one with a date imprinting function), LCD 4 is switched at S115 to display the date and, if the camera is not a date body, LCD 4 is turned OFF at S116.

Specifically, one version of a camera may have a date imprinting function while another version of the camera may not have a date imprinting function. In fact, professional models of a camera typically do not have a date imprinting function while amateur models of the same camera might have a date imprinting function. Professional photographers consider the date imprinting function unnecessary. Not only is the date imprinting function unnecessary in a professional model of a camera, but many times the product quality of the photographic content may also be lowered if the date is imprinted by a mistaken operation. A chance of lowered product quality forces many photographers to choose a camera without a date imprinting function. By comparison, amateur photographers prefer the use of date imprinting. The date imprinting function, therefore, heightens the commercial product value if the product is to be sold to amateur photographers. For this reason, amateur models of a camera have a date imprinting function while professional model of the same camera do not have a date imprinting function.

A date imprinting function could be added by a separate option, but it would be necessary to attach an optional part to the exterior of the camera, thereby increasing camera size. Moreover, because it is necessary to purchase an optional part, it would be necessary for the user to bear that cost.

Thus, in a preferred embodiment, the date is not displayed by an optional part, but rather LCD 4 is configured so that the date can be displayed wherein the data and programming necessary to display the date on LCD 4 is written into EEPROM 32. If the date is not to be displayed on LCD 4, then EEPROM 32 is programmed accordingly.

Alternatively, identifier signals as to whether or not the necessary data (date) is to be displayed on LCD 4 are written into EEPROM 32 and microcomputer 1 checks EEPROM 32 data signals and determines whether or not to display the date by using the data in EEPROM 32. Data in EEPROM 32 can be temporarily written from outside the device and, because data is modifiable, display data can be quickly selected.

Consequently, a camera with a date imprinting function and a camera without the function can be made in a common embodiment, with the exception of data within EEPROM 32. Therefore, the same parts, except for EEPROM 32, can be used. There is little cost increase and, because all processing is executed within the camera, camera size is not increased. When configured in this manner, a camera which has a date imprinting function is defined as a "date body."

In a preferred embodiment, LCD 4, date imprinting circuit 10 and EEPROM 32 are all included inside one camera body (not illustrated). A date imprinting ability is therefore present in the camera body; however, this date imprinting function is enabled or disabled based on programming instructions and data written into EEPROM 32.

Next, the processing of each subroutine in the flow chart of FIG. 2 will be explained.

Figure 3:
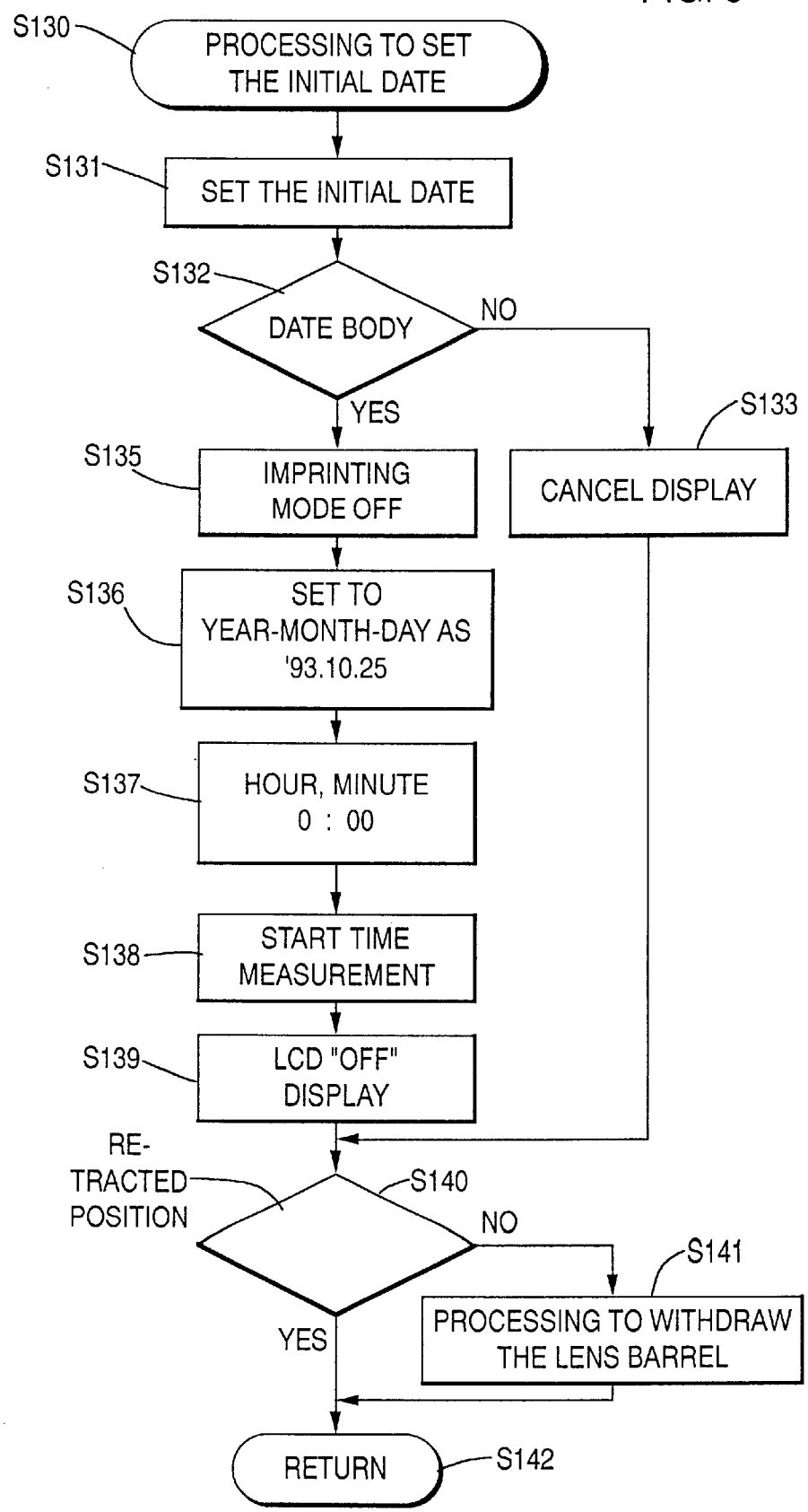
FIG. 3 is a flow chart of the processing to set the initial date of FIG. 2.

FIG. 3 is a flow chart indicating the processing to set the initial date at S120 in FIG. 2. Processing to set the initial date starts from S130. Processing to set the initial data by which a timer and a flag are initially set is executed at S131. Then, it is confirmed at S132 whether or not the camera is a date body, based on the data within EEPROM 32. If the camera is not a date body, the display of LCD 4 is canceled at S133. If it is a date body, date imprinting mode is turned OFF at S135.

The date calendar is initially set at S136 to the required year-month-day (in this example, Oct. 25, 1993—see date display DD in FIG. 39), and the clock is initially set at S137 to the required time (in this example, 0:00), and the clock begins at S138.

Then, LCD 4 is turned OFF at S139, and it is confirmed whether or not the lens barrel is in the retracted position at S140. If the lens barrel is not in the retracted position, after the processing to retract the lens barrel is executed at S141, the flow advances to S142 for a return to the processing of FIG. 2. If the lens barrel is in the retracted position at S140, the flow immediately returns to the processing of FIG. 2.

Figure 4:
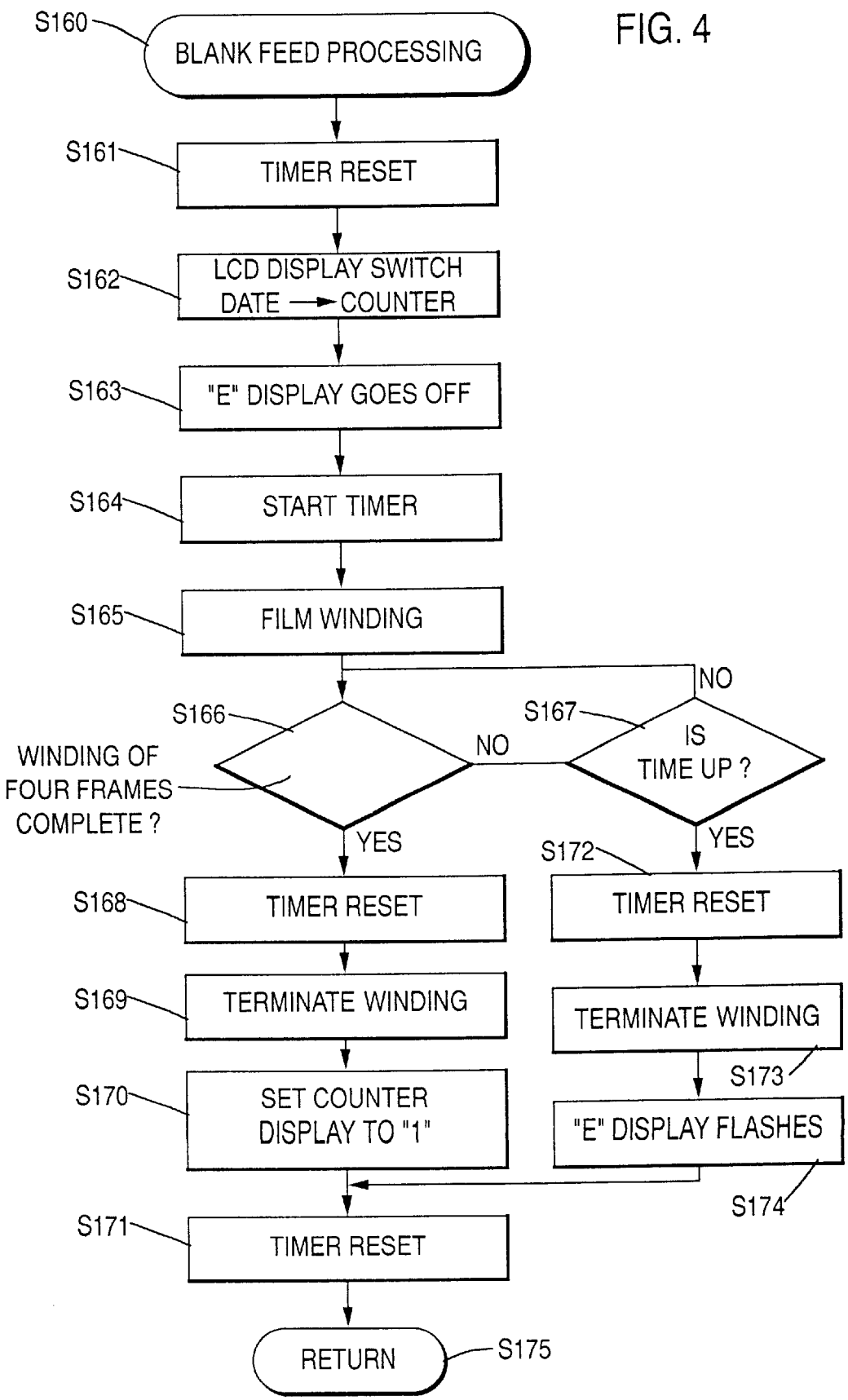
FIG. 4 is a flow chart of the blank feed processing of FIG. 2.

FIG. 4 is a flow chart indicating the blank feed processing at S104 in the flow chart of FIG. 2. Blank feed processing begins from S160 and a timer is reset at S161. This timer is configured by microcomputer 1 for counting a clock. Next, the flow advances to S162, and the display of LCD 4 is switched from displaying the date (as indicated in FIG. 39) to displaying the photograph frame number (as indicated by counter display CD in FIG. 38).

Figures 41, 44A, 44B, 44C, 47A, 47B, 47C:
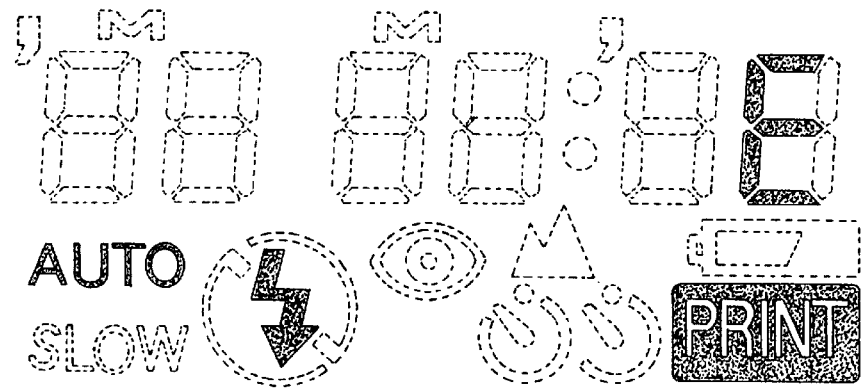
FIG. 41 is a diagram indicating an "E" display.
FIGS. 44(a), 44(b) and 44(c) are diagrams indicating a changing of date information in a date display.
FIGS. 47(a), 47(b) and 47(c) are diagrams indicating a changing of date information in a date display.

After the letter E (as shown in FIG. 41) is turned OFF at S163, the timer for controlling the blank film feed is started at S164. Next, the film begins winding (blank feed) at S165. That is, at this time microcomputer 1 controls winding circuit 9, and blank film is wound so that film is drawn out of the film cartridge.

It is determined at S166 whether or not four frames of film have been wound. Specifically, microcomputer 1 monitors the output from film frame feed detection circuit 14, and it is determined whether or not four blank frames of film have been fed based on the film winding that began at S165. If four frames of film have not been wound, the flow advances from S166 to S167, and it is determined whether or not the time on the timer set at S164 is up. If the timer has not yet counted the stipulated time, the flow returns from S167 to S166.

If it is determined at S166 that four frames of film have been wound, the flow advances to S168 and the timer is reset. After S168, the flow next advances to S169 and the film winding that began at S165 is terminated.

Then, the count "1" is displayed at S170. Specifically, because four frames of blank film have now been wound, the "1" display indicates that photographs of a subject can be taken on the next frame.

The timer that was started at S164 is set to a time sufficient in order to wind four frames of film. Then, when the stipulated time has elapsed at S167, and it is determined that for some reason the camera is in a state such that blank film cannot be wound, the flow advances from S167 to S172 and the timer is reset. Further, the flow advances to S173 where film winding begun at S165 is terminated, and then a flashing letter "E" is displayed on LCD 4 at S174. A flashing "E" on LCD 4 informs the user that the film has not been wound. The flow next advances from processing at S170 or at S174 to S171 where the timer (three minutes, in this example) is started and the flow returns from S175 to the flow chart of FIG. 2.

Figure 5:
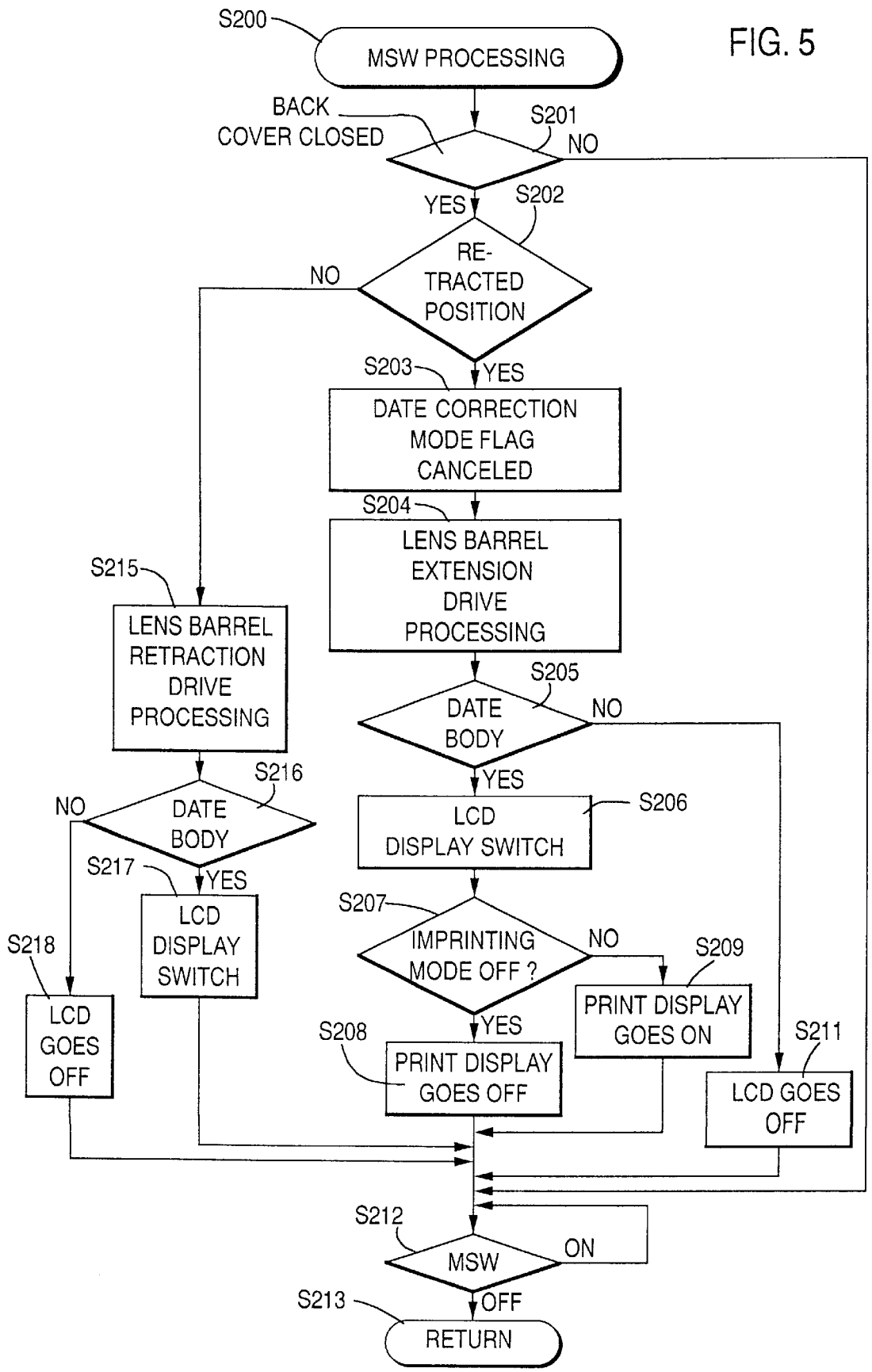
FIG. 5 is a flow chart of the MSW processing of FIG. 2.

FIG. 5 is a flow chart indicating main switch processing (MSW processing) at S121 in the flow chart of FIG. 2.

Main switch processing starts at S200, and it is verified at S201 whether or not the back cover is open based on the status of back cover switch 29. If it is determined that back cover is closed at this point, the status of lens barrel position detection switch 26 is detected at S202 to determine whether or not the lens barrel is in the retracted position.

When the lens barrel is in the retracted position, the flow advances to S203 and the date correction mode flag is canceled. At S204, microcomputer 1 extends the lens barrel to the photographic position by driving motor 6 through lens barrel drive circuit 5.

At S205, it is confirmed whether or not the camera is a date body. If it is not a date body, LCD 4 is turned OFF at S211, and the flow advances to S212 where main switch 21 is checked. However, if the camera is a date body at S205, the photographic mode is displayed on LCD 4 at S206 (see FIG. 39). At S207, it is confirmed whether or not the date imprinting mode is OFF, and if it is OFF, a print mark on LCD 4 is turned OFF at S208; and if imprinting mode is ON at S207, a print mark is lit at S209 (see FIG. 39) and the flow is transferred to S212 to check the status of main switch 21.

When it is determined at S202 that the lens barrel is not in the retracted position, motor 6 is driven at S215 by lens barrel drive circuit 5 and the lens barrel is withdrawn to the retracted position. Then, if it is determined at S216 that the camera is a date body, the date imprinting data is displayed on LCD 4 at S217 (the date of '93 (year) 10 (month) (M) 25 (day) is displayed in FIG. 39 and FIG. 40). After this, the flow advances to S212 to determine the status of main switch 21.

If it is not a date body at S216, LCD 4 is turned OFF at S218 and the status of the main switch 21 is checked at S212. In S212, the system waits for main switch 21 to go OFF and, when main switch 21 goes OFF, the flow returns from S213 to the flow chart of FIG. 2.

Figure 6:
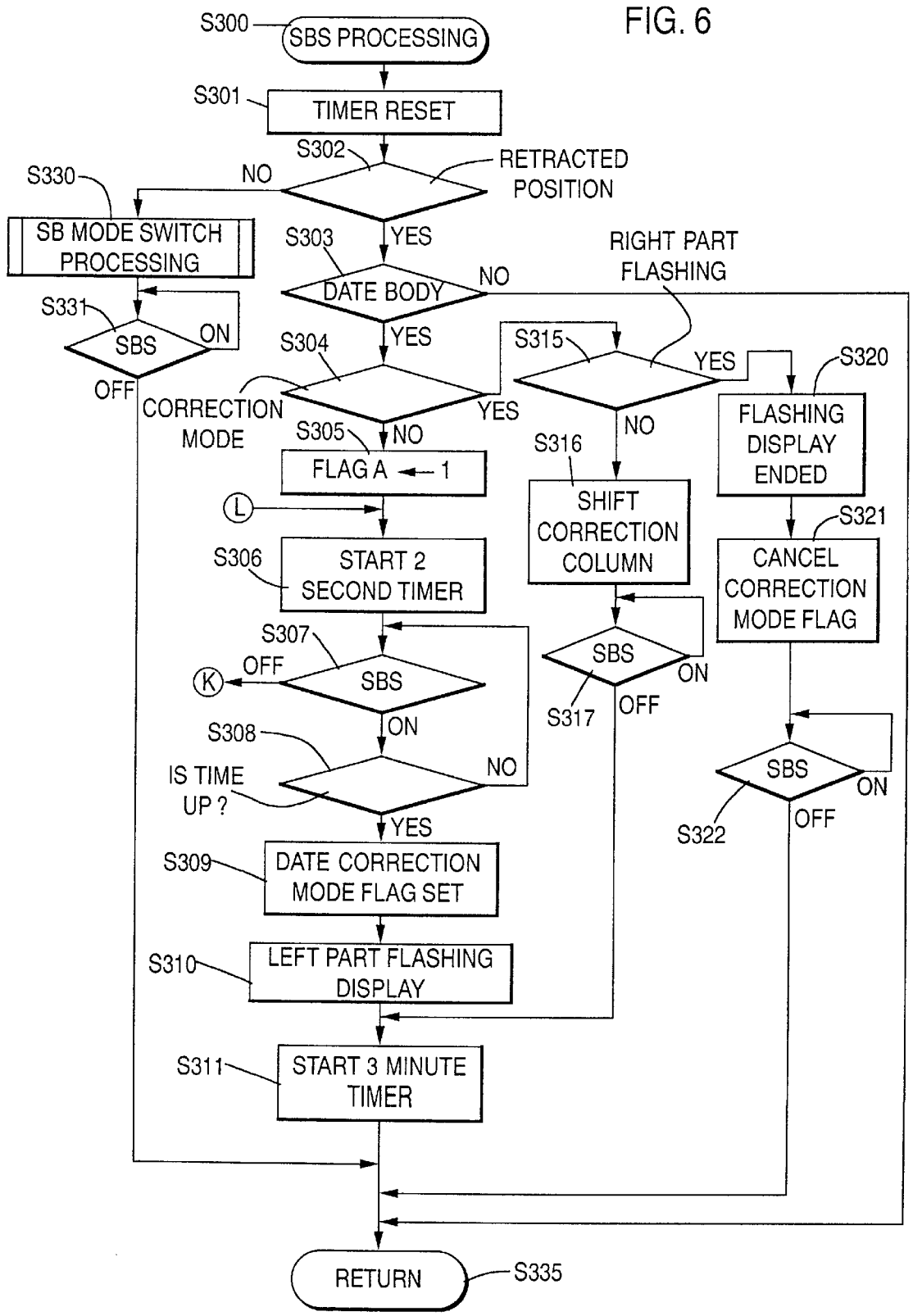
FIG. 6 is a flow chart of the SBS processing of FIG. 2.

FIG. 6 is a flow chart indicating strobe switch processing at S122 in the flow chart of FIG. 2. Strobe switch (SBS) processing starts from S300. First, the timer is reset at S301 and it is determined whether or not the lens barrel is in the retracted position by detecting the status of lens barrel position detection switch 26 at S302.

Figure 12:
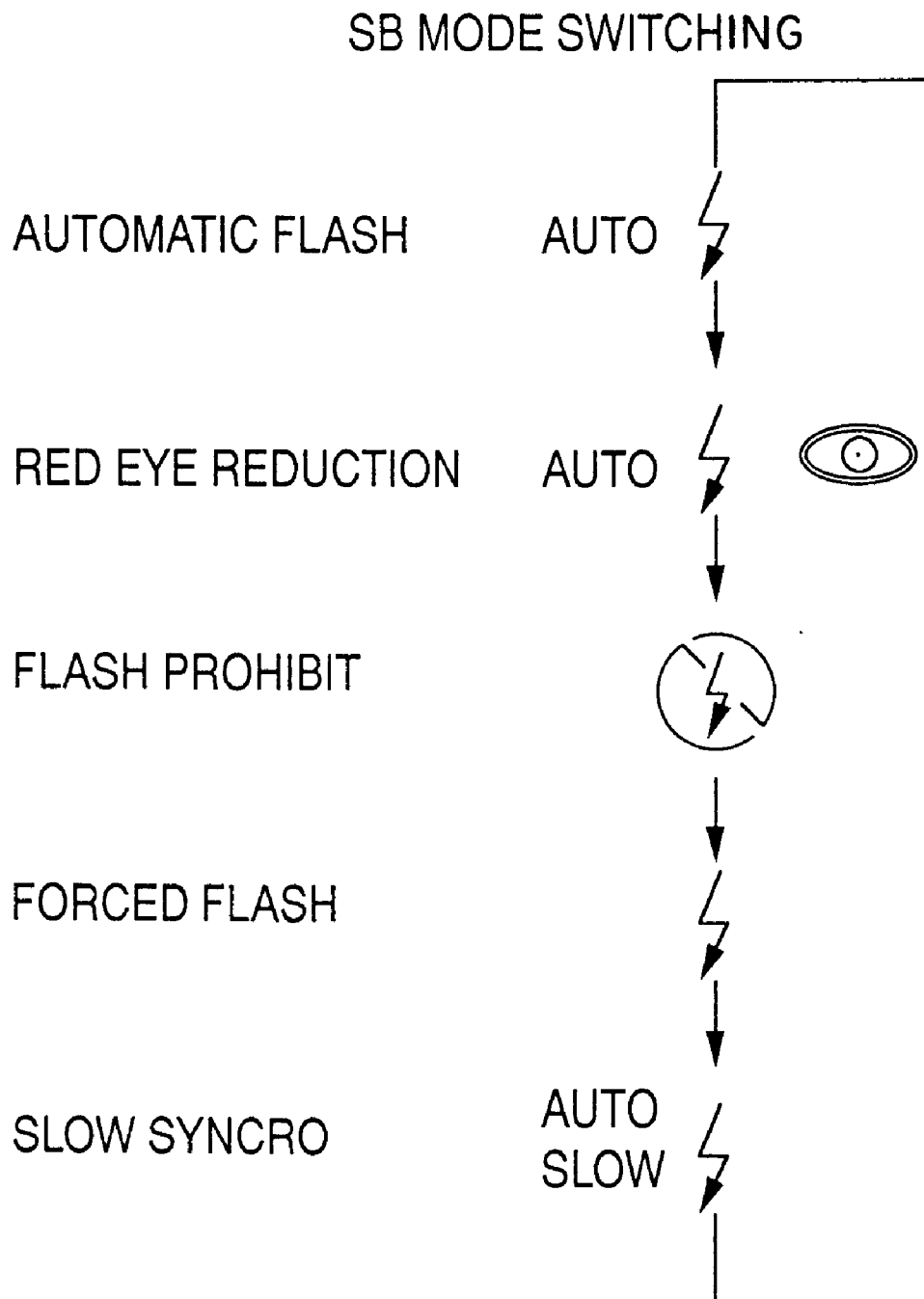
FIG. 12 is a diagram illustrating strobe mode switching.

When the lens barrel is not in the retracted position, the flow advances to S330 and the strobe modes are switched. There are five SBS modes: automatic flash mode, red eye reduction mode, flash prohibit mode, forced flash mode, and slow syncro. As indicated in FIG. 12, if the mode was the automatic flash mode, it is switched to the red eye reduction mode; if the mode was the red eye reduction mode, it is switched to the flash prohibit mode; if the mode was the flash prohibit mode, it is switched to the forced flash mode; if the mode was the forced flash mode, it is switched to slow syncro; and if the mode was slow syncro, it is switched to the automatic flash mode. Afterwards, the flow advances to S331 where the system waits for strobe switch 22 to go OFF. When strobe switch 22 goes OFF, the flow returns from S335 to the flow chart of FIG. 2.

If the lens barrel is in the retracted position at S302 and it is recognized to be a date body at S303, the flow advances to S304 and it is confirmed whether or not the date correction mode has already been entered. If the date correction mode has not already been entered, the system is in the selection mode. At this time, the flow advances to S305 where flag A is raised (becomes "1") as an indicator that the action of pushing strobe switch 22 has occurred one time.

Then, a two second timer (built into microcomputer 1) is started at S306 and it is confirmed at S307 whether or not strobe switch 22 continues to be ON. Specifically, after the two second timer has started, it is determined at S307 whether or not strobe switch 22 has gone OFF, and if it is OFF the flow advances to S350 in FIG. 7; if switch 22 continues to be ON at S307, it is determined at S308 whether or not the time is up. If the time is not up, the flow circulates in the loop of S307 and S308.

If the time of the timer is up at S308 (when strobe switch 22 has been held ON for two seconds or more), the correction mode flag is set at S309. It is the status of this correction mode flag that is later determined when the flow again advances to S304. In the interval when the correction mode flag is set, the system enters in the date correction mode. After this, the flow advances to S310 and the left part of LCD 4 begins a flashing display (as described later, a display that is flashing can be corrected). After this, the three minute timer is started at S311 and the flow returns from S335 to the flow chart of FIG. 2. The three minute timer started in S311 of FIG. 6 is checked in S109 of FIG. 2. This three minute timer will be up in S109 unless reset in MOS processing (see FIG. 8, S401) or strobe switch process (see FIG. 6, S301).

Figure 39:
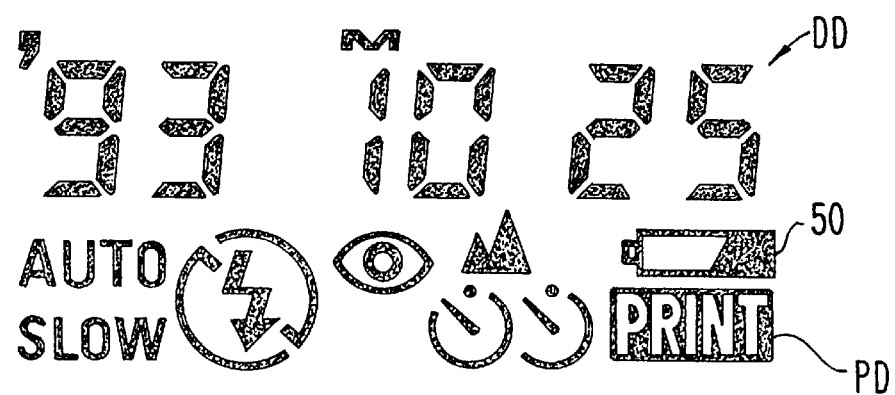
FIG. 39 is a diagram indicating a photographic mode display.
Figure 40:
FIG. 40 is a diagram indicating a date display.

The date displayed on LCD 4 is displayed in three blocks corresponding to a left part, a middle part, and a right part of LCD 4, wherein each of these blocks displays two columns of decimal numbers (see FIG. 39 and FIG. 40). Corrections are made in the order of the left part, the middle part, and the right part. When the correction mode has been entered, the left part flashes first, and this indicates that the left part can be corrected. For example, if the selected mode is "year-month-day," the left part will display the "year," the middle part will display the "month," and the right part will display the "day." When the correction mode has been entered, the "year" of the left part will flash first ("'93" in the examples of FIG. 39 and FIG. 40), indicating that the year can be corrected.

If it is determined at S304 that the correction mode has already been entered, the flow advances to S315. It is confirmed at S315 whether or not the right part ("25" in FIG. 39 and FIG. 40) is flashing. If the right part is flashing, this signifies that all parts have already been corrected. The flashing display of LCD 4 is ended at S320, and the correction mode flag is canceled at S321. By canceling the correction mode flag the system exits the correction mode. Afterwards, the system waits for strobe switch 22 to go OFF at S322 and when strobe switch 22 goes OFF, the flow returns from S335 to the flow chart of FIG. 2.

If the right part is not flashing at S315, the correction column (flashing position) is shifted. If the left part ("'93" in FIG. 39 and FIG. 40) is flashing, the flashing display is shifted to the middle part ("M10" in FIG. 39 and FIG. 40); and if the middle part is flashing, the flashing display is switched to the right part ("25" in FIG. 39 and FIG. 40). Afterwards, the system waits for strobe switch 22 to go OFF at S317 and, when strobe switch 22 goes OFF, the three minute timer is started at S311 and the flow returns from S335 to the flow chart of FIG. 2.

Figure 7:
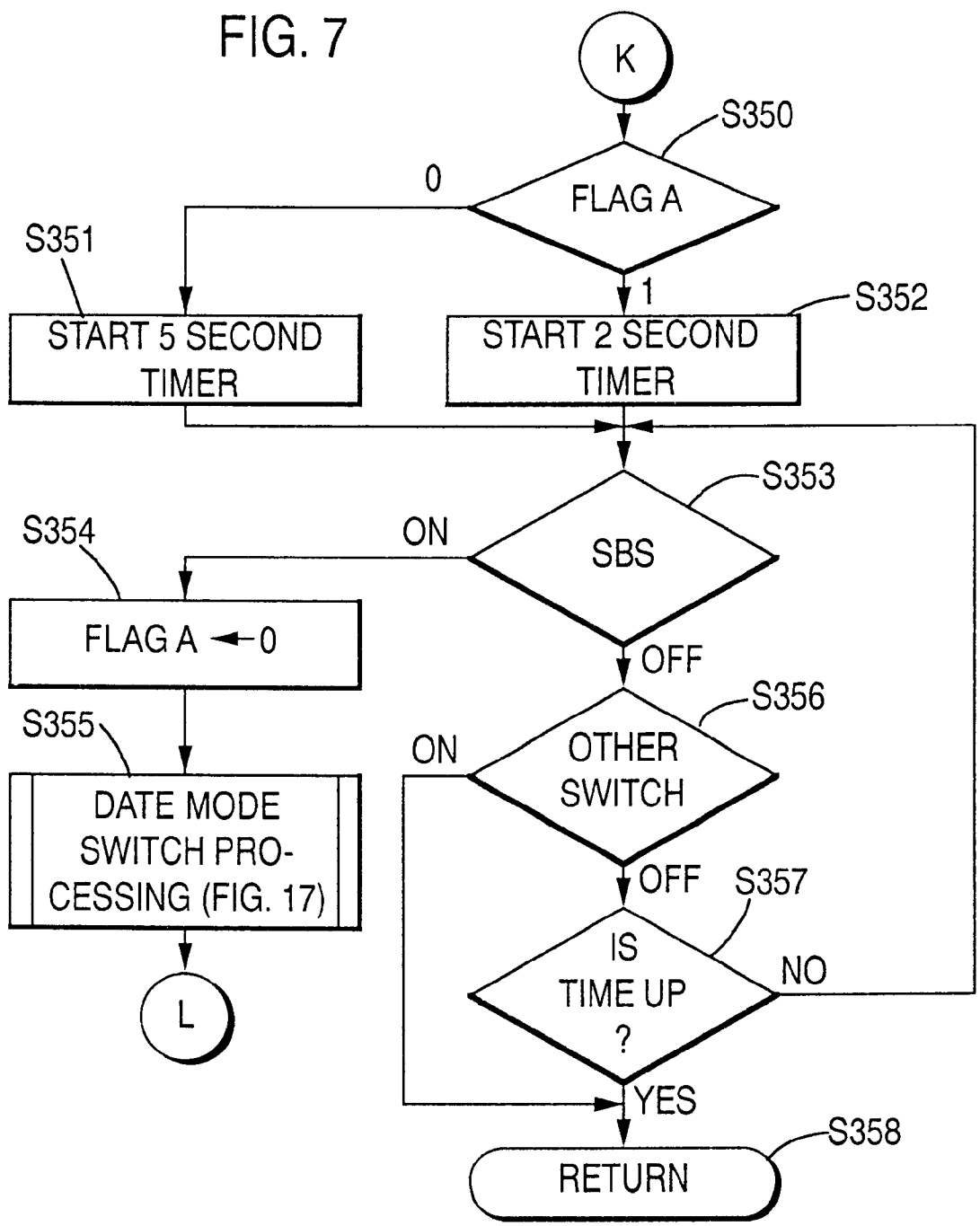
FIG. 7 is a continuation of the flow chart in FIG. 6.

If strobe switch 22 is OFF at S307 (if, after strobe switch 22 has gone ON one time, it goes OFF before a two second interval has elapsed), the flow advances to S350 in the flow chart of FIG. 7.

In S350, it is determined whether flag A is "0" or "1"; if it is "0" (flag A is reset to "0" at S354 when strobe switch 22 is turned ON a second time during the two second interval), a five second timer is started at S351 and the flow enters the loop of S353, S356, and S357 and the system waits for strobe switch 22 to go ON.

If flag A is "1" at S350 (if strobe switch 22 has only gone ON and OFF one time), the two second timer is started at S352 and the flow enters the loop of S353, S356, and S357.

In the loop of S353, S356 and S357, if strobe switch 22 goes ON again within five seconds or within two seconds, the flow advances to S354, flag A is set to "0", and date mode switch processing is executed at S355.

There are five date modes: "year-month-day," "month-day-year," "day-month-year," "day-hour-minute," and "OFF." If the date was "year-month-day," the date mode is switched to "month-day-year"; if the date mode was "month-day-year," it is switched to "day-month-year"; if the date mode was "day-month-year," it is switched to "day-hour-minute"; if the date mode was "day-hour-minute," it is switched to "OFF" (refer to FIG. 13). Afterwards, the flow returns to S306 and the two second timer is started (the timer for whether or not the correction mode is entered). Following this, the flow advances to S307.

Moreover, in the loop of S353, S356 and S357, if another switch (main switch 21, etc.) goes ON at S356, the flow returns from S358 to the flow chart of FIG. 2. Also, if strobe switch 22 is not pressed and the time on the five second timer (S351) or the two second timer (S352) has lapsed at S357, the flow returns from S358 to the flow chart of FIG. 2.

The timer is set to the longer time of five seconds at S351 in contrast to the shorter time of two seconds at S352 for the following reason. That is, when flag A is "1" (when strobe switch 22 has been turned ON only one time), whether or not the user intends to switch modes is determined by pressing strobe switch 22 (or possibly another switch) one more time. It does not require a long time in order to confirm this intention. (However, the mode would be immediately switched if modes switched by a single operation were unintentionally operated. In order to prevent this, the system is designed so that a switch must be operated twice within two seconds in order to switch modes.) Thus, a short period of time of two seconds is set at S352. In contrast to this, if flag A is "0," the date modes are being switched, and it is necessary to give the user a longer amount of time for consideration. Thus, a long period of time of five seconds is set at S351.

Figure 8:
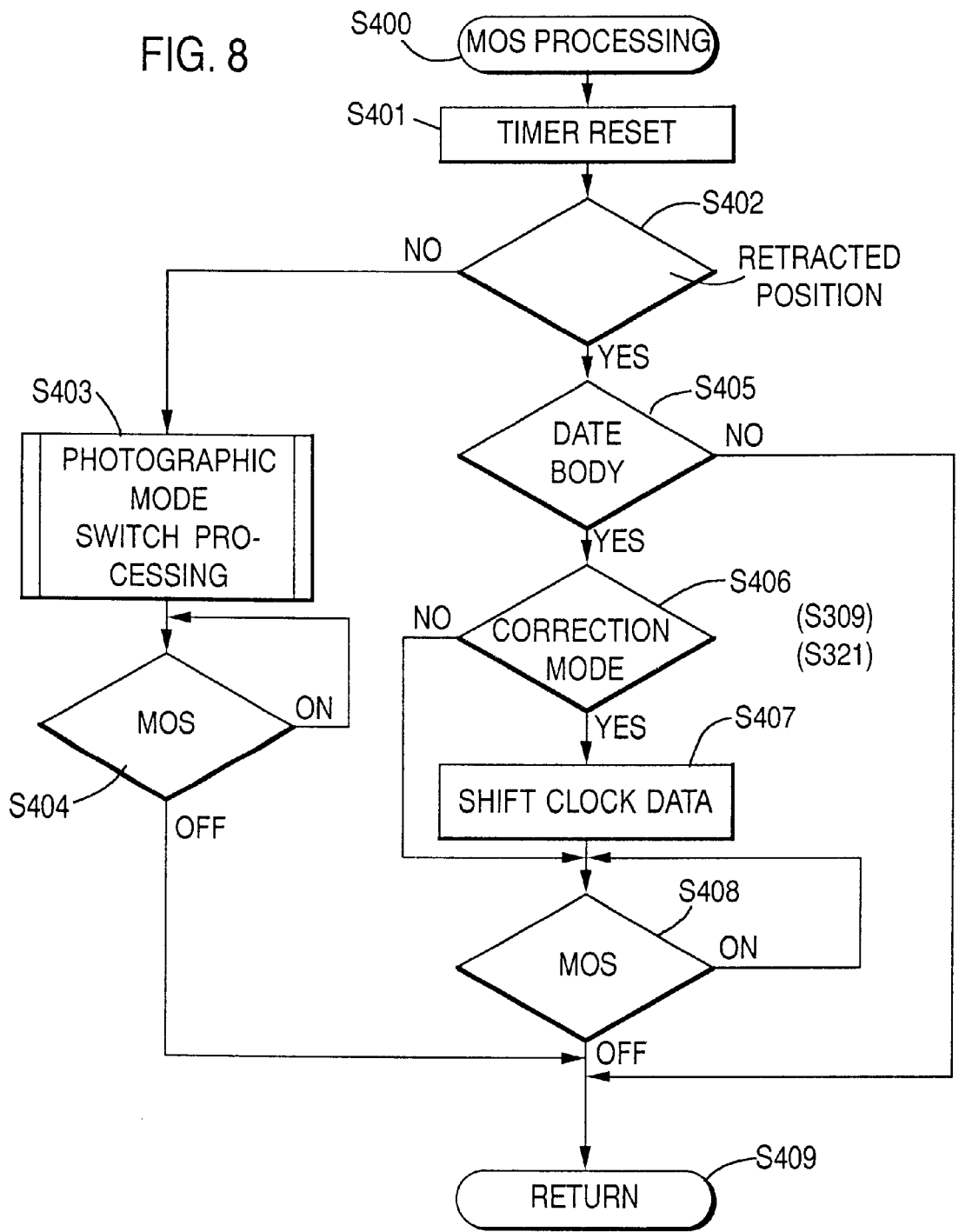
FIG. 8 is a flow chart of the MOS processing of FIG. 2.

FIG. 8 is a flow chart indicating the mode switch processing (MOS processing) at S123 in the flow chart of FIG. 2. Mode switch processing starts from S400. The three minute timer (started at S311 in FIG. 6) is first reset at S401 and it is confirmed whether or not the lens barrel is in the retracted position by reading the status of lens barrel position detection switch 26 at S402. If the lens barrel is not in the retracted position, the flow advances to S403, and the system switches photographic modes.

Figure 14:
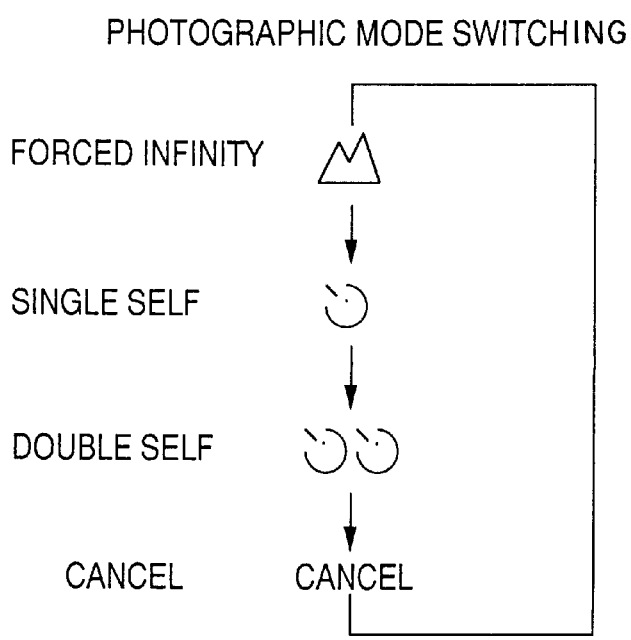
FIG. 14 is a diagram illustrating photographic mode switching.

There are four photographic modes: ordinary photography (cancel) mode, forced infinity mode, single self mode, and double self mode. These photographic modes are switched in that order by pressing mode switch 23 (refer to FIG. 14).

In the forced infinity mode, when the release button is fully pressed, the focusing lens (aperture) is set to infinity and the shutter is operated. In single self mode, a fixed amount of time elapses after the release button is fully pushed before the shutter operates. In double self mode, self timer photography is executed two times. In cancellation mode, normal photography is executed.

Afterwards, the flow advances from S403 to S404 and the system waits for mode switch 23 to go OFF. When mode switch 23 goes OFF, the flow returns from S409 to the flow chart of FIG. 2.

When it has been determined at S402 that the lens barrel is in the retracted position, there is confirmation at S405 of whether or not the camera is a date body. If it is a date body, it is confirmed whether or not the correction mode has already been entered at S406 (in the retracted state, when strobe switch 22 is ON for two seconds or more, the correction mode is set at S309 of FIG. 6, and the correction mode is canceled at S321 after correction of the right part has been completed).

When the correction mode has not been entered, the flow advances to S408 and the system waits for mode switch 23 to go OFF. When mode switch 23 goes OFF, the flow returns from S409 to the flow chart of FIG. 2.

When the correction mode is entered at S406, the clock data is shifted at S407. One (or −1) is added to the data ("year," "month," "day," "hour" or "minute") of the block among the left part, the middle part or the right part which is flashing at that time. For example, when the display mode is year-month-day, and the "year" of the left part is set to the year '88 and is flashing, the year "'88" is switched to "'89." (See FIGS. 47(a) and 47(b)).

Afterwards, it is confirmed at S408 that mode switch 23 is OFF, and the flow returns from S409 to the flow chart of FIG. 2.

Figure 9:
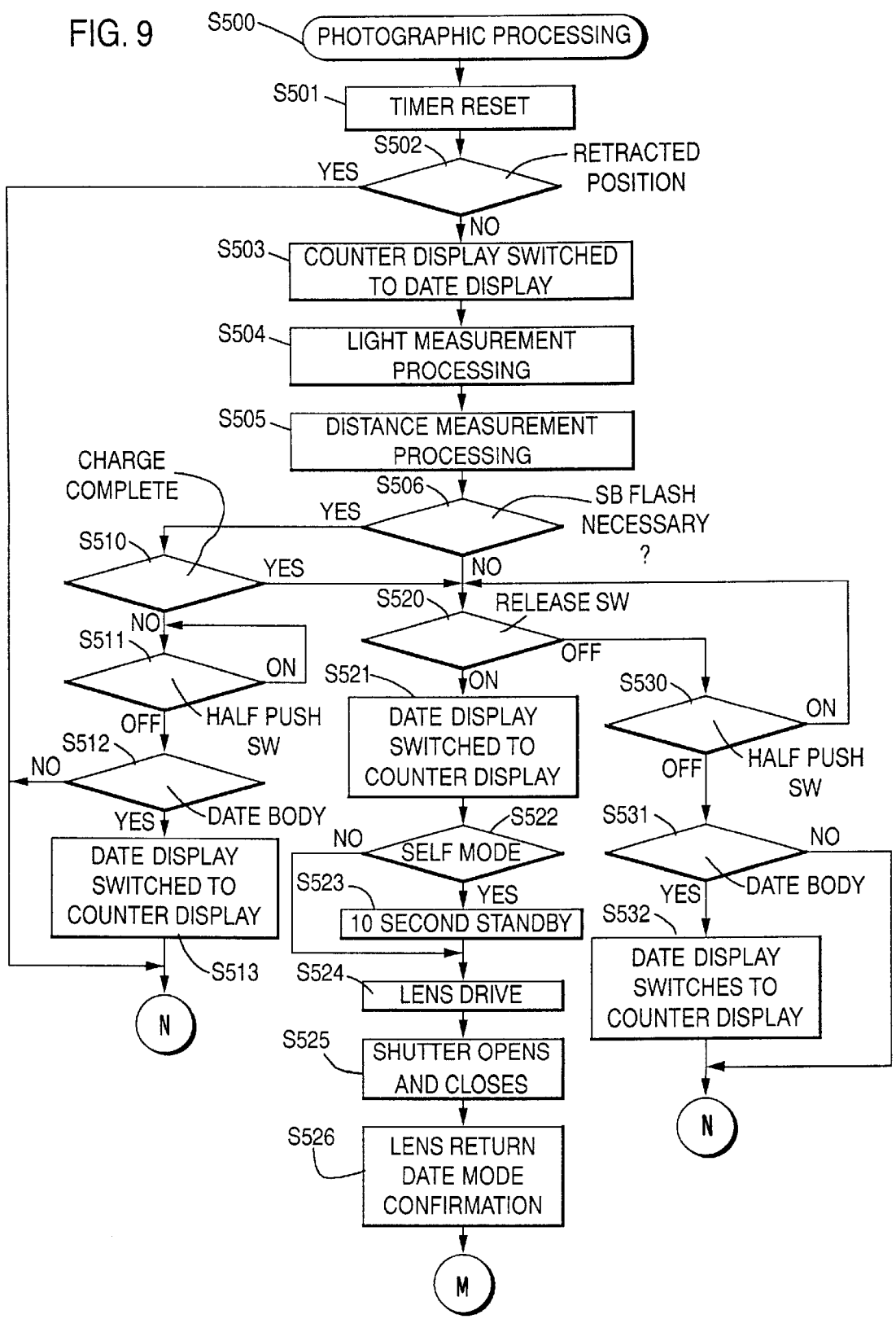
FIG. 9 is a flow chart of the photographic processing of FIG. 2.
Figure 10:
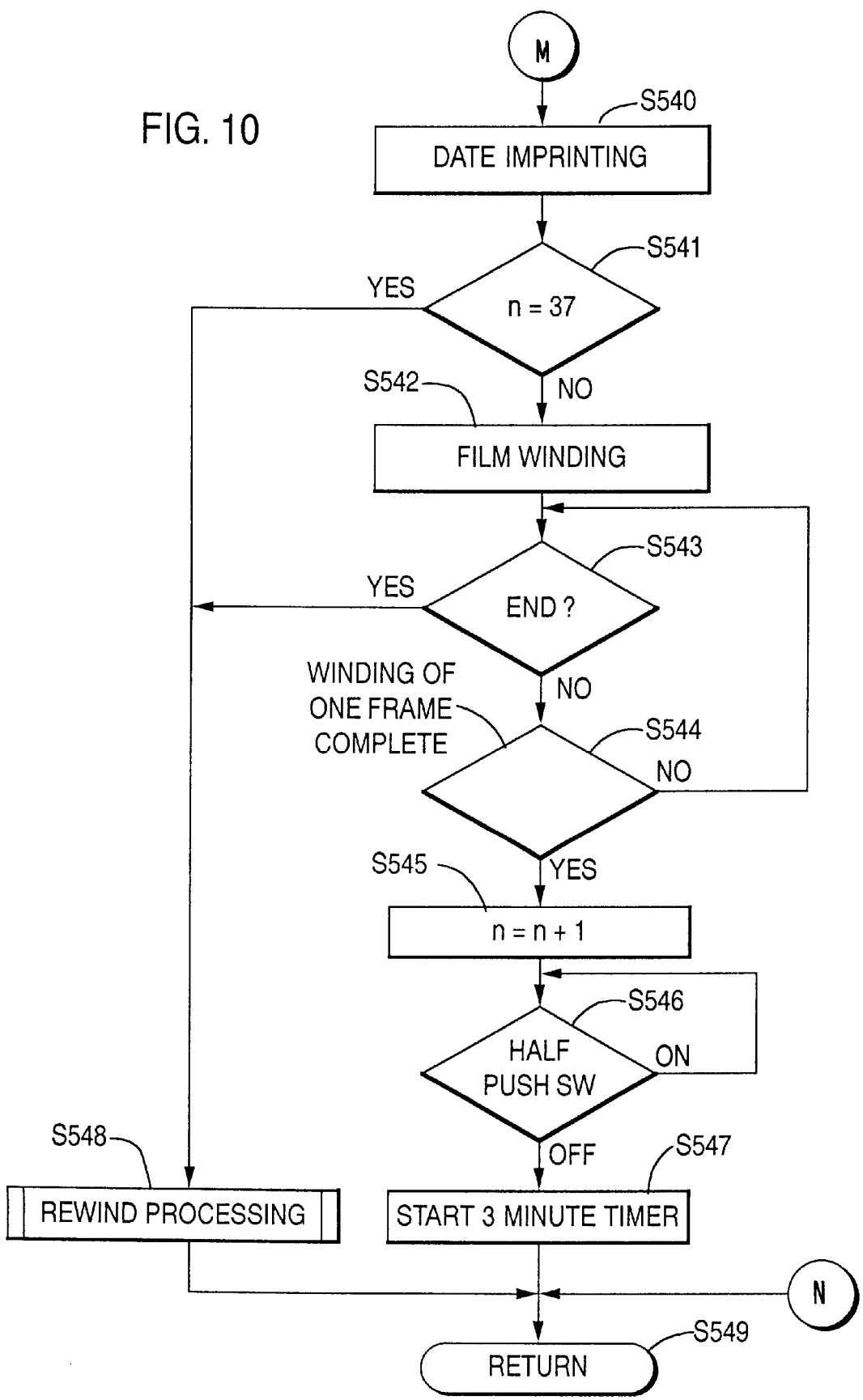
FIG. 10 is a continuation of the flow chart in FIG. 9.

Next, the details of the subroutine for the photographic processing in S124 of FIG. 2 will be explained by referring to the flow charts in FIG. 9 and FIG. 10. This processing begins from S500, the three minute timer is reset at S501, and it is determined at S502 whether or not the lens barrel is in the retracted position. When the lens barrel is in the retracted position, lens barrel position detection switch 29 is ON. Taking photographs is prohibited at this time, and the flow advances to S549 for return to the flow chart of FIG. 2.

Figure 38:
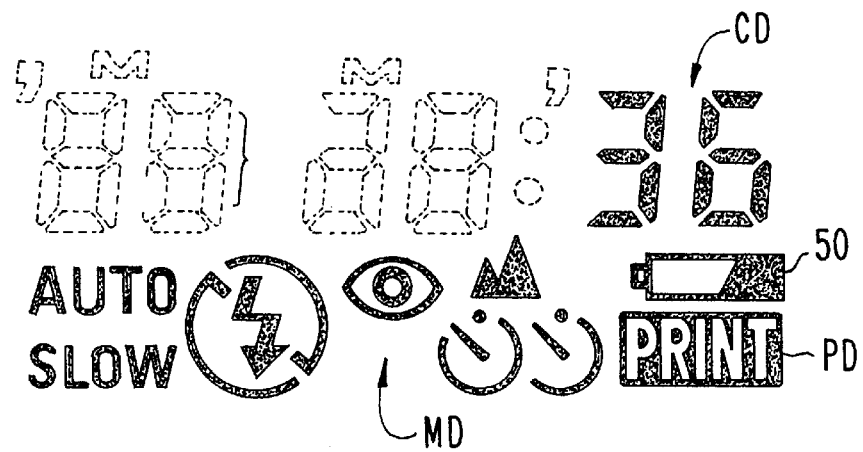
FIG. 38 is a diagram indicating a frame number or "counter" display.

If it is determined at S502 that lens barrel position detection switch 26 is OFF (if the lens barrel is in the extended position), the flow advances to S503 and the display on LCD 4 is switched from displaying the photographic frame number (for example, frame 36, as indicated by counter display CD in FIG. 38) to displaying the date (for example, year 93, month 10, day 25, indicated by date display DD in FIG. 39). In this manner, one portion of LCD 4 can be jointly used for displaying the frame number and displaying the date. Therefore, even if both functions are provided in the camera, an increase of size can be prevented and the cost can be greatly reduced.

Subsequently, the flow advances to S504 where light measurement processing is executed. Specifically, microcomputer 1 controls light measurement circuit 7 and light measurement processing is executed. At this time, light measurement circuit 7 calculates the brightness of the subject from the amount of light that has been input onto the built-in light receiving elements and the aperture and time of the shutter are computed.

It is simultaneously decided whether or not there is low brightness and it is determined whether or not a strobe flash is necessary. If automatic flash mode is set, it is determined whether or not the strobe will be flashed corresponding to the brightness. If the flash prohibit mode is set, irrespective of the brightness, the strobe flash is prohibited. If the force flash mode is set, irrespective of the brightness, the strobe flashes.

Subsequently, the flow advances to S505 and distance measurement processing is executed. At this time, microcomputer 1 controls distance measurement circuit 8 and distance measurement processing is executed. The results of the distance measurement are output to microcomputer 1 from distance measurement circuit 8.

It is determined at S506 whether or not it was decided at S504 that a strobe flash is necessary. If it was decided that a strobe flash is necessary, the flow advances to S510 and it is determined whether or not charging of the strobe has been completed. If charging has not been completed, the strobe cannot be flashed. For this reason, the flow advances to S511 and the system goes into standby until half push switch 24 goes OFF (the release button is released). When half push switch 24 goes OFF, a date body check is executed at S512. If the camera is a date body, the flow advances to S513 and the display on LCD 4 is switched from the date display state indicated in FIG. 39 to the photograph frame number display state in FIG. 38 and photographic processing is completed. If it is determined at S512 that the camera is not a date body, the processing at S513 is omitted.

If the charging of the strobe has already been completed, the flow advances from S510 to S520. If it is decided at S506 that a strobe flash is not necessary, the flow advances to S520. It is determined at S520 whether or not release switch 25 is ON.

When it is determined at S520 that release switch 25 is OFF, the flow advances to S530 and it is determined whether or not half push switch 24 is ON. If half push switch 24 is ON, the flow returns to S520 and processing to determine whether or not release switch 25 is ON is executed.

Specifically, after the flow has passed through S503, the processing of S520 and S530 is repeated based on the release button being in the half push state. In this state, the date (indicated in FIG. 39) is displayed on LCD 4 because of the processing of S503. However, in the state in which the lens barrel is extended, the display of the photographic frame number (indicated in FIG. 38) is displayed on LCD 4 based on the processing of S206 in FIG. 5. This display can be switched to the date display by the user pushing the release button to the half push state. By pressing the release button to the half push state, the user can confirm the date that will be imprinted.

When half push switch 24 goes OFF in S530 (when the half push state of the release button is canceled), the flow advances to S531 to check the date body, and if affirmative, the display of LCD 4 is switched at S532 from the date display state to the photographic frame number display state. Then, photographic processing is ended.

When it is determined at S520 that release switch 25 is ON, the flow advances to S521 and the display of LCD 4 is switched from the date display state to the photograph frame number display state.

Next, it is determined at S522 whether or not the self mode is set. If the self mode is set, the flow advances to S523 and the system goes into standby for ten seconds. If the self mode is not set, this processing at S523 is skipped.

Next, the flow advances to S524 and lens drive processing is executed. At this time, microcomputer 1 controls lens drive circuit 11 and the photographic lens is moved to the required position. Next, the opening and closing action of the shutter is executed at S525, and if it is necessary to use the strobe, the strobe drive is executed simultaneously. Specifically, at this time microcomputer 1 controls shutter drive circuit 12 and operates the shutter for the required time. The time of this action (the aperture and the time) is calculated by the processing at S504. Moreover, microcomputer 1 controls strobe drive circuit 13 at this time, and the strobe is flashed as necessary.

Furthermore, after the strobe has flashed, the strobe begins to be charged, and when charging is complete, charging is terminated.

Next, the flow advances to S526 and lens return processing is executed. Specifically, microcomputer 1 controls lens drive circuit 11 and the photographic lens is returned to the original position.

Date imprinting processing is executed at S540. Specifically, when the command to imprint the date is given by operating date imprinting switch 28, microcomputer 1 outputs the date data that was obtained as a result of keeping time by a built-in clock device (this date data is displayed on LCD 4) to date imprinting circuit 10, and this data is imprinted on the film.

In this example, the date is imprinted before winding one frame of film; however, it is also possible to imprint the date in dot form during film winding (feeding) by, for example, the flashing of multiple LED's (not illustrated).

Subsequently, the flow advances to S541 and it is determined whether or not photograph frame number n is the final frame number (in this working example, because 36 shot film is being used, n=37). If it is determined that the final frame has not yet been reached, the flow advances to S542 and film winding processing is executed. Specifically, at this time microcomputer 1 controls winding circuit 9, and film winding begins.

It is determined at S543 whether or not the film has reached the end portion, and if it is determined that the film has not yet reached the end portion, the flow advances to S544 where it is determined whether or not the winding of one frame has been completed. If the winding of one frame has not yet been completed, the flow returns to S543 and it is determined whether or not the end portion has been reached. At S543 and S544, where it is determined whether or not the film has reached the end portion and whether or not the winding of one frame has been completed, microcomputer 1 executes this processing corresponding to the detection results of film frame feed detection circuit 14.

When the winding of one frame has been completed, the flow advances to S545 and the value of n is incremented by one. By doing this, the photograph frame number that is displayed on LCD 4 (for example, the number "36" in counter display CD in FIG. 38) is also incremented.

Next, the flow advances to S546 and the system goes into standby until half push switch 24 goes OFF (goes into standby until the release button push pressure has been released), and when half push switch 24 goes OFF, the three minute timer is started at S547 and photograph processing is ended.

When it is determined at S541 that photographs have been taken up to the final frame, or when, during the film winding operation, the final portion of the film is reached at S543, the flow advances to S548 and film rewinding processing is executed. Then, when this film rewinding processing has been completed, photographic processing is ended.

Figure 11:
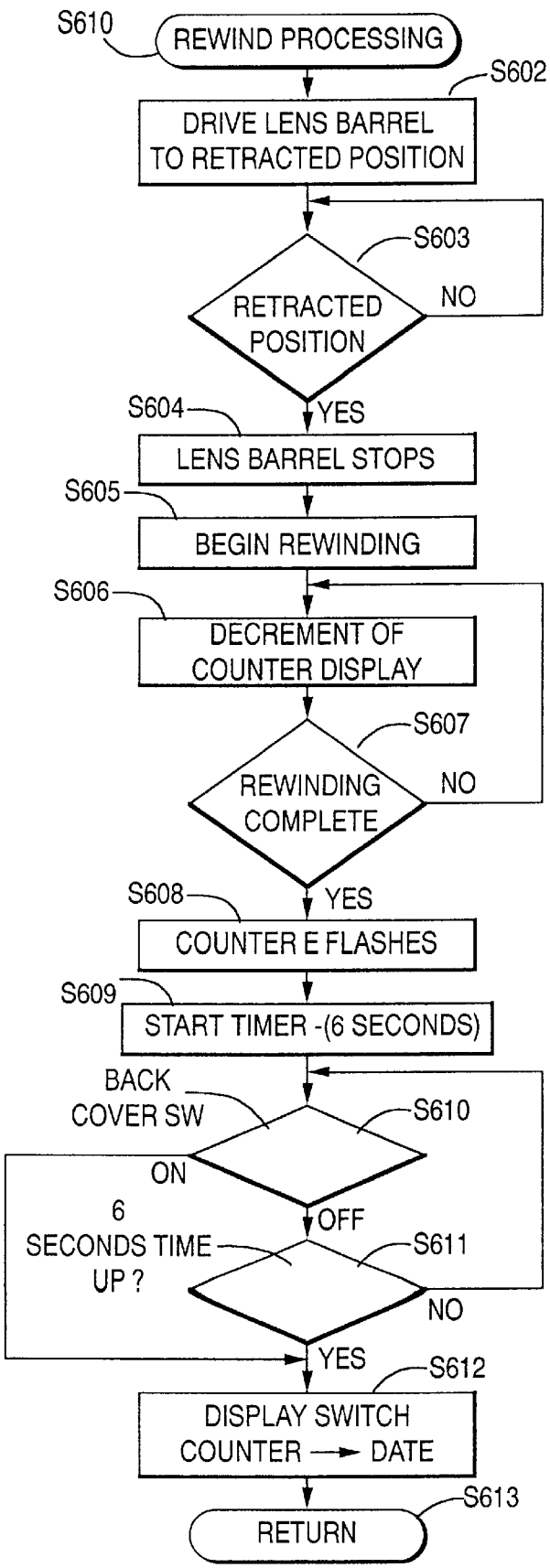
FIG. 11 is a flow chart of the rewind processing of FIG. 10.

Next, the details of the rewind processing subroutine at S548 in FIG. 10 will be explained by referring to the flow chart in FIG. 11. This processing begins from S610 and the lens barrel is driven to the retracted position at S602. At this time, microcomputer 1 controls lens barrel drive circuit 5, motor 6 is driven, and the lens barrel is moved to a position which is retracted into the camera body. It is determined at S603 whether or not the lens barrel has reached the retracted position and, when lens barrel position detection switch 26 goes ON based on the retraction up to the required position, the flow advances to S604 and the movement of lens barrel is terminated. Specifically, microcomputer 1 controls lens barrel drive circuit 5 and the movement of the lens barrel is suspended.

Next, the flow advances to S605 and film rewinding begins. At this time, microcomputer 1 controls winding circuit 9 and the film is rewound in the direction of being taken up by the cartridge. A decrement of the film frame number is executed at S606 and that value is displayed on LCD 4. This processing at S606 is repeated until it is determined at S607 that rewinding has been completed.

Specifically, microcomputer 1 monitors the status of film rewinding from the output of film frame feed detection circuit 14 and there is a decrement by one in the photographic frame number value for each frame of film that is rewound. Then, this photograph frame number is displayed on LCD 4. When the film reaches a state of having been fully taken into the cartridge (when the film is fully wound in the opposite direction), the flow advances from S607 to S608 and, as shown in FIG. 41, a flashing letter "E" is displayed in the film frame number display position.

By the display described above, the user can know that rewinding is proceeding correctly during the film rewinding operation by the orderly decrement by one of the photograph frame number for each frame and, moreover, the user can know that film rewinding has been completed when the display becomes E.

Next, the flow advances to S609 and a six second timer is started. Specifically, microcomputer 1 starts a built-in timer. It is determined whether back cover switch 29 is ON at S610 or whether the time of the six second timer is up at S611. If back cover switch 29 is ON, the film should be replaced and, because the back cover (not illustrated) of the camera body is open, the flow advances to S612 and the display on LCD 4 is switched from the frame number display state (state when the flashing letter "E" is displayed), to the date display state.

Even if it is determined at S611 that six seconds has elapsed prior to back cover switch 29 going ON, the flow advances to S612 and the display switch is executed. Then, rewind processing is competed at S613 and the flow returns to the flow chart in FIG. 10.

The preferred embodiment has an "active" mode representing a camera mode in which photographs can be taken, and an "inactive" mode which represents a camera mode in which photographs cannot be taken. In the above example, the active and inactive modes are determined by the position of the lens barrel (not illustrated) wherein the position of the lens barrel is detected by lens barrel position detection switch 26. When the lens barrel is in an extended position, the camera is considered to be in the "active mode" and when the lens barrel is in a retracted position, the camera is considered to be in the "inactive" mode.

However, it is also possible, for example, to provide a barrier in front of the photographic lens which opens and closes between a position that permits the incidence of light on the photographic lens and a position which prohibits the incidence of light wherein the camera mode is considered to be the "active" mode when this barrier is in the position that permits the incidence of light on the photographic lens, and the camera status is considered to be "inactive" mode when the barrier is in the position that prohibits this.

Also, it is possible to provide an operational switch that operates when the power source is ON or OFF; when the power source is turned ON by operating this operational switch, the camera is considered to be in active mode, and when the power source is OFF, the camera is considered to be in inactive mode.

There are many other variations for determining when the camera is in an active or inactive mode and it is not intended to limit the present invention to the methods or operations described herein.

The present invention can also be applied to a camera with a prewind system in which, when the film is set into the camera, the film is wound from the cartridge. Every time one photograph is taken, one frame of film is rewound into the cartridge.

Moreover, in the example above, when the camera is not a date body, the LCD display is canceled when in the inactive mode; however, it would also be possible not to cancel the display and to go between the display of the film frame number and the display of other data (such as photographic data).

In this embodiment, there is the effect that the status of blank feeding at the time of loading the film can be reliably confirmed because the date is displayed on LCD 4 prior to feeding blank film, and the display is switched from the date to the photograph frame number during blank feeding.

Also, there is the effect that the status of blank feeding at the time of loading the film can be reliably confirmed because the display is switched from the date display to the photograph frame number display when the back cover of the camera is closed.

When film is loaded in the camera, blank feed processing begins from S160 in FIG. 4, and at S162, the display of LCD 4 is switched from the date display state to the photograph frame number display state. Afterwards, film winding begins at S165, and when it is determined at S166 that four frames of film have been wound, winding is terminated at S169. The user can confirm the status of the four blank frames of film being fed because the photograph frame number is displayed when feeding blank film.

An embodiment as described above is characterized by providing LCD 4 to be a display means that is jointly used to display the date and the frame number wherein the photograph frame number is displayed when taking photographs and the date is displayed at other times. Winding circuit 9 is the blank feed means that feeds blanks of the film. Microcomputer 1 is the control means that displays the date on LCD 4 prior to feeding blank film by winding circuit 9 and that switches the display on LCD 4 from the date to the photograph frame number when feeding blank film.

In the above embodiment, it can be confirmed that blank film is being reliably fed because the date is displayed on LCD 4 before winding circuit 9 feeds blank film, and the display is switched to the frame number display after blank feeding begins.

In the above embodiment, microcomputer 1 reads the contents of data in EEPROM 32 and determines the information to be displayed on LCD 4 based on the contents of the data. In other words, data read from EEPROM 32 is decoded to determine if the data indicates the use of a date imprinting function. If the data indicates the use of a date imprinting function, the date imprinting function is activated.

With this camera, there is the effect that optional functions can be selected with the suitable types of data because LCD 4 can be switched based on data that is read from EEPROM 32.

In the above embodiment, data recorded in the EEPROM 32 is related to the date imprinting function; therefore, a camera that has this data recorded can execute date imprinting by reading this data, and a camera which does not have this data recorded will not execute date imprinting. Consequently, there are the effects that, except for EEPROM 32, common parts can be used for a camera having a date imprinting capability and a camera without a date imprinting ability. Therefore, there is minimal increase in cost because of date imprinting and the camera size is not increased.

The above embodiment allows a camera purchaser to select a camera which has a date imprinting function or a camera which does not have this function, with almost no enlargement of size or increase of costs in the camera.

EEPROM 32 is used as the means for the camera to have or not to have a date imprinting function. When data and programming, etc., to execute the date imprinting function is written in EEPROM 32, this information is read and executed by microcomputer 1. When this information does not express the date imprinting function, the camera will not be able to imprint the date.

Figure 15:
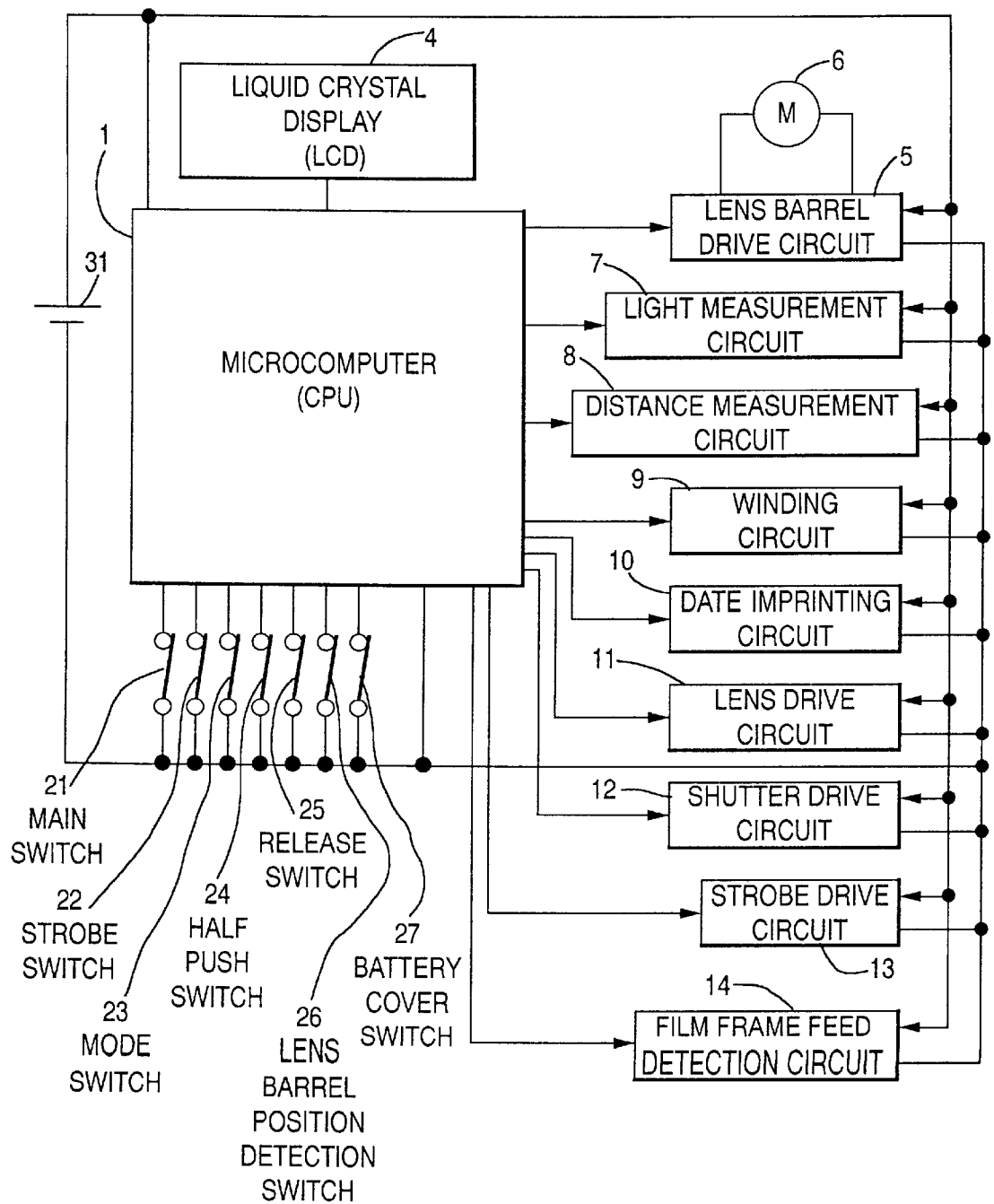
FIG. 15 is a block diagram of an additional embodiment of a hardware system for a camera in accordance with the present invention.

FIG. 15, which is similar to FIG. 1, is a block diagram indicating the hardware system for a preferred embodiment of a camera having a data imprinting function in accordance with the invention.

The following embodiment, based on the configuration in FIG. 15 and more fully discussed below, represents a camera equipped with a switching means for switching between a non-photographic state (an "inactive" state) and a photograph ready state (an "active" state), detection means for detecting the power source status, and display means for executing a display based on the output of the detection means. Moreover, the display means displays the power source status irrespective of whether the camera is in the active or inactive mode.

In FIG. 15, main switch 21, strobe switch 22, mode switch 23, half push switch 24, release switch 25 and lens barrel position detection switch 26 are connected as switches to microcomputer 1.

Moreover, LCD 4, lens barrel drive circuit 5, light measurement circuit 7, distance measurement circuit 8, winding circuit 9, and date imprinting circuit 10 are connected to microcomputer 1.

Lens drive circuit 11 drives the lens (not illustrated) corresponding to the commands from microcomputer 1. Shutter drive circuit 12 drives a shutter (not illustrated) corresponding to the commands from microcomputer 1. Strobe drive circuit 13 drives the strobe (not illustrated) corresponding to the commands from microcomputer 1. Film frame feed detection circuit 14 detects that one frame of film has advanced, or that rewinding the film into the cartridge has been completed.

Microcomputer 1 is a one chip microcomputer, and controls all sequences of the camera. Furthermore, it has a function to drive LCD 4.

Figure 16:
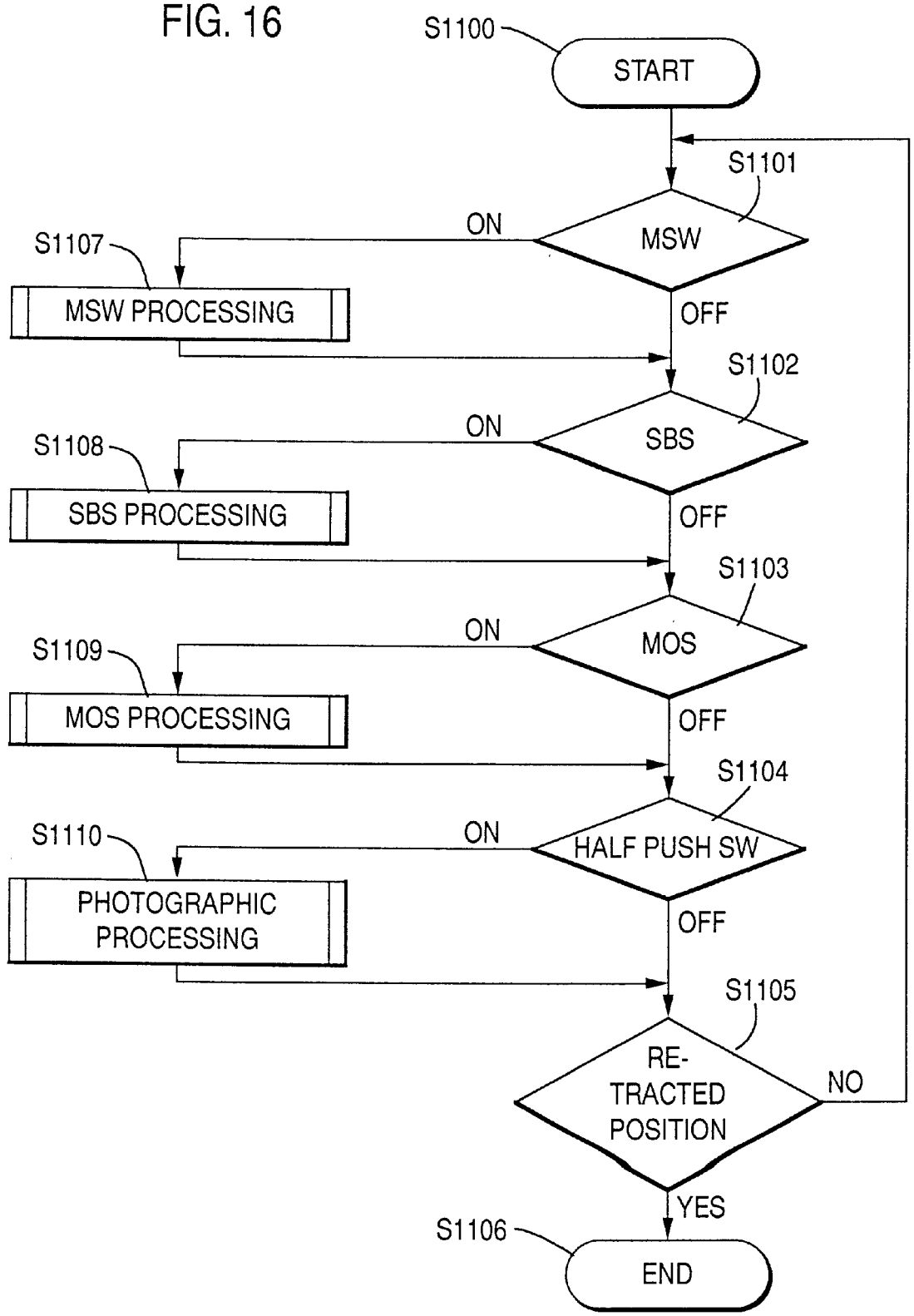
FIG. 16 is a flow chart of the overall operation of the system in FIG. 15.

FIG. 16 is a flow chart which explains the operations of the embodiment of FIG. 15. Battery 31 is already installed and processing begins from S1100.

If it is detected at S1101 that main switch 21 is ON, flow branches to S1107, and main switch processing is executed.

If it is detected at S1102 that strobe switch 22 is ON, the flow branches to S1108 and strobe switch processing is executed. When it is detected at S1103 that mode switch 23 is ON, flow branches to S1109 and mode switch processing is executed. When it is detected at S1104 that half push switch 24 is ON, flow branches to S1110 and photographic processing is executed.

It is determined at S1105 whether or not the lens barrel is in the retracted position based on lens barrel position detection switch 26. If the lens barrel is not in the retracted position, flow returns to S1101; and if the lens barrel is in the retracted position, flow advances to S1106 and ends.

Next, the processing of each subroutine in the flow chart of FIG. 16 will be explained.

Figure 17:
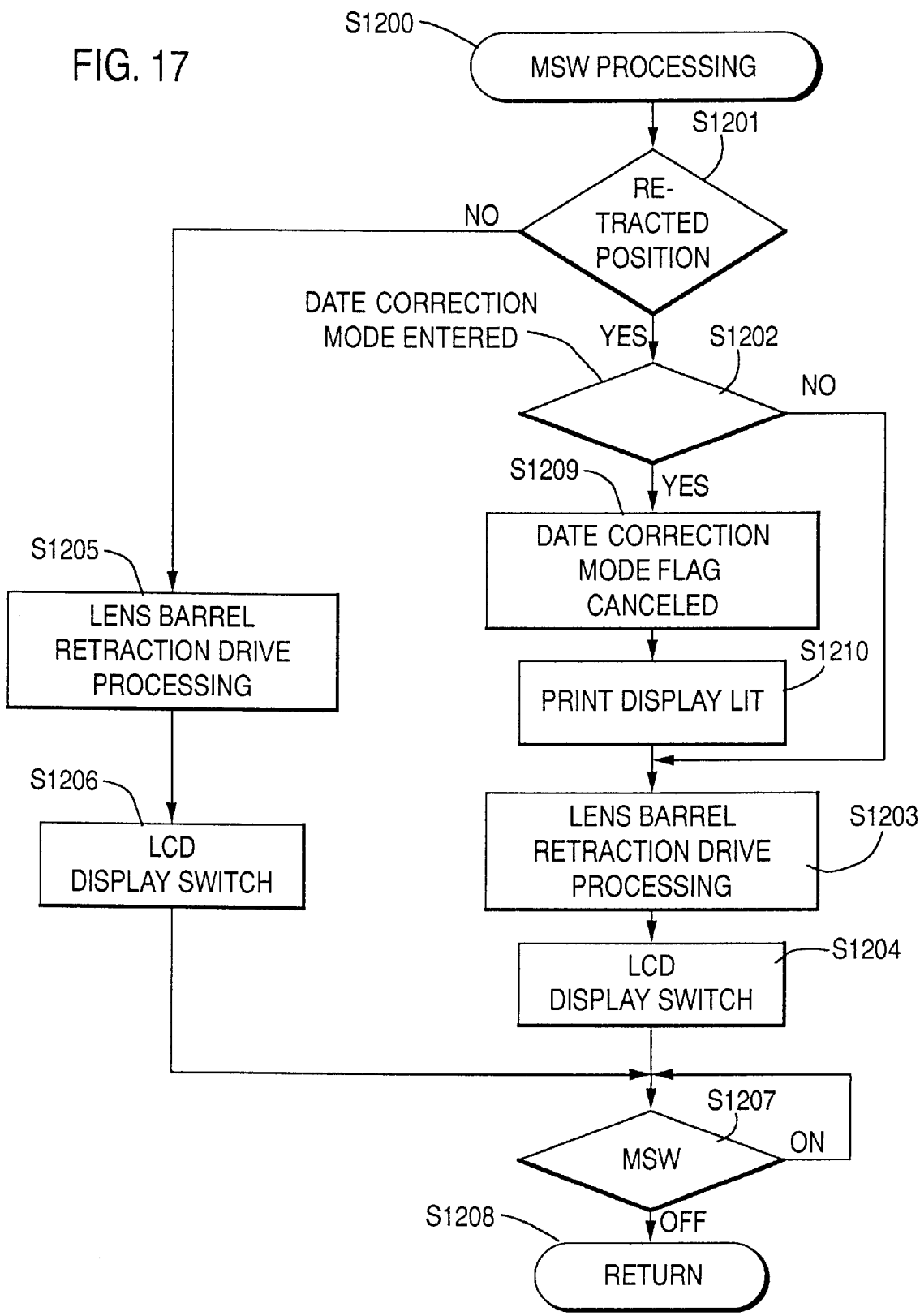
FIG. 17 is a flow chart of the MSW processing of FIG. 16.

FIG. 17 is a flow chart indicating the main switch processing at S1107 in the flow chart of FIG. 16.

Main switch processing starts at S1200 and the status of lens barrel position detection switch 26 is detected at S1201.

When the lens barrel is in the retracted position, the flow advances to S1202 and it is determined whether or not the date correction mode has been entered. If the date correction mode has been entered, the date correction mode flag is canceled at S1209. Then, print mark PD (See FIG. 38) is lit at S1210 and the system is in a date imprinting state.

Next, at S1203, microcomputer 1 drives motor 6 through lens barrel drive circuit 5 and, after the lens barrel has been extended to the photographic position, at S1204 the photographic mode is displayed on LCD 4 (see FIG. 38). Then, the operation sequence determines the status of the main switch 21 at S1207.

If it is determined at S1201 that the lens barrel is not in the retracted position, motor 6 is driven at S1205 by lens barrel drive circuit 5, and the lens barrel is withdrawn to the retracted position. The date imprinting data is displayed on LCD 4 at S1206 (the date of 93 (year) 10 (month) (M) 25 (day) is displayed in FIG. 39). Afterwards, the operation sequence determines the status of main switch 21 processing at S1207.

In S1207, the system waits for main switch 21 to go OFF and, when main switch 21 goes OFF, the flow return from S1208 to the flow chart of FIG. 16.

Figure 18:
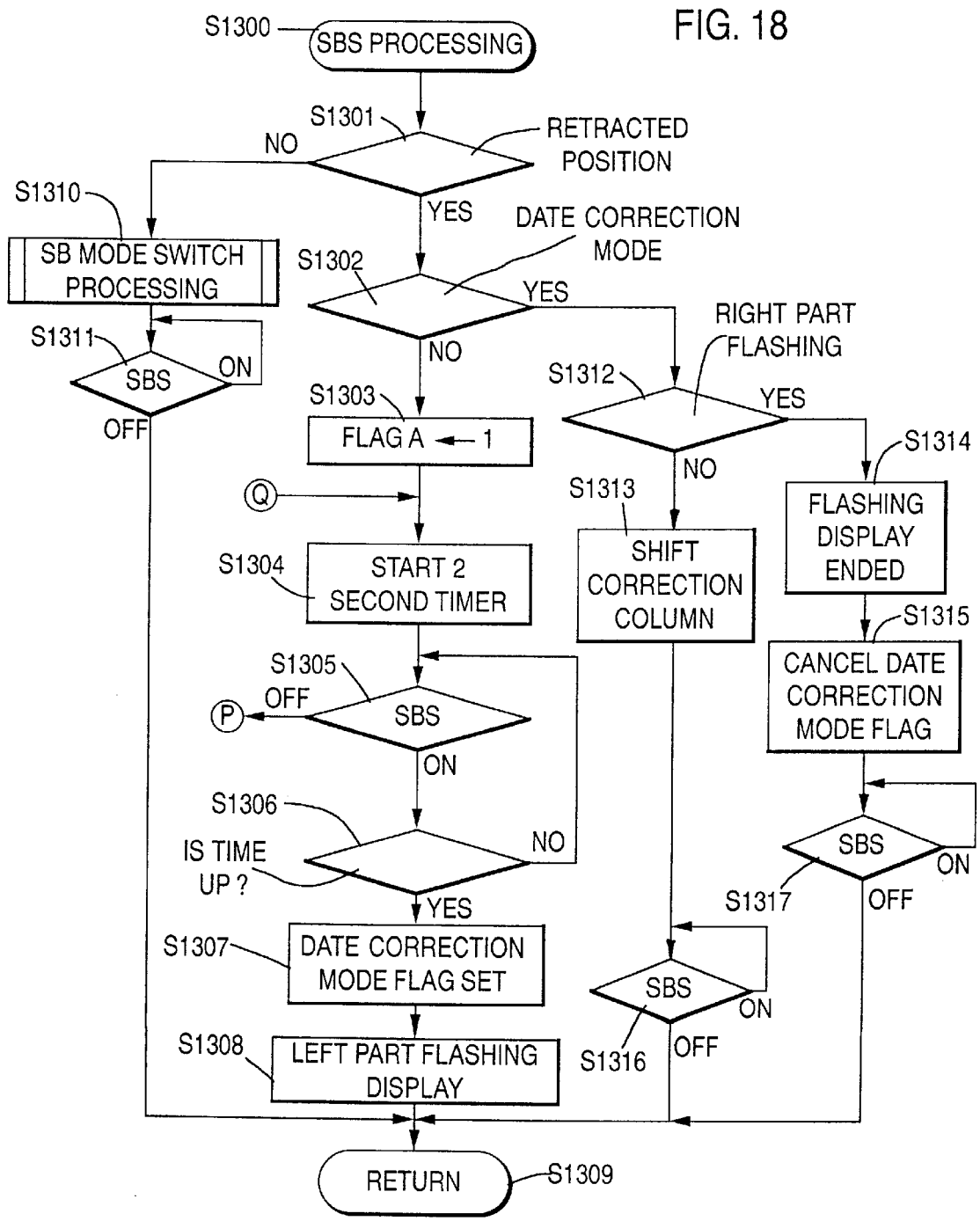
FIG. 18 is a flow chart of the SBS processing of FIG. 16.
Figure 19:
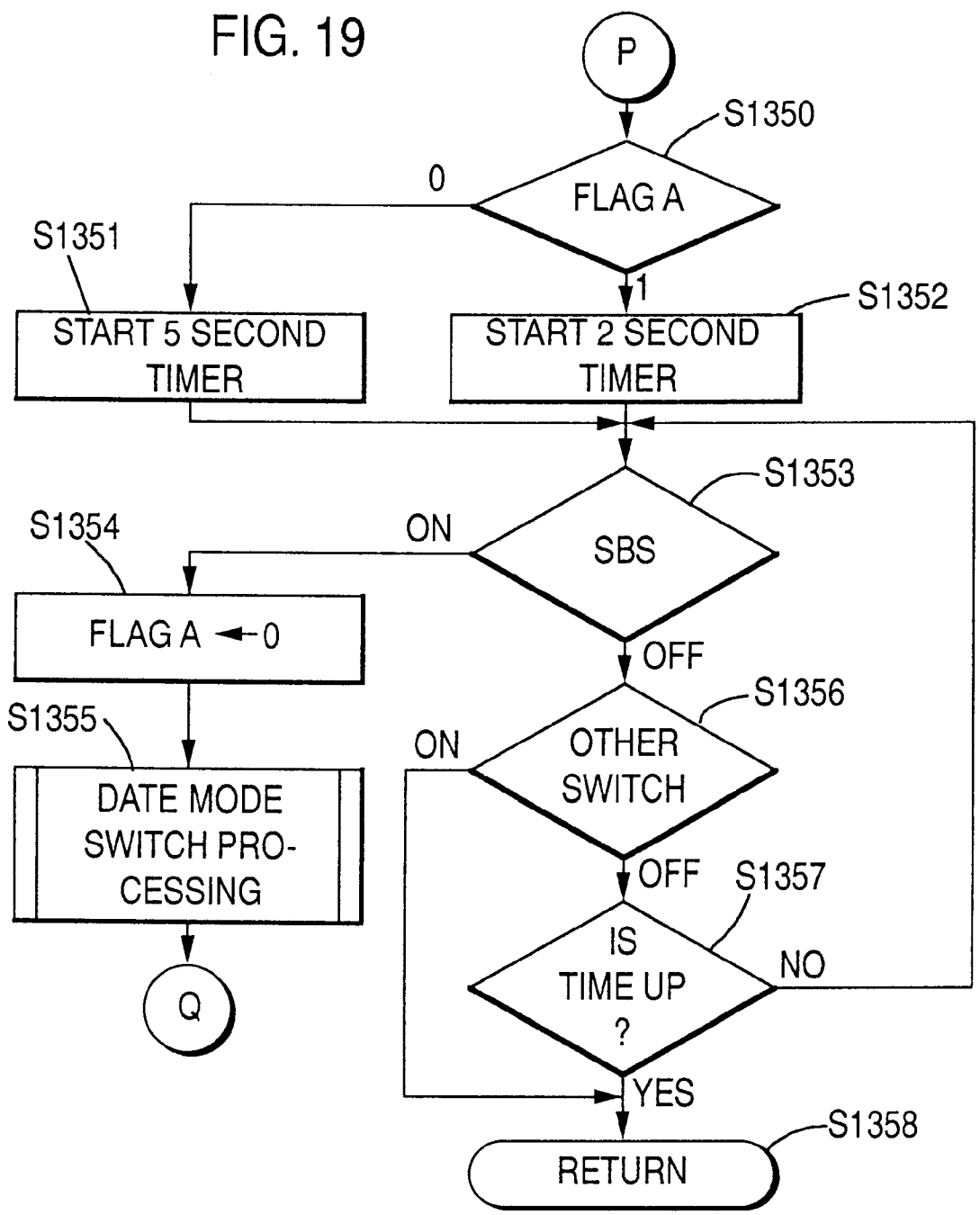
FIG. 19 is a continuation of the flow chart in FIG. 18.

FIG. 18 and FIG. 19 are flow charts to indicate the strobe switch processing at S1108 in the flow chart of FIG. 16.

Strobe switch processing starts from S1300. It is determined at S1301 whether or not the lens barrel is in the retracted position by detecting the status of lens barrel position detection switch 26.

If the lens barrel is not in the retracted position, the flow advances to S1310, and SB modes (strobe modes) are switched. As previously discussed, there are five SB modes: automatic flash mode, red eye reduction mode, flash prohibit mode, forced flash mode, and slow syncro. If the mode was the automatic flash mode, it is switched to the red eye reduction mode; if the mode was the red eye reduction mode, it is switched to the flash prohibit mode; if the mode was the flash prohibit mode, it is switched to the forced flash mode; if the mode was the forced flash mode, it is switched to slow syncro; and if the mode was slow syncro, it is switched to the automatic flash mode. Afterwards, the flow is transferred to S1311 and the system waits for strobe switch 22 to go OFF. When strobe switch 22 goes OFF, the flow returns from S1309 to the flow chart of FIG. 16.

If the lens barrel is in the retracted position at S1301, the flow advances to S1302 and it is confirmed whether or not the date correction mode has already been entered. If the date correction mode has not already been entered, the system is in selection mode. At this time, the flow advances to S1303 and flag A is set (becomes "1"), indicating that the action of pushing strobe switch 22 has occurred one time.

Then, the two second timer built into microcomputer 1 starts at S1304 and it is confirmed at S1305 whether or not strobe switch 22 continues to be held ON. Specifically, after the two second timer has started, it is determined at S1305 whether or not strobe switch 22 has gone OFF, and if it is OFF, the flow advances to S1350 in FIG. 19. If switch 22 continues to be ON, it is determined at S1306 whether or not the time is up. If the time is not up, the flow circulates in the loop of S1305 and S1306.

If the time of the timer is up at S1306 (when strobe switch 22 has been held ON for two seconds or more), the date correction mode flag is set at S1307 (it is the status of this flag that is later determined when the flow again advances to S1302). While the correction mode flag is set, the system is in the date correction mode. After this, the flow advances to S1308 and the left part of LCD 4 begins a flashing display.

The date displayed on LCD 4 is displayed in the three blocks of the left part, the middle part, and the right part, and each of these blocks displays two columns of decimal numbers (refer to FIGS. 44(a), 44(b) and 44(c)). Corrections are made in the order of the left part, the middle part, and the right part. When the correction mode has been entered, the left part flashes first, and this indicates that the left part can be corrected. For example, if the selected mode is "year-month-day," the left part will display the "year," the middle part will display the "month," and the right part will display the "day." When the date correction mode has been entered, the "year" of the left part will flash first ("'89" in FIG. 44(A)), indicating that the year can be corrected.

If it is determined at S1302 that the date correction mode has already been entered, the flow advances to S1312. It is confirmed at S1312 whether or not the right part ("24" in FIG. 44(C)) is flashing. If the right part is flashing, this signifies that all parts have already been corrected. The flashing display of LCD 4 is ended at S1314 and the date correction mode flag is canceled at S1315. By doing this, the system exits the date correction mode. Afterwards, the system waits at S1317 for strobe switch 22 to go OFF. When strobe switch 22 goes OFF, the flow returns from S1309 to the flow chart of FIG. 16.

If the right part is not flashing at S1312, the correction column (flashing position) is shifted. If the left part ("'89" in FIG. 44(A)) is flashing, the flashing display is shifted to the middle part ("M12" in FIG. 44(B)), and if the middle part is flashing, the flashing display is switched to the right part ("24" in FIG. 44(C)). Afterwards, the system waits at S131 6 for strobe switch 22 to go OFF, and when strobe switch 22 goes OFF, the flow returns from S1309 to the flow chart of FIG. 16.

If strobe switch 22 is OFF at S1305 (if, after strobe switch 22 has gone ON one time, it goes OFF before a two second interval has elapsed), the flow advances to S1350 in the flow chart of FIG. 19. There, it is determined whether flag A is "0" or "1," and if it is "0" (flag A is reset to "0" at S1354 when strobe switch 22 is turned ON a second time during the two second interval), the five second timer is started at S1351, the flow enters the loop of S1353, S1356, and S1357, and the system waits for strobe switch 22 to go ON.

If flag A is "1" at S1350 (if strobe switch 22 has only gone ON and OFF one time), the two second timer is started at S1352, the operation sequence enters the loop of S1353, S1356, and S1357, and the system waits for the next strobe switch 22 to go ON.

In the loop of S1353, S1356 and S1357, if strobe switch 22 goes ON again within five seconds or within two seconds, the flow advances to S1354, flag A is set to "0," and date mode switch processing is executed at S1355.

As previously discussed, there are five date modes: "year-month-day," "month-day-year," "day-month-year," "day-hour-minute," and "OFF." If the date was "year-month-day," it is switched to "month-day-year"; if the date was "month-day-year," it is switched to "day-month-year"; if the date was "day-month-year," it is switched to "day-hour-minute"; if the date was "day-hour-minute," it is switched to "OFF." Afterwards, the flow returns to S1304, and the two second timer is started (the timer for whether or not the correction mode is entered). Following this, the operation sequence advances to S1305 and returns to the operations from S1305 that were described above.

Moreover, in the loop of S1353, S1356 and S1357, if another switch (main switch 21, etc.) goes ON at S1356, the flow returns from S1358 to the flow chart of FIG. 16. Also, if strobe switch 22 is not pressed and the time on the five second timer (S1351) or the two second timer (S1352) has lapsed at S1357, the operation sequence returns from S1358 to the flow chart of FIG. 16.

Figure 20:
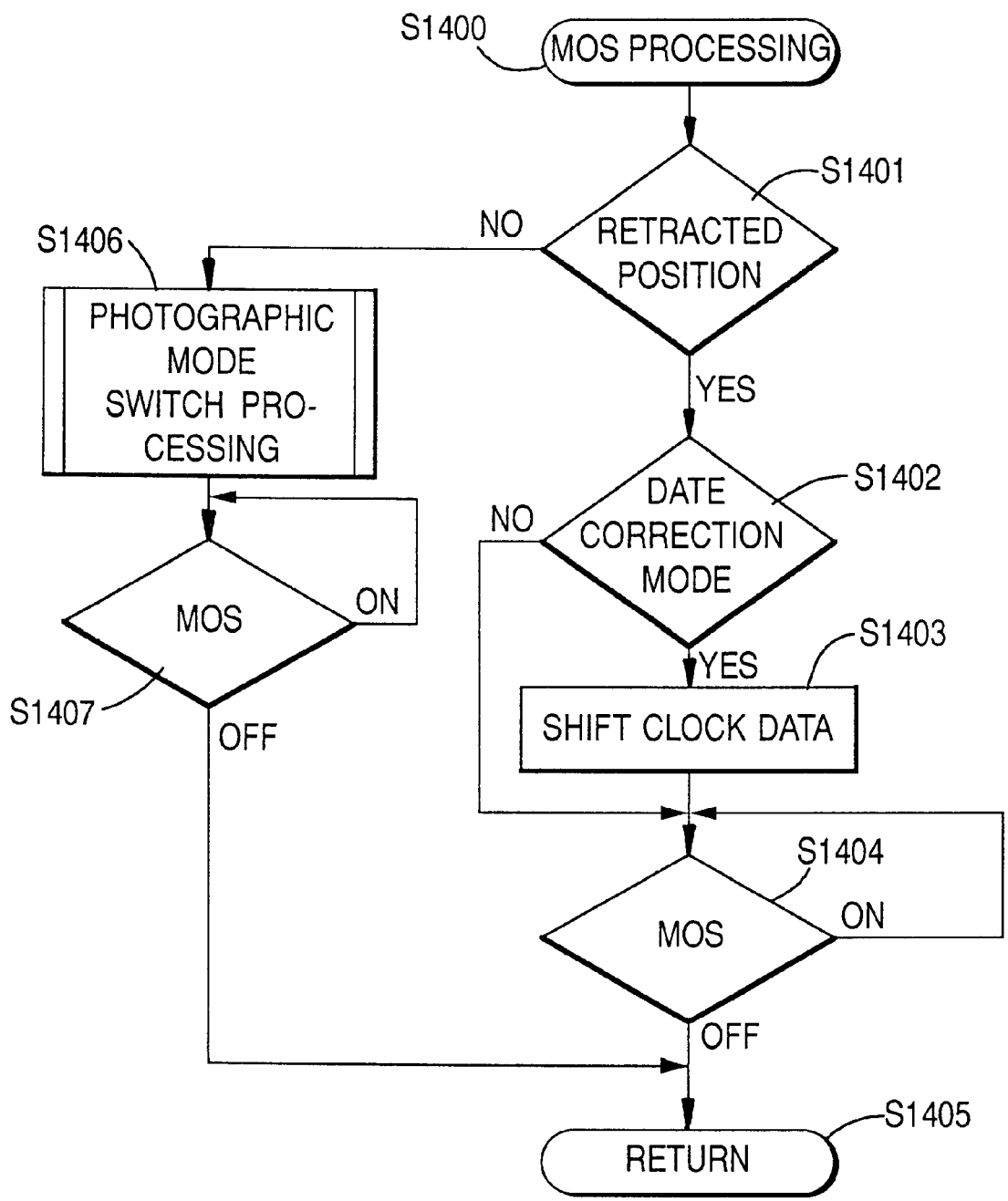
FIG. 20 is a flow chart of the MOS processing of FIG. 16 and FIG. 31.

FIG. 20 is a flow chart indicating the mode switch processing (MOS processing) at S1109 in the flow chart of FIG. 16.

Mode switch processing starts from S1400. It is confirmed whether or not the lens barrel is in the retracted position by reading the status of lens barrel position detection switch 26 at S1401. If the lens barrel is not in the retracted position, the flow advances to S1406, and the system switches photographic mode.

There are four photographic modes: ordinary photography (cancel) mode, forced infinity mode, single self mode, and double self mode; and they are switched in that order by turning ON mode switch 23.

In the forced infinity mode, when the release button is fully pressed, the focusing lens (aperture) is set to infinity and the shutter is operated. In single self mode, a fixed amount of time elapses after the release button is fully pushed and before the shutter operates. In double self mode, self photography is executed two times. In cancellation mode, normal photography is executed.

Afterwards, the flow advances from S1406 to S1407 and the system waits for mode switch 23 to go OFF, and when mode switch 23 goes OFF, the flow returns from S1405 to the flow chart of FIG. 16.

When it has been determined at S1401 that the lens barrel is in the retracted position, it is confirmed whether or not the correction mode has already been entered at S1402 (in the retracted state, when strobe switch 22 is ON for two seconds or more, the correction mode is set at S1307 of FIG. 18 and the correction mode is canceled at S1315 after correction of the right part has been completed).

When the correction mode has not been entered, the flow advances to S1404 and the system waits for mode switch 23 to go OFF. When mode switch 23 goes OFF, the flow returns from S1405 to the flow chart of FIG. 16.

When the correction mode is entered at S1402, the clock data is shifted at S1403. One (or −1) is added to the data ("year," "month," "day," "hour" or "minute") of the block among the left part, the middle part or the right part that is flashing at that time. For example, when the display mode is year-month-day as in FIG. 47(a), and the "year" of the left part is set to the year '88 and is flashing, the year "'88" is switched to "'89" (or "87") and the display flashes (FIG. 47(b)). Afterwards, it is confirmed at S1404 that mode switch 23 is OFF and the flow returns from S1405 to the flow chart of FIG. 16.

Figure 21:
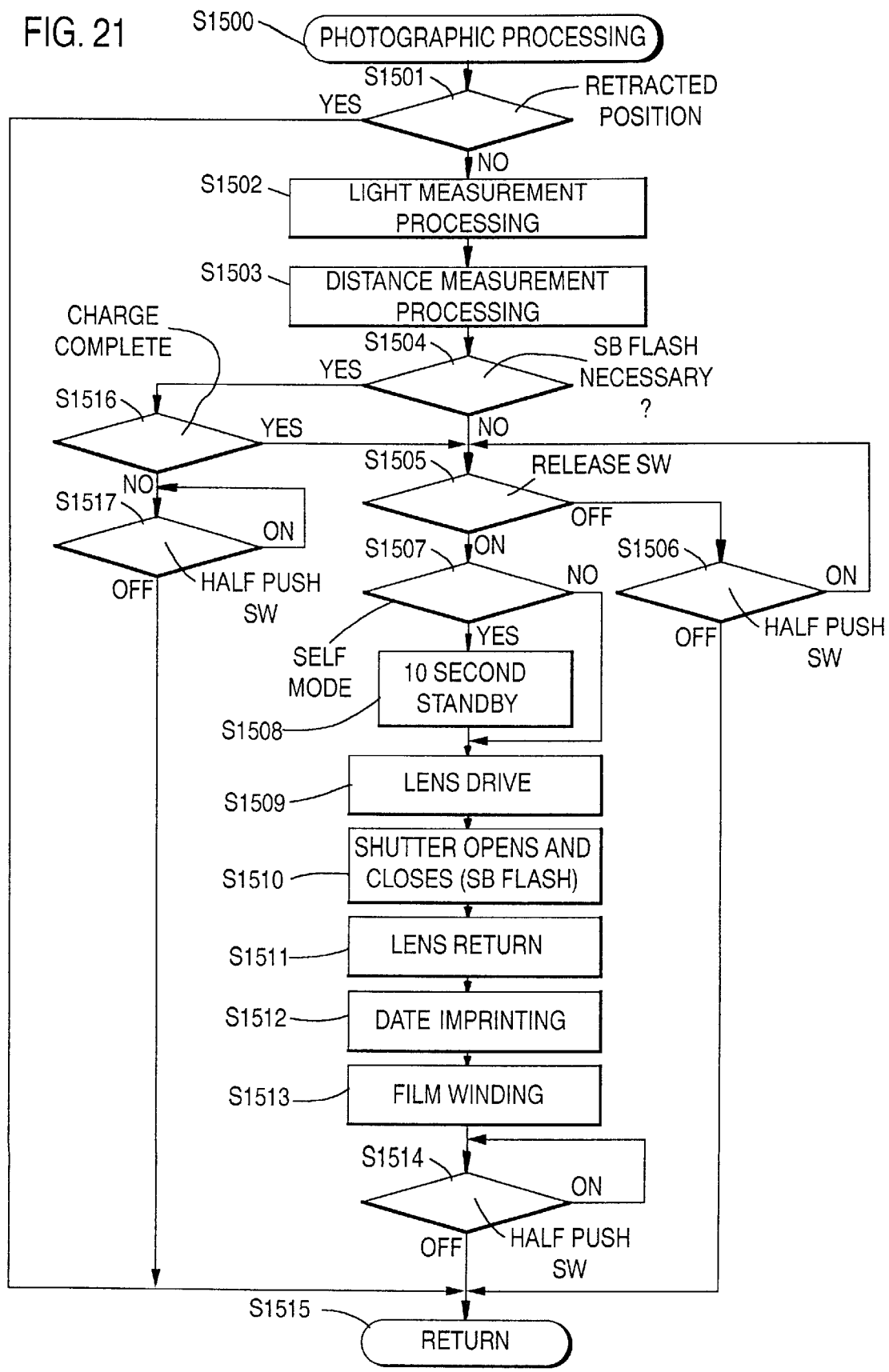
FIG. 21 is a flow chart of the photographic processing of FIG. 16.

Next, the details of the subroutine for the photographic processing in S1110 of FIG. 16 will be explained by referring to the flow chart in FIG. 21. This processing begins from S1500. It is determined at S1501 whether or not the lens barrel is in the retracted position. When the lens barrel is in the retracted position, lens barrel position detection switch 26 is ON. At this time, taking photographs is prohibited and the flow advances to S1515. After photographic processing is completed, the flow returns to the flow chart of FIG. 16.

If it is determined at S1501 that lens barrel position detection switch 26 is OFF (if the lens barrel is in the extended position), the flow advances to S1502 and light measurement processing is executed.

Subsequently, the flow advances to S1503 and distance measurement processing is executed.

It is determined at S1504 whether or not it was decided at S1502 that a strobe flash is necessary. If it was decided that a strobe flash is necessary, the flow advances to S1516, and it is determined whether or not charging of the strobe has been completed. If charging has not been completed, the strobe cannot be flashed. For this reason, the flow advances to S1517 and the system goes into standby until half push switch 24 goes OFF (the release button is released) and, when half push switch 24 goes OFF, the flow returns from S1515 to the flow chart of FIG. 16.

If the charging of the strobe has already been completed, the flow advances from S1516 to S1505. Even if it is decided at S1504 that a strobe flash is not necessary, the flow advances to S1505. It is determined at S1505 whether or not release switch 25 is ON.

When it is determined at S1505 that release switch 25 is OFF, the flow advances to S1506 and it is determined whether or not half push switch 24 is ON. If half push switch 24 is ON, the flow returns to S1505 and processing to determine whether or not release switch 24 is ON is executed.

Specifically, the processing of S1505 and S1506 is repeated based on the release button (not illustrated) being in the half push state.

When half push switch 24 goes OFF (the half push state of the release button is canceled), the flow returns from S1515 to the flow chart of FIG. 16.

If it is determined at S1505 that release switch 25 is ON, the flow advances to S1507. It is determined whether or not the self mode is set, and if the self mode is set, the flow advances to S1508 and the system enters standby for 10 seconds. If the self mode is not set, the processing of S1508 is skipped.

Next, the flow advances to S1509, and lens drive processing is executed. Next, the opening and closing action of the shutter is executed at S1510 and, if it is necessary to use the strobe, the strobe drive is executed simultaneously.

After the strobe has flashed, the strobe begins to be charged and, when charging is complete, charging is terminated.

Next, the flow advances to S1511, and lens return processing is executed. Specifically, microcomputer 1 controls lens drive circuit 11 and the photographic lens is returned to the original position.

Date imprinting processing is executed at S1512. When the command to imprint the date is given at S1209 in FIG. 17, microcomputer 1 generates the date data that was obtained as a result of keeping time by a built-in clock device (this date data is displayed on LCD 4) to date imprinting circuit 10, and this data is imprinted on the film.

In this embodiment, the date is imprinted before winding one frame of film, but it is also possible to imprint the date in dot form during film winding (feeding) by, for example, the flashing of multiple LED's (not shown in diagrams).

Next, the flow advances to S1513 and film winding processing is executed. Specifically, at this time, microcomputer 1 controls winding circuit 9 and film winding begins.

Next, the flow advances to S1514 and the system enters standby until half push switch 24 goes OFF (enters standby until the pushing pressure on the release button is canceled). When half push switch 24 goes OFF, the flow advances to S1515 and returns to FIG. 16.

In the above embodiment, the position of the lens barrel is detected by lens barrel position detection switch 26, and when the lens barrel is in an extended position, the mode status is taken to be the active state mode and when the lens barrel is in the retracted position, the mode status is taken to be the inactive mode. However, other than this (as previously discussed), it is also possible, for example, to provide a barrier prior to the photographic lens which opens and closes between a position that permits the incidence of light on the photographic lens and a position which prohibits this, and the status of the camera mode is taken to be the active mode when this barrier is in the position that permits the incidence of light on the photographic lens, and the mode is taken to be the inactive mode when the barrier is in the position that prohibits this.

Also, it is possible to provide an operational switch that operates when the power source is ON or OFF; when the power source is turned ON by operating this operational switch, the mode status is active, and when the power source is OFF, the mode status is inactive.

In addition, the present invention can also be applied to a camera with a prewind system in which, when the film is set into the camera, the film is wound from the cartridge, and every time one photograph is taken one frame of film is rewound into the cartridge.

The present invention as described above has the effect that data can be recorded even if a photograph is taken while forgetting to cancel the correction mode, or even if the correction mode was unintentionally set, because the data is recorded when the photographic operation is conducted even if the mode is the correction mode.

In a camera with a data imprinting function equipped with imprinting means for imprinting data on the storage media (e.g., film), a correction mode that can correct the data, and photographic initiation means for beginning the photographic action, the imprinting means is configured to imprint the data when the photographic action is begun during the correction mode.

Figure 22:
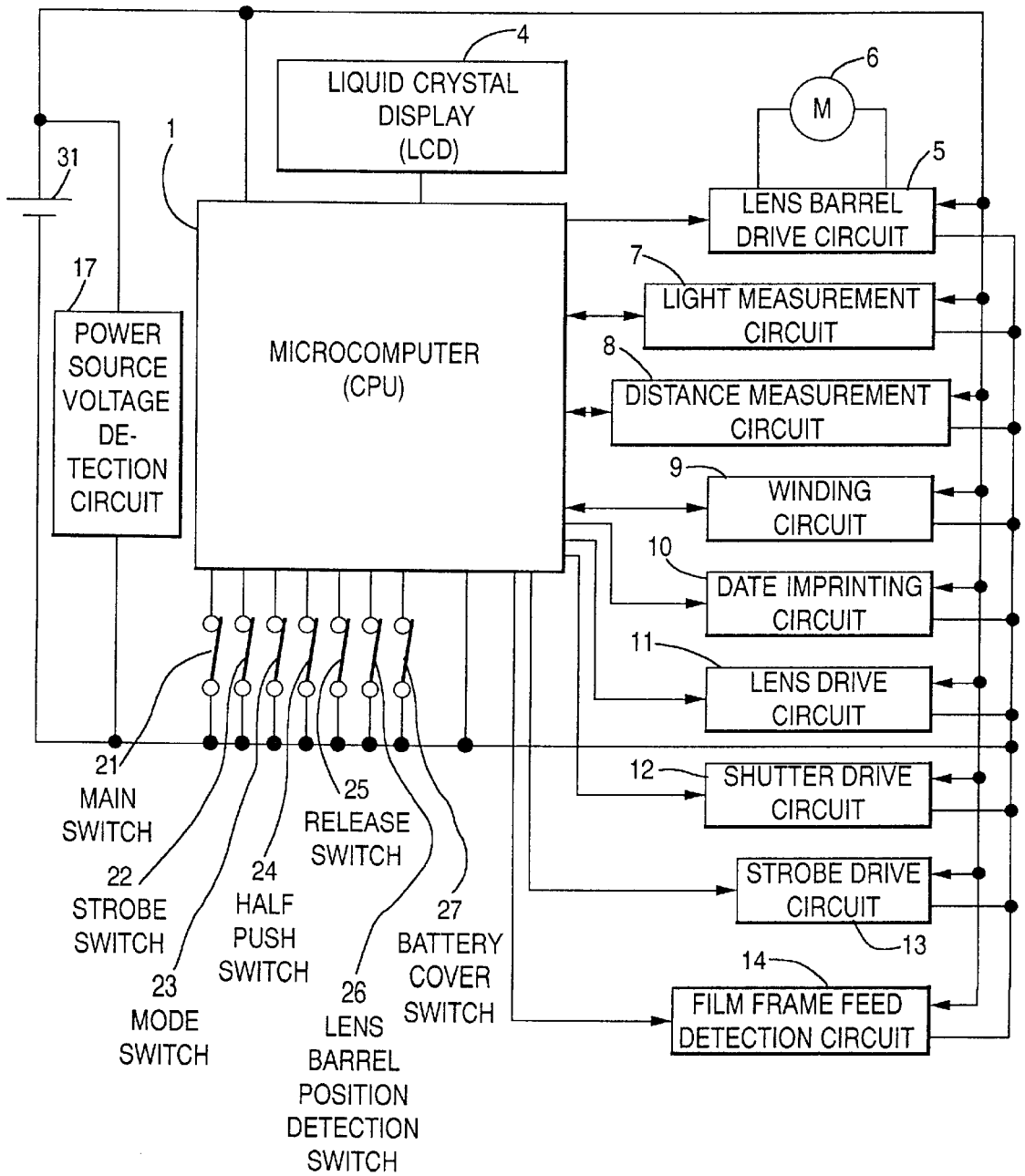
FIG. 22 is a block diagram of an alternate embodiment of a hardware system for a camera in accordance with the present invention.

FIG. 22 represents an embodiment of the present invention in which a camera displays the power source consumption status and wherein the photographer can always confirm the power source consumption status because the power source consumption status is displayed irrespective of whether it is the non-photographic state or the photograph ready state.

The embodiment of FIG. 22 has many of the same elements as in the embodiments of FIG. 1 and FIG. 15, with the addition of power source voltage detection circuit 17 for detecting the voltage of battery 31. Previously described elements will not be re-described here.

Figure 23:
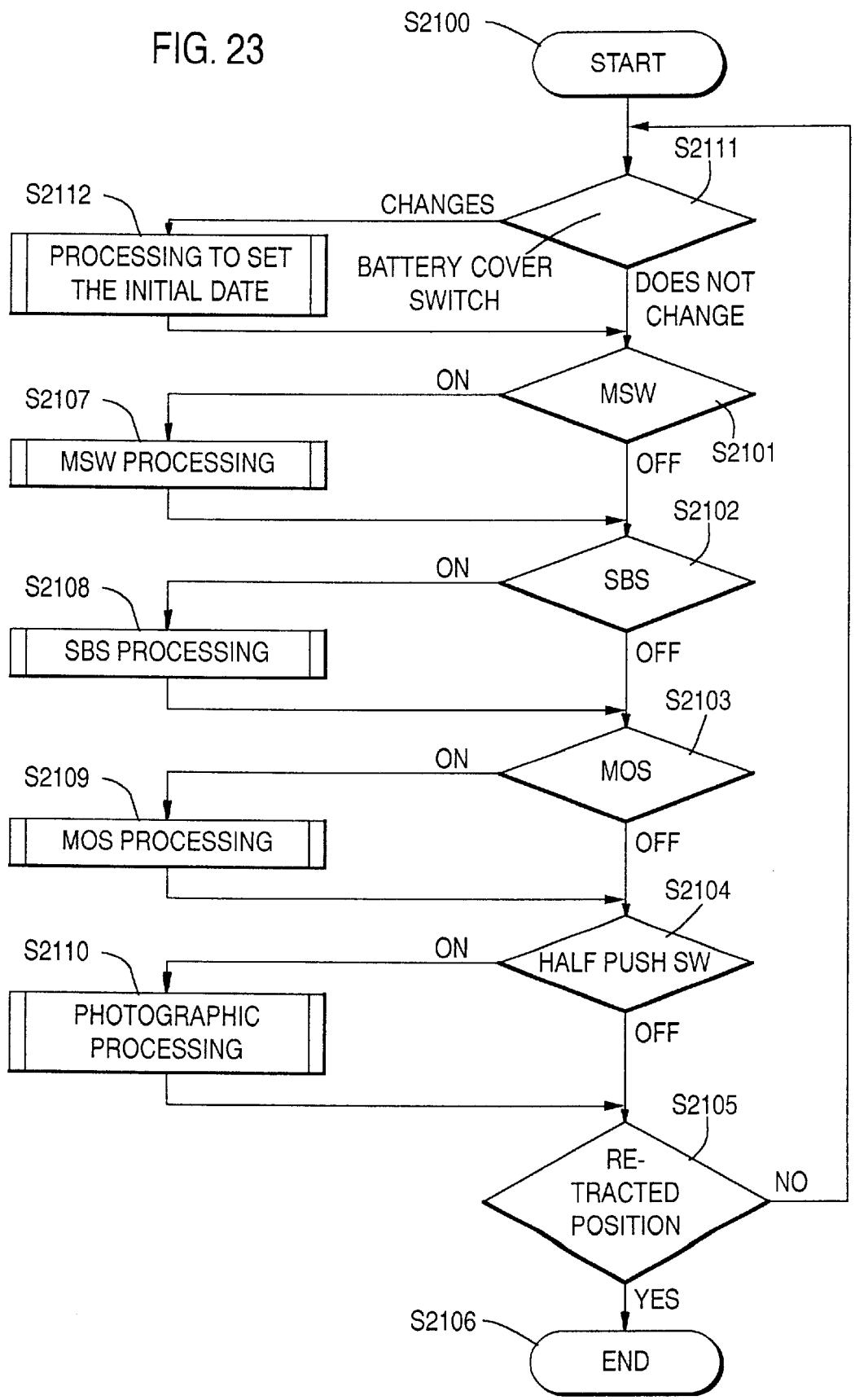
FIG. 23 is a flow chart of the overall operation of the system in FIG. 22.

FIG. 23 is a flow chart to explain the operational sequence of the embodiment of FIG. 22.

Processing begins from S2100. At S2111, the battery is installed, and when battery cover switch 29 goes ON (changes), the flow branches to S2112 and processing to set the initial date is executed.

If it is detected at S2101 that main switch (MSW) 21 is ON, the flow branches to S2107 and main switch processing (MSW processing) is executed.

If it is detected at S2102 that strobe switch (SBS) 22 is ON, the flow branches to S2108 and strobe switch processing (SBS processing) is executed. When it is detected at S2103 that mode switch (MOS) 23 is ON, the flow branches to S2109 and mode switch processing (MOS processing) is executed. When it is detected at S2104 that half push switch 24 is ON, the flow branches to S2110 and photographic processing is executed.

It is determined at S2105 whether or not the lens barrel is in the retracted position based on lens barrel position detection switch 26; if the lens barrel is not in the retracted position, the flow returns to S2111; if the lens barrel is in the retracted position, the flow advances to S2106 and ends.

Next, the processing of each subroutine in the flow chart of FIG. 23 will be explained.

Figure 24:
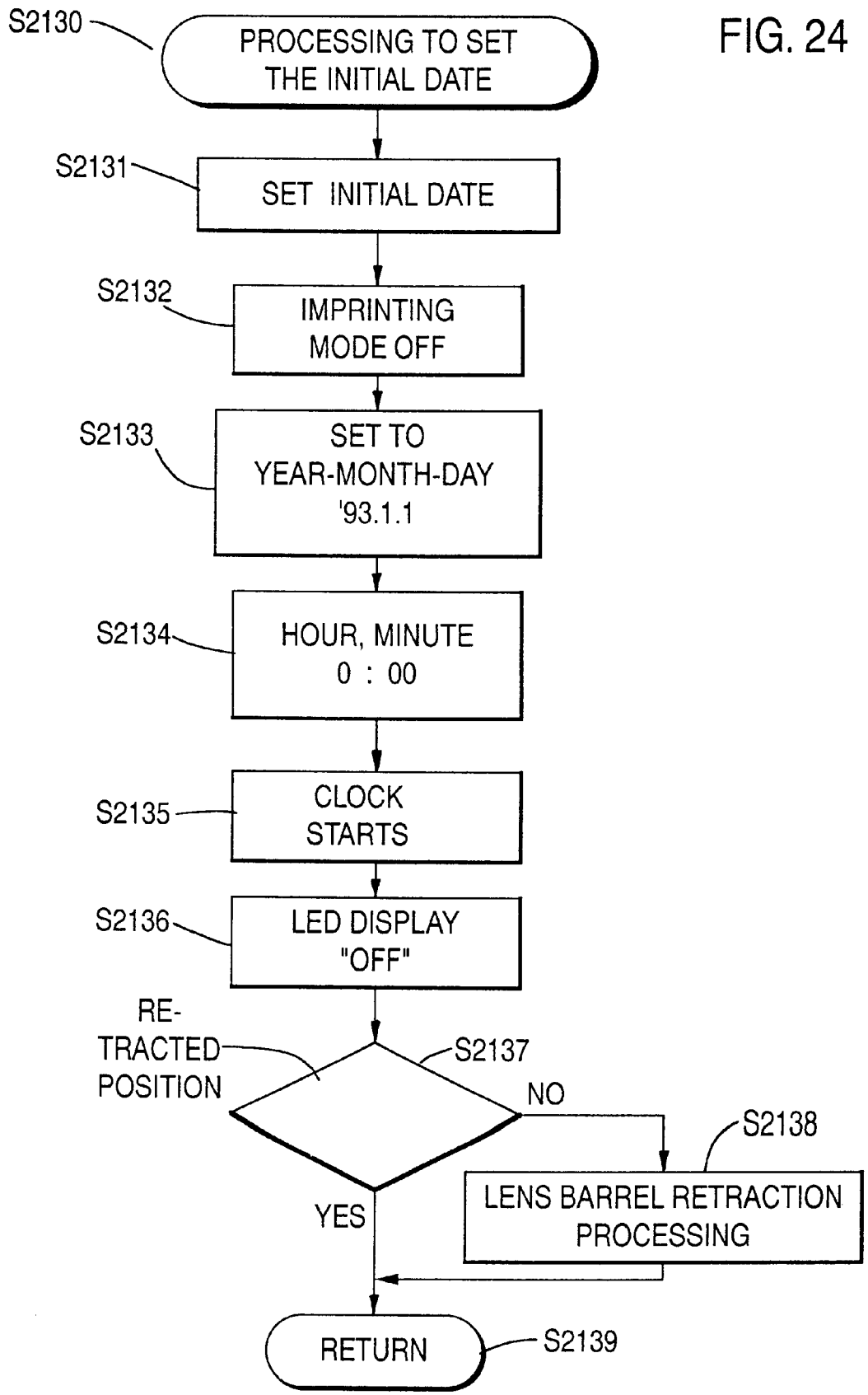
FIG. 24 is a flow chart of the processing to set the initial date of FIG. 23.

FIG. 24 is a flow chart indicating the processing to set the initial date at S2112 in the flow chart of FIG. 23.

Processing to set the initial date starts from S2130 in FIG. 24 and processing to set the initial data by which the timer and the flag are initially set is executed at S2131. The imprinting mode is turned OFF at S2132.

Next, the date calendar is initially set at S2133 to the stipulated year-month-day (in this example, Jan. 1, 1993); the clock is initially set at S2134 to the stipulated time (in this example, 0:00); and the clock begins at S2135.

Then, LCD 4 is turned OFF at S2136 and it is confirmed whether or not the lens barrel is in the retracted position at S2137. If the lens barrel is not in the retracted position, after the processing to withdraw the lens barrel at S2138, the operation sequence returns from S2139 to the processing of FIG. 23. If the lens barrel is in the retracted position at S2137, the operation sequence immediately returns to the processing of FIG. 23.

Figure 25:
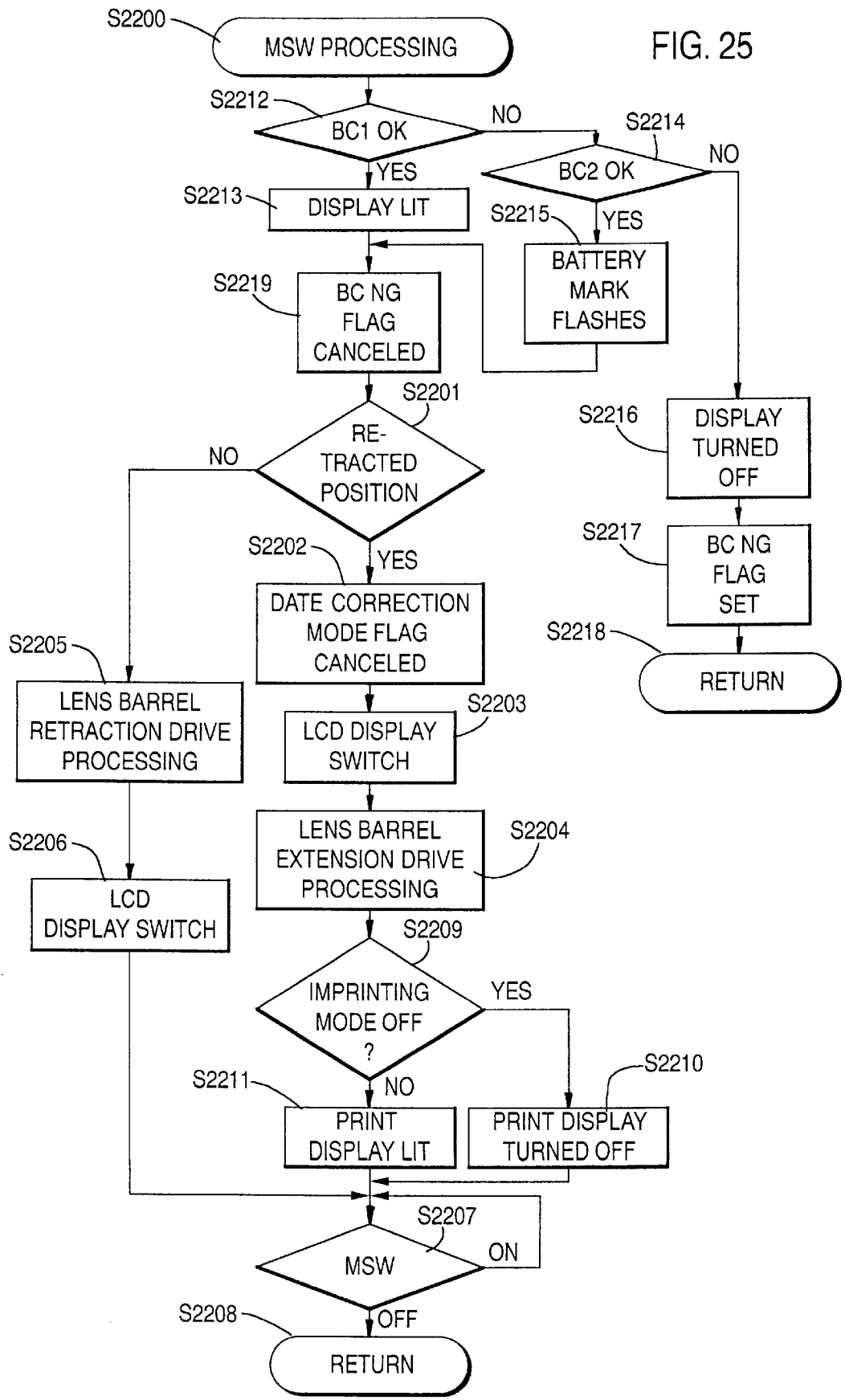
FIG. 25 is a flow chart of the MSW processing of FIG. 23.

FIG. 25 is a flow chart indicating the main switch processing (MSW processing) at S2107 in the flow chart of FIG. 23.

Main switch processing starts from S2200 and the power source voltage level is first confirmed at S2212 by power source voltage detection circuit 17. At S2212, it is determined whether or not the voltage level is at a first voltage or more. If it is the first voltage or more, the operation sequence advances to S2213; and if it is lower than the first voltage, the operation sequence advances to S2214.

At S2213, the counter display is lit on LCD 4 and the operation sequence advances to S2219.

It is further determined at S2214 whether or not the power source voltage level is the second voltage or more. If it is the second voltage or more, the operation sequence advances to S2215; and if it is lower than the second voltage, the operation sequence advances to S2216. The first voltage is selected to be greater than the second voltage. The values of a first voltage and second voltage should be determined based on design parameters and system power requirements.

At S2215, display 50 in FIG. 38 flashes on LCD 4, notifying the photographer that the battery charge is low. The operation sequence then advances to S2219.

At S2216, the entire display of LCD 4 goes off and the operation sequence advances to S2217 where the battery check NG (BC NG) flag is raised. The operation sequence returns from S2218 to the flow chart of FIG. 23.

The BC NG flag is canceled at S2219 and the flow advances to S2201.

The status of lens barrel position detection switch 26 is detected at S2201 and it is determined whether or not the lens barrel is in the retracted position.

When the lens barrel is in the retracted position, the flow advances to S2202, the date correction mode flag is canceled, and the photographic mode is displayed on LCD 4 at S2203 (refer to FIG. 38). At S2204, microcomputer 1 drives motor 6 through lens barrel drive circuit 5 and, after the lens barrel has been extended to the photographic position, it is confirmed at S2209 whether or not the date imprinting mode is OFF. If date imprinting mode is OFF, print mark PD on LCD 4 is turned OFF at S2210; and if date imprinting mode is ON, after lighting print mark PD at S2211, the flow moves on to determine the status of the main switch 21 at S2207.

If it is determined at S2201 that the lens barrel is not in the retracted position, motor 6 is driven at S2205 by lens barrel drive circuit 5 and the lens barrel is withdrawn to the retracted position. The date imprinting data is displayed on LCD 4 at S2206 (the date of 93 (year) 10 (month) (M) 25 (day) is displayed in the example of FIG. 39). Afterwards, the flow moves on to determine the status of main switch processing at S2207.

In the main switch processing at S2207, the system waits for main switch 21 to go OFF, and when main switch 21 goes OFF, the flows returns from S2208 to the flow chart of FIG. 23.

Figure 26:
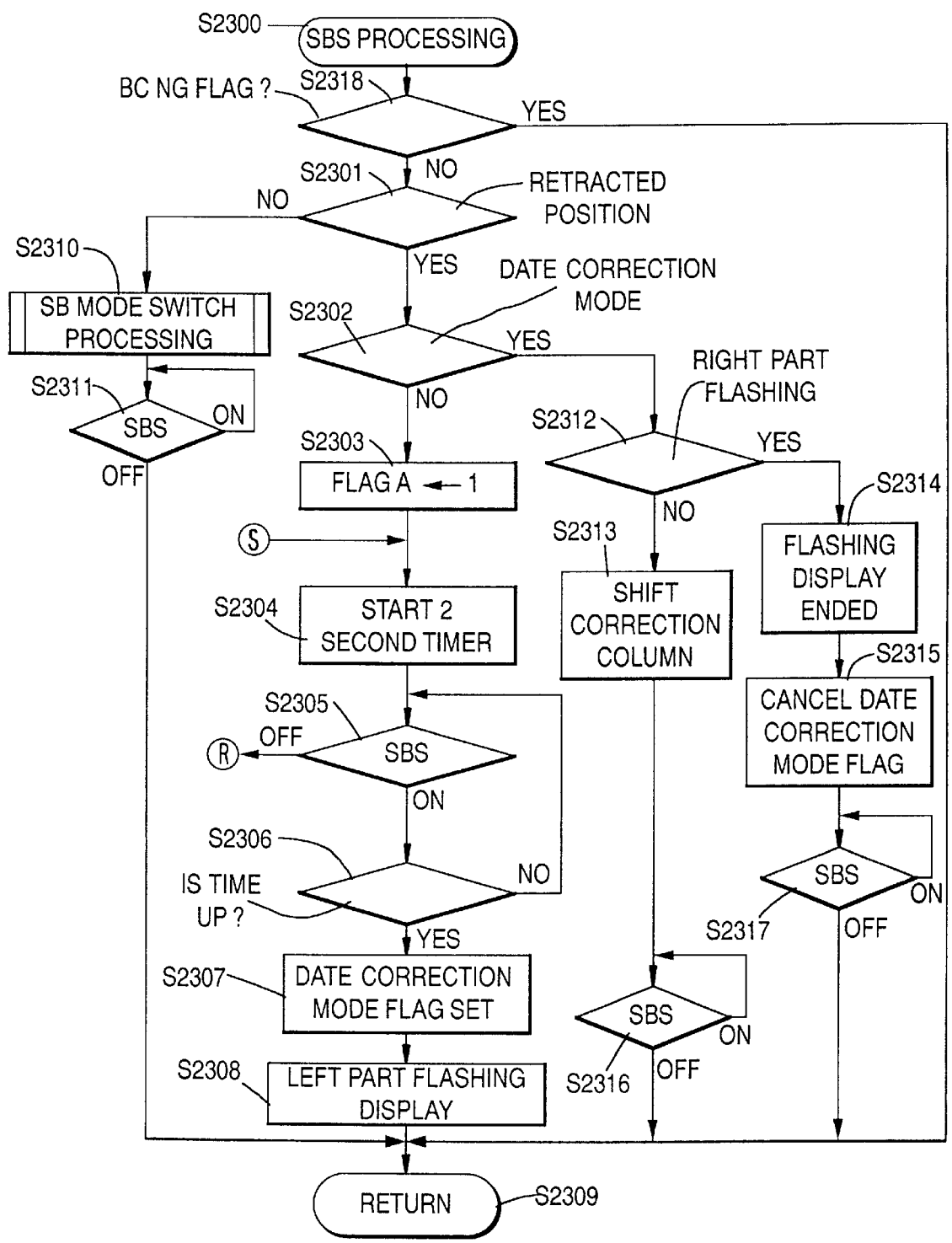
FIG. 26 is a flow chart of the SBS processing of FIG. 23.
Figure 27:
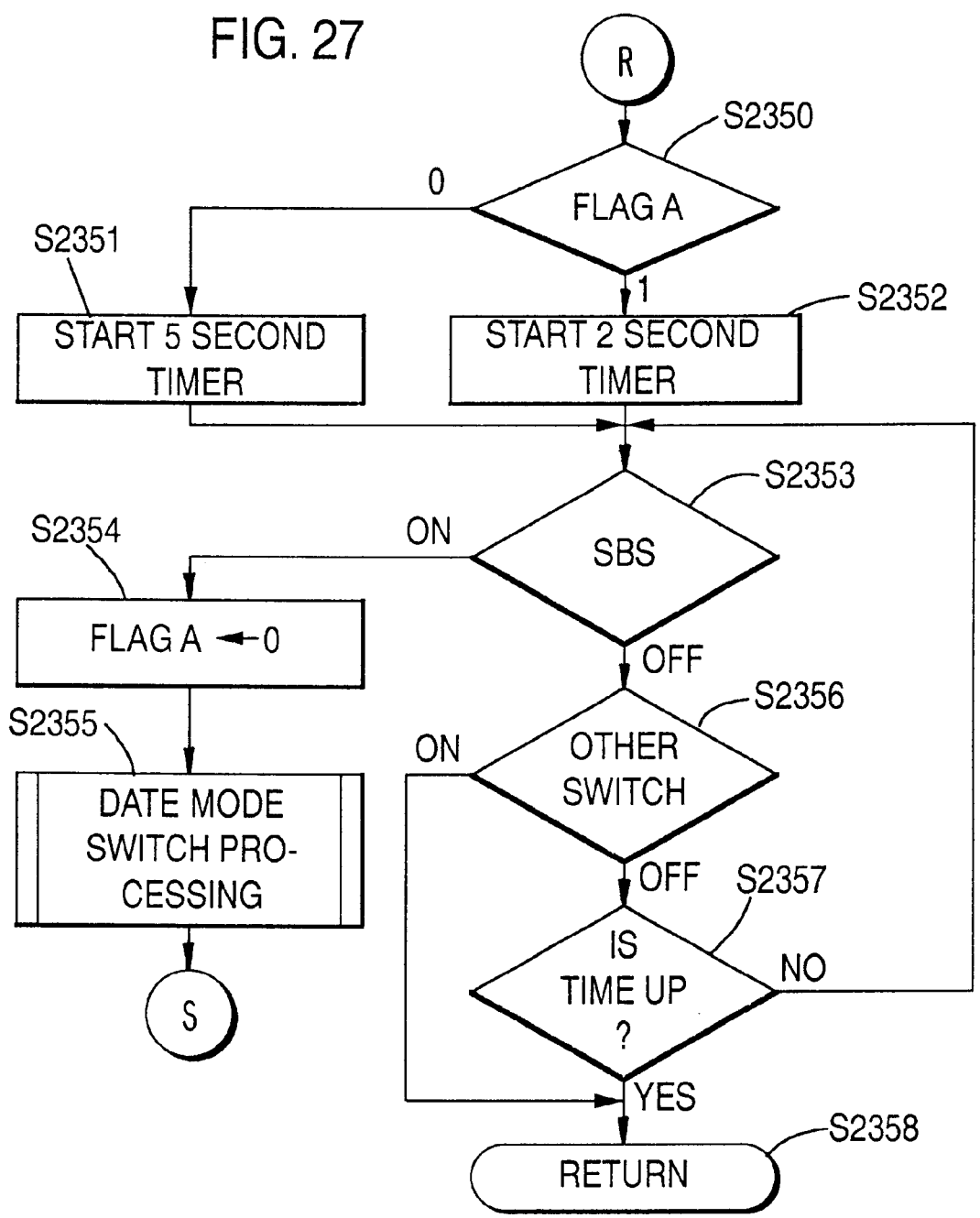
FIG. 27 is a continuation of the flow chart in FIG. 26.

FIGS. 26 and 27 are flow charts indicating the strobe switch processing at S2108 in the flow chart of FIG. 23.

Strobe switch processing starts from S2300 and it is first confirmed at S2318 whether or not a BC NG flag is set; if set, the flow advances to S2309; if not set, the flow advances to S2301.

It is determined at S2301 whether or not the lens barrel is in the retracted position by detecting the status of lens barrel position detection switch 26.

If the lens barrel is not in the retracted position, the flow advances to S2310, and strobe modes are switched. As previously discussed, there are five strobe modes: automatic flash mode, red eye reduction mode, flash prohibit mode, forced flash mode, and slow syncro. If the mode was the automatic flash mode, it is switched to the red eye reduction mode; if the mode was the red eye reduction mode, it is switched to the flash prohibit mode; if the mode was the flash prohibit mode, it is switched to the forced flash mode; if the mode was the forced flash mode, it is switched to slow syncro; and if the mode was slow syncro, it is switched to the automatic flash mode. Afterwards, the flow is transferred to S2311, and the system waits for strobe switch 22 to go OFF. When strobe switch 22 goes OFF, the flow returns from S2309 to the flow chart of FIG. 23.

If the lens barrel is in the retracted position at S2301, the flow advances to S2302 and it is confirmed whether or not the date correction mode has already been entered. If the date correction mode has not already been entered, the system is in the selection mode. At this time the flow advances to S2303, and flag A is set to indicate that the action of pushing strobe switch 22 has occurred one time.

Then, the two second timer starts at S2304, and it is confirmed at S2305 whether or not strobe switch 22 continues to be held ON. Specifically, after the two second timer has started, it is determined at S2305 whether or not strobe switch 22 has gone OFF, and if it is OFF, the flow advances to S2350 in FIG. 27, and if switch 22 continues to be ON, it is determined at S2306 whether or not the time is up. If the time is not up, the flow circulates in the loop of S2305 and S2306.

If the time of the timer is up at S2306 (when strobe switch 22 has been held ON for two seconds or more), the date correction mode flag is set at S2307 (it is the status of this flag that is later determined when the flow again advances to S2302). While the date correction mode flag is set, the system is in the date correction mode. After this, the flow advances to S2308 and the left part of LCD 4 begins a flashing display.

As previously discussed, the date displayed on LCD 4 is displayed in the three blocks of the left part, the middle part, and the right part, and each of these blocks displays two columns of decimal numbers. Corrections are made in the order of the left part, the middle part, and the right part. When the correction mode has been entered, the left part flashes first, and this indicates that the left part can be corrected. For example, if the selected mode is "year-month-day," the left part will display the "year," the middle part will display the "month," and the right part will display the "day." When the date correction mode has been entered, the "year" of the left part will flash first and this indicates that the year can be corrected.

If it is determined at S2302 that the date correction mode has already been entered, the flow advances to S2312. It is confirmed at S2312 whether or not the right part ("25" in FIG. 40) is flashing. If the right part is flashing, it signifies that all parts have already been corrected. The flashing display of LCD 4 is ended at S2314 and the date correction mode flag is canceled at S2315. By canceling the date correction mode flag, the system exits the date correction mode. Afterwards, the system waits at S2317 for strobe switch 22 to go OFF, and when strobe switch 22 goes OFF, the flow returns from S2309 to the flow chart of FIG. 23.

If the right part is not flashing at S2312, the correction column (flashing position) is shifted. If the left part is flashing, the flashing display is shifted to the middle part, and if the middle part is flashing, the flashing display is switched to the right. Afterwards, the system waits at S2316 for strobe switch 22 to go OFF, and when strobe switch 22 goes OFF, the flow returns from S2309 to the flow chart of FIG. 23.

If strobe switch 22 is OFF at S2305 (if, after strobe switch 22 has gone ON one time and goes OFF before a two second interval has elapsed), the flow advances to S2350 in the flow chart of FIG. 26. There, it is determined whether flag A is "0" or "1," and if it is "0" (flag A is reset to "0" at S2354 when strobe switch 22 is turned ON a second time during the two second interval), the five second timer is started at S2351, the flow enters the loop of S2353, S2356, and S2357, and the system waits for strobe switch 22 to go ON.

If flag A is "1" at S2350 (if strobe switch 22 has only gone ON and OFF one time), the two second timer is started at S2352, the flow enters the loop of S2353, S2356, and S2357, and the system waits for strobe switch 22 to go ON.

In the loop of S2353, S2356 and S2357, if strobe switch 22 goes ON again within five seconds or within two seconds, the flow advances to S2354, flag A is set to "0," and date mode switch processing is executed at S2355.

As previously discussed, there are five date modes: "year-month-day," "month-day-year," "day-month-year," "day-hour-minute," and "off." If the date was "year-month-day," it is switched to "month-day-year"; if the date was "month-day-year," it is switched to "day-month-year"; if the date was "day-month-year," it is switched to "day-hour-minute"; if the date was "day-hour-minute," it is switched to "off." Afterwards, the flow returns to S2304 and the two second timer is started (the timer for whether or not the correction mode is entered). Following this, the flow advances to S2305, and returns to the actions from S2305 that were described above.

Moreover, in the loop of S2353, S2356 and S2357, if another switch (main switch 21, etc.) goes ON at S2356, the flow returns from S2358 to the flow chart of FIG. 23. Also, if strobe switch 22 is not pressed, and the time on the five second timer (S2351) or the two second timer (S2352) has lapsed at S2357, the flow returns from S2358 to the flow chart of FIG. 23.

Figure 28:
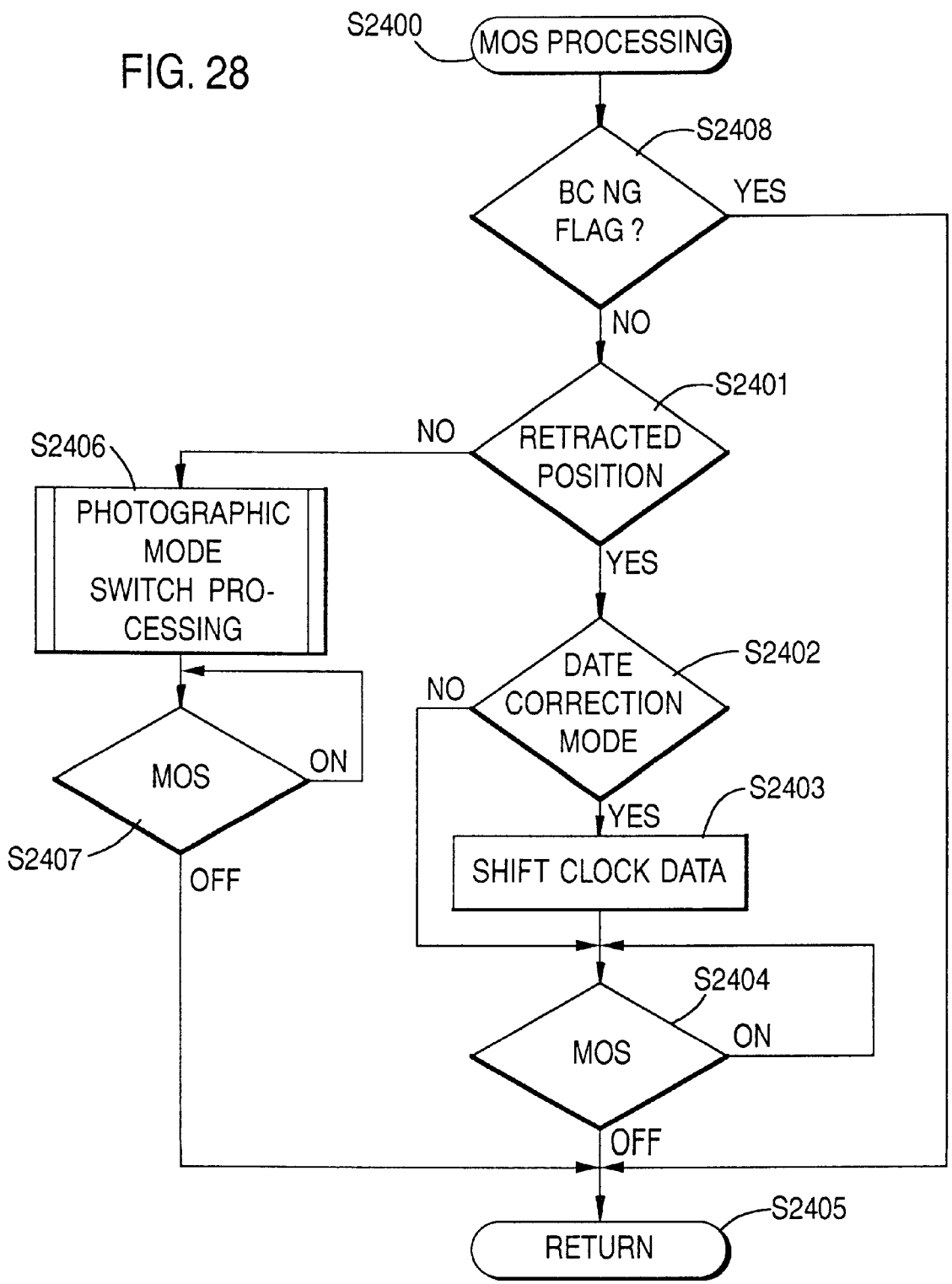
FIG. 28 is a flow chart of the MOS processing of FIG. 23.

FIG. 28 is a flow chart indicating the mode switch processing (MOS processing) at S2109 in the flow chart of FIG. 23.

Mode switch processing starts from S2400 and it is first confirmed at S2408 whether or not the BC NG flag is set; if set, the flow advances to S2405; if not set, the flow advances to S2401.

It is confirmed at S2401 whether or not the lens barrel is in the retracted position by reading the status of lens barrel position detection switch 26. If the lens barrel is not in the retracted position, the flow advances to S2406 and the system switches the photographic mode.

Afterwards, the flow advances from S2406 to S2407 and the system waits for mode switch 23 to go OFF. When mode switch 23 goes OFF, the flow returns from S2405 to the flow chart of FIG. 23.

When it has been determined at S2401 that the lens barrel is in the retracted position, it is confirmed whether or not the date correction mode has already been entered at S2402 (in the retracted state, when strobe switch 22 is ON for two seconds or more, the correction mode is set at S2307 of FIG. 26, and the correction mode is canceled at S2315 after correction of the right part has been completed).

When the correction mode has not been entered, the flow advances to S2404, and the system waits for mode switch 23 to go OFF. When mode switch 23 goes OFF, the flow returns from S2405 to the flow chart of FIG. 23.

When the correction mode is entered at S2402, the clock data is shifted at S2403. One (or −1) is added to the data ("year," "month," "day," "hour" or "minute") of the block among the left part, the middle part or the right part that is flashing at that time. Afterwards, it is confirmed at S2404 that mode switch 23 is OFF, and the flow returns from S2405 to the flow chart of FIG. 23.

Figure 29:
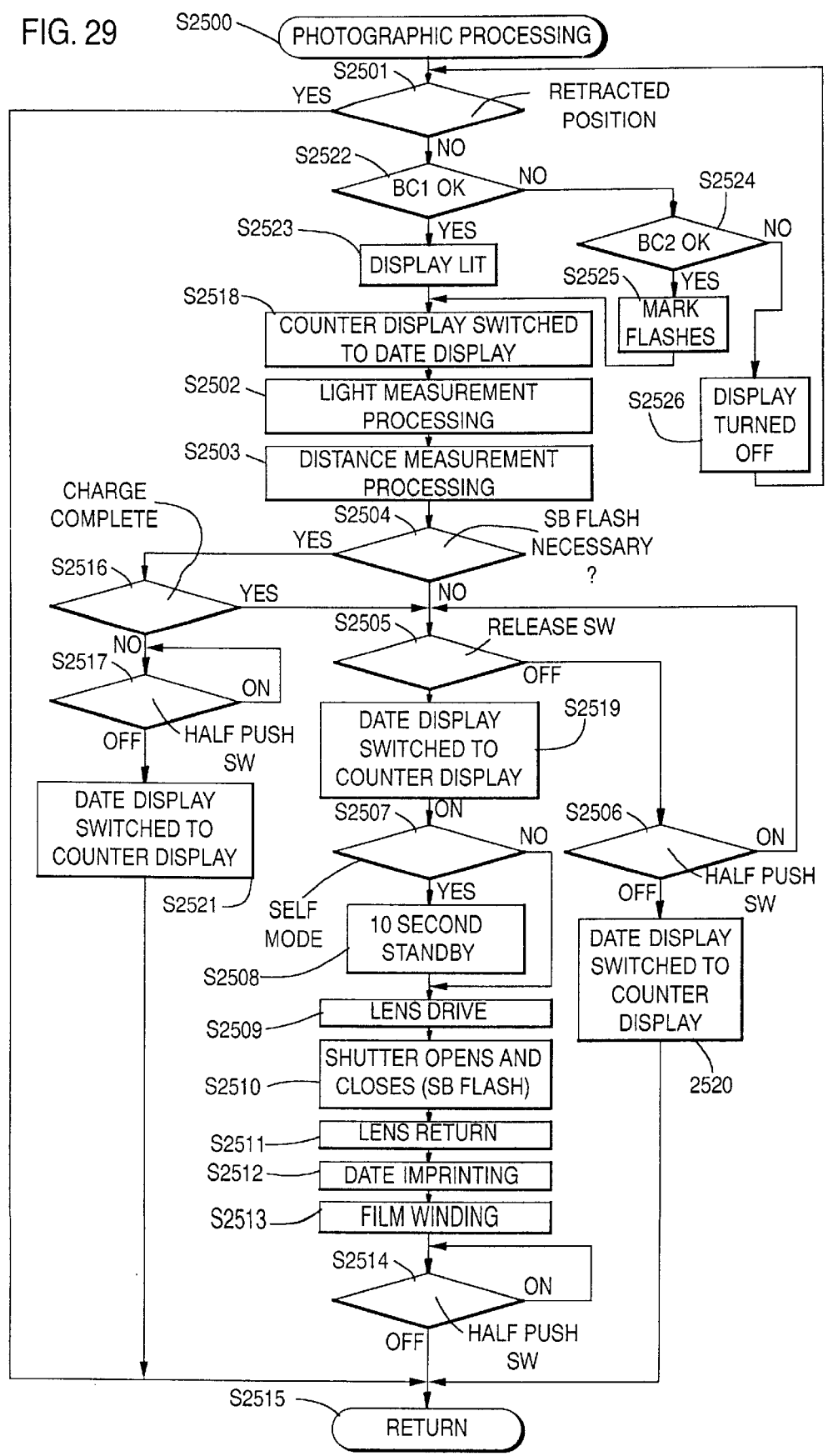
FIG. 29 is a flow chart of the photographic processing of FIG. 23.

Next, the details of the subroutine for the photographic processing in S2110 of FIG. 23 will be explained by referring to the flow chart in FIG. 29. This processing begins from S2500. It is determined at S2501 whether or not the lens barrel is in the retracted position. When the lens barrel is in the retracted position, lens barrel position detection switch 26 is ON. At this time, taking photographs is prohibited, the flow advances to S2515 and returns to the flow chart of FIG. 23.

If it is determined at S2501 that lens barrel position detection switch 26 is OFF, the flow advances to S2522, the power source voltage level is checked by power source voltage detection circuit 17, and it is determined whether or not the voltage level is the first voltage or more. If it is at the first voltage or more, the flow advances to S2523; and if it is at lower than the first voltage, the flow advances to S2524.

At S2523, the counter display or the date display on LCD 4 is lit, and the flow advances to S2518.

It is further determined at S2524 whether or not the power source voltage level is the second voltage or more. If it is the second voltage or more, the flow advances to S2525 and display 50 in FIGS. 38 or 39 is made to flash on LCD 4, notifying the photographer that the battery charge is low. The flow then advances to S2518. If the power source voltage level is lower than the second voltage, the flow advances to S2526.

At S2526, the display on LCD 4 goes off completely, the flow returns to S2501, and the system waits for the recovery of power source voltage.

At S2518, the display on LCD 4 is switched from the state of displaying the photograph frame number ("36," as indicated in the example of FIG. 38) to the state displaying the date (year 93 month 10 day 25) indicated in FIG. 40.

Next, the flow advances to S2502, and light measurement processing is executed.

It is simultaneously decided whether or not there is low brightness, and it is determined whether or not a strobe flash is necessary. If the automatic flash mode is set, it is determined whether or not the strobe will be flashed corresponding to the brightness. If the flash prohibit mode is set, irrespective of the brightness, the strobe flash is prohibited. If the force flash mode is set, irrespective of the brightness, the strobe flashes.

The flow next advances to S2503, and distance measurement processing is executed.

It is determined at S2504 whether or not it was decided at S2502 that a strobe flash is necessary. If it was decided that a strobe flash is necessary, the flow advances to S2516, and it is determined whether or not charging of the strobe has been completed. If charging has not been completed, the strobe cannot be flashed. For this reason, the flow advances to S2517, and the system goes into standby until half push switch 24 goes OFF (the release button is released), and when half push switch 24 goes OFF, the date display is switched to the counter display at S2521. Then, the flow returns from S2515 to the flow chart of FIG. 23.

If the charging of the strobe has already been completed, the flow advances from S2516 to S2505. Even if it is decided at S2504 that a strobe flash is not necessary, the flow advances to S2505. It is determined at S2505 whether or not release switch 25 is ON.

When it is determined at S2505 that release switch 25 is OFF, the flow advances to S2506, and it is determined whether or not half push switch 24 is ON. If half push switch 24 is in ON, the flow returns to S2505 and processing to determine whether or not release switch 25 is ON is executed.

Specifically, the processing of S2505 and S2506 is repeated based on the release button being in the half push state.

When half push switch 24 goes OFF, the date display is switched to the counter display at S2520. Then, the flow returns from S2515 to the flow chart of FIG. 23.

If it is determined at S2505 that release switch 25 is ON, the flow advances to S2519 and the date display is switched to the counter display. It is determined at S2507 whether or not the self mode is set, and if the self mode is set, the flow advances to S2508 and the system enters standby for 10 seconds. If the self mode is not set, this processing of S2508 is skipped.

Next, the flow advances to S2509 and lens drive processing is executed. Next, the opening and closing action of the shutter is executed at S2510, and if it is necessary to use the strobe, the strobe drive is executed simultaneously.

After the strobe has flashed, the strobe begins to be charged, and when charging is complete, charging is terminated.

Next, the flow advances to S2511 and lens return processing is executed.

Date imprinting processing is executed at S2512. When the command to imprint the date is given, microcomputer 1 outputs the date data that was obtained as a result of keeping time by a built-in clock device (this date data is displayed on LCD 4) to date imprinting circuit 10, and this data is imprinted on the film.

In this embodiment, the date is imprinted before winding one frame of film, but it is also possible to imprint the date in dot form during film winding (feeding) by, for example, the flashing of multiple LED's (not shown in diagrams).

Next, the flow advances to S2513 and film winding processing is executed.

Next, the flow advances to S2514 and the system enters standby until half push switch 24 goes OFF. When half push switch 24 goes OFF, the flow advances to S2515 and returns to the flow of FIG. 23.

During processing, the display on LCD 4 flashes or is turned OFF, but the time measurement function initiated at S2135 in FIG. 24 does not stop.

In the embodiment above, only display 50 in FIG. 38 is made to flash when the warning display for low battery charge is raised, but it would also be possible to make the entire display, or a portion of the display, to flash.

Moreover, as previously discussed, the position of the lens barrel is detected by lens barrel position detection switch 26, and when the lens barrel is extended, the mode status is taken to be the active mode and when in the retracted position, it is taken to be the inactive mode.

Also, it is possible to provide an operational switch that operates when the power source is ON or OFF; when the power source is turned ON by operating this operational switch, the mode status is the active mode, and when the power source is OFF, it is the inactive mode.

In addition, the present invention can also be applied to a camera with a prewind system in which, when the film is set into the camera, the film is wound from the cartridge, and every time one photograph is taken one frame of film is rewound into the cartridge.

The embodiment as described above has the advantages and features that the photographer can always confirm the power source consumption status because the power source consumption status is displayed irrespective of the camera being in the non-photographic state (inactive mode) or the photograph ready state (active mode). No mistake is made about the time period for replacing the power source and a state in which photographs cannot be taken is circumvented.

Therefore, there is provided a camera in which the photographer can always confirm the power source consumption status irrespective of the camera being in an inactive or active mode.

An additional embodiment of a camera in accordance with the invention is described below which allows a single operational member (such as mode switch 23) to have multiple functions.

Figure 30:
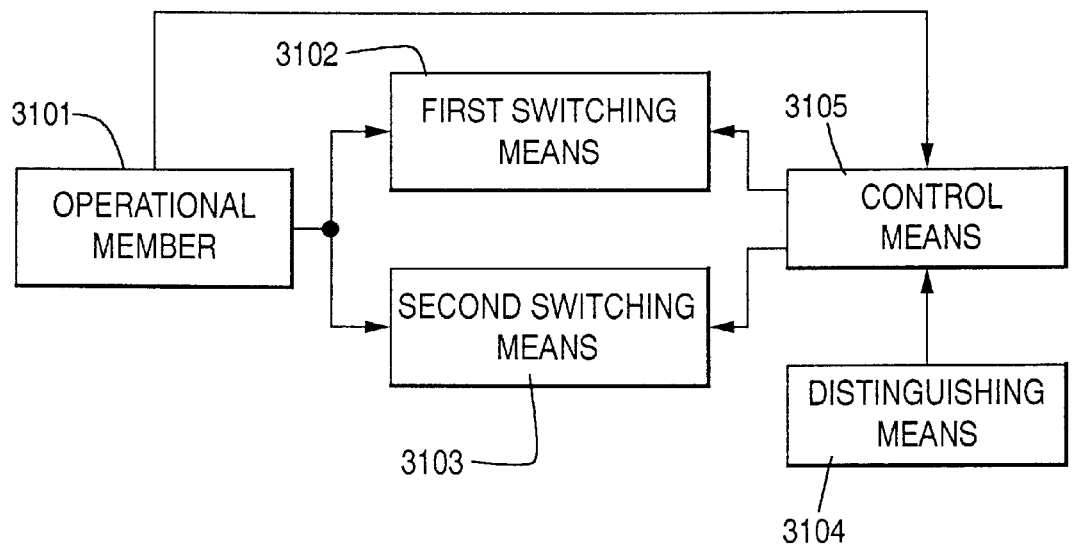
FIG. 30 is a block diagram illustrating the operation of an operational member.

FIG. 30 is a block diagram which describes the operation of a multiple function operational member, such as a switch or button. To switch modes or perform data modification when the camera is in the second state, operational member 3101 is first operated in a stipulated situation (for example, operational member 3101 is operated only a stipulated number of times during a stipulated time period). After this, the second mode can be switched or data modification actions are permitted accompanying the operation of operational member 3101. Specifically, until operational member 3101 is operated in the stipulated situation, even if the camera is in the second mode, second mode switching or data modification actions based on the operation of operational member 3101 are prohibited.

FIG. 31 is a flow chart representing the overall operation of a further embodiment of a camera in accordance with the present invention based on the hardware system illustrated in FIG. 15.

Main switch 21 operates to alternately change the camera from an active mode to an inactive mode where, in this embodiment, the active mode is characterized by the lens barrel being in an extended position (thereby permitting photographs to be taken by operating release switch 25) and the inactive mode is characterized by the lens barrel being in a retracted position (thereby prohibiting photographs to be taken, even if release switch 25 is pressed). Therefore, if main switch 21 goes ON when the camera is in the active mode, the camera is switched to the inactive mode and the lens barrel is driven to a retracted position in which the lens barrel is withdrawn further into the camera body than the normal photographic position. Meanwhile, if main switch 21 goes ON when the camera is in the inactive mode, the camera is switched to the active mode and the lens barrel is extended to a normal photographic position. Lens barrel position detection switch 26 is in the OFF state when the lens barrel is in the retracted position, and lens barrel position detection switch 26 goes ON when the lens barrel is driven to a normal photographic position.

Furthermore, in this embodiment, the following strobe modes are switched: Automatic flash mode which automatically flashes when the brightness is low, red eye reduction mode which executes a pre-emission to reduce red eye, flash prohibit mode which prohibits the flash, forced flash mode which forces a flash, and slow syncro mode which executes slow syncro. Also, the following photographic modes can be set: normal photographic mode, single self timer mode, double self timer mode, and forced infinity mode. Here, forced infinity mode is a mode in which the system forces the photographic lens to be driven to the infinity position and the picture is taken. Forced infinity mode is mainly used when photographing scenery.

Furthermore, as previously discussed, the date mode includes a selection mode and a correction mode. The selection mode is a mode in which "year-month-day," "month-day-year," "day-month-year," "day-hour-minute" or "no imprinting" can be selected as the data to be imprinted by date imprinting circuit 10. On the other hand, the correction mode is a mode to correct the values (year, month, day, hour, minute) of the data to be imprinted.

Next, the sequence of control by microcomputer 1 will be explained based on the flow charts of FIGS. 31 through 37.

FIG. 31 is a flow chart of the overall system operation. Operation starts at S3120. When power source battery 31 is loaded and the battery cover closed, the main program of FIG. 31 is activated by battery cover switch 27 going from OFF to ON (S3100), and the flow circulates in a loop of S3100 to S3104. With battery cover switch 27 going from OFF to ON at S3100, that is, when the action of closing the battery cover is detected, the flow advances to S3111 and processing to set the initial date is executed. Also, when it is determined at S3101 that main switch 21 is ON, the flow advances to S3107 and main switch processing is executed. When it is detected at S3102–S3104 that either strobe switch 22, mode switch 23, or half push switch 24 is ON, strobe mode switch processing, MOS processing or photographic processing is executed, respectively, at S3108, S3109 or S3110. In addition, when battery 31 is taken out, processing ends.

Figure 32:
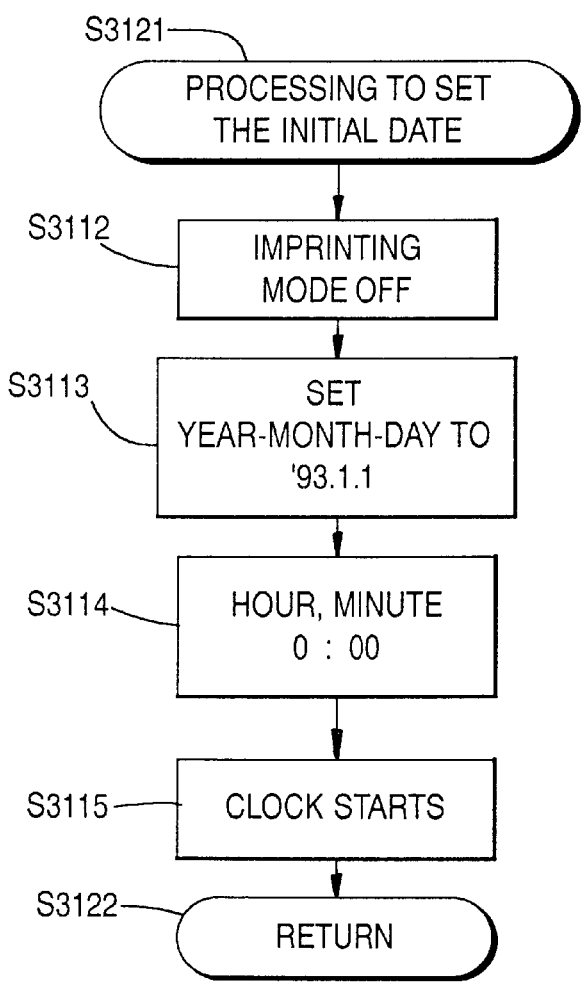
FIG. 32 is a flow chart of the processing to set the initial date of FIG. 31.

FIG. 32 indicates the details of the processing to set the initial date of S3111 described above. First, date printing is prohibited (S3112), and next, year-month-day is selected to be the imprinting data, and the date is set to the initial date which is pre-selected (S3113). Moreover, after the time is set to the initial time (S3114), the clock is started in order to activate the date mechanism (S3115) and, afterwards, the flow returns to the processing of FIG. 31.

Figure 33:
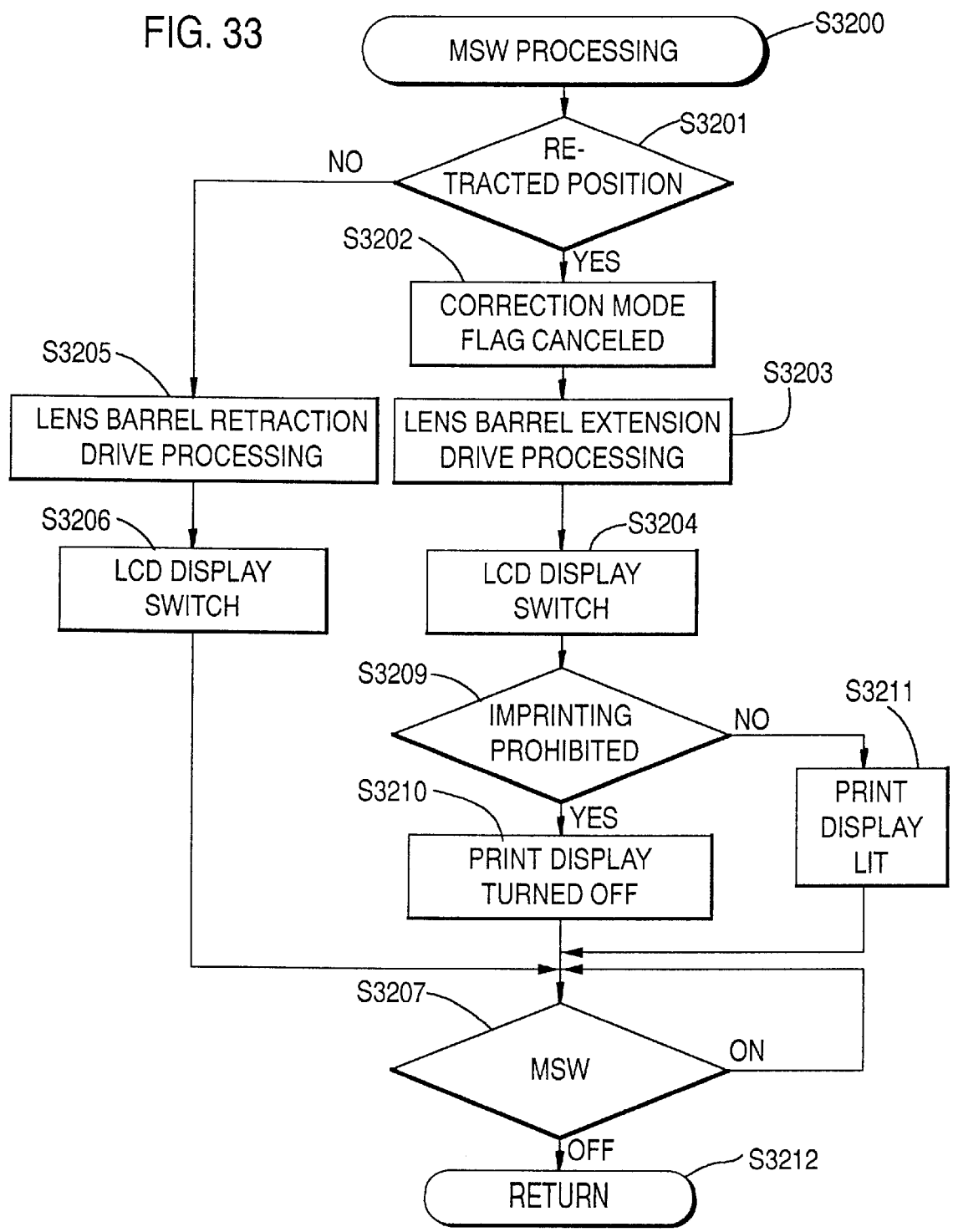
FIG. 33 is a flow chart of the main switch processing of FIG. 31.

FIG. 33 indicates the details of the main switch processing of S3107 (FIG. 31). This processing interrupts and becomes active when main switch 21 is turned ON. The status of lens barrel position detection switch 26 is first detected at S3201, and it is determined whether or not the lens barrel is in the retracted position. If lens barrel position detection switch 26 is ON, it is determined that the lens barrel is not in the retracted position and the flow advances to S3205. The lens barrel is driven to the retracted position via lens barrel drive circuit 5 and, for example, date imprinting data DD is displayed on LCD 4 at S3206, as indicated in FIG. 39. In addition, other data is turned OFF.

Figures 45, 46:
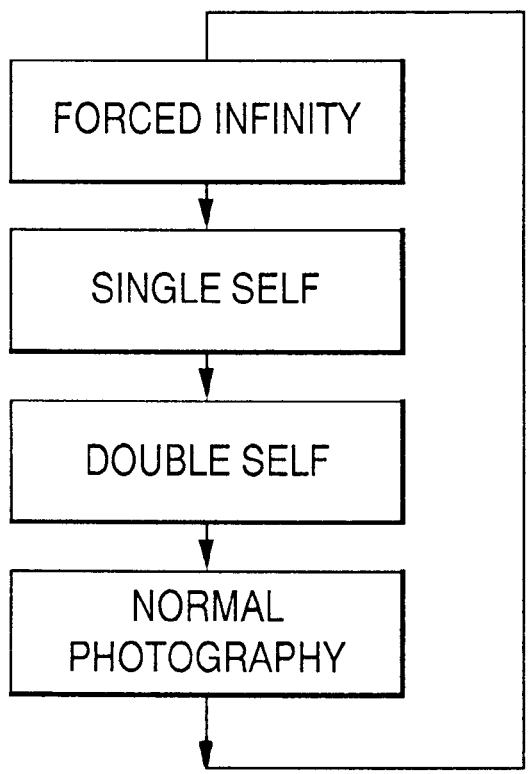
FIG. 45 is a diagram indicating photographic mode switching.
FIG. 46 is an alternate diagram indicating photographic mode switching.

On the other hand, if it is determined at S3201 that lens barrel position detection switch 26 is OFF, the lens barrel is in the retracted position the flow advances to S3202 where the date correction mode flag is canceled (the selection mode is set by canceling the correction mode as previously described). At S3203, the lens barrel is extended to the normal photographic position via lens barrel drive circuit 5, and at S3204, the required markers among mode display MD of LCD 4 indicated in FIG. 38 are lit, imprinting data DD goes OFF, and film counter display CD is lit. In addition, the display status in relation to each photographic mode is indicated in FIGS. 45 and 46.

Next, if it is detected at S3209 that imprinting is prohibited, display mark PD (FIG. 38) which indicates "PRINT" on LCD 4 goes OFF at S3210 and, if it is determined that imprinting is permitted, display PD is lit at S3211. After S3206, S3210 or S3211, the flow advances to S3207, and the system waits for main switch 21 to be released (that is, for main switch 21 to go OFF) and the flow returns to the processing of FIG. 31.

Here, if the lens barrel is in the retracted position, photograph taking is prohibited, and if the lens barrel is in any position other than retracted, photograph taking is permitted.

Figure 34:
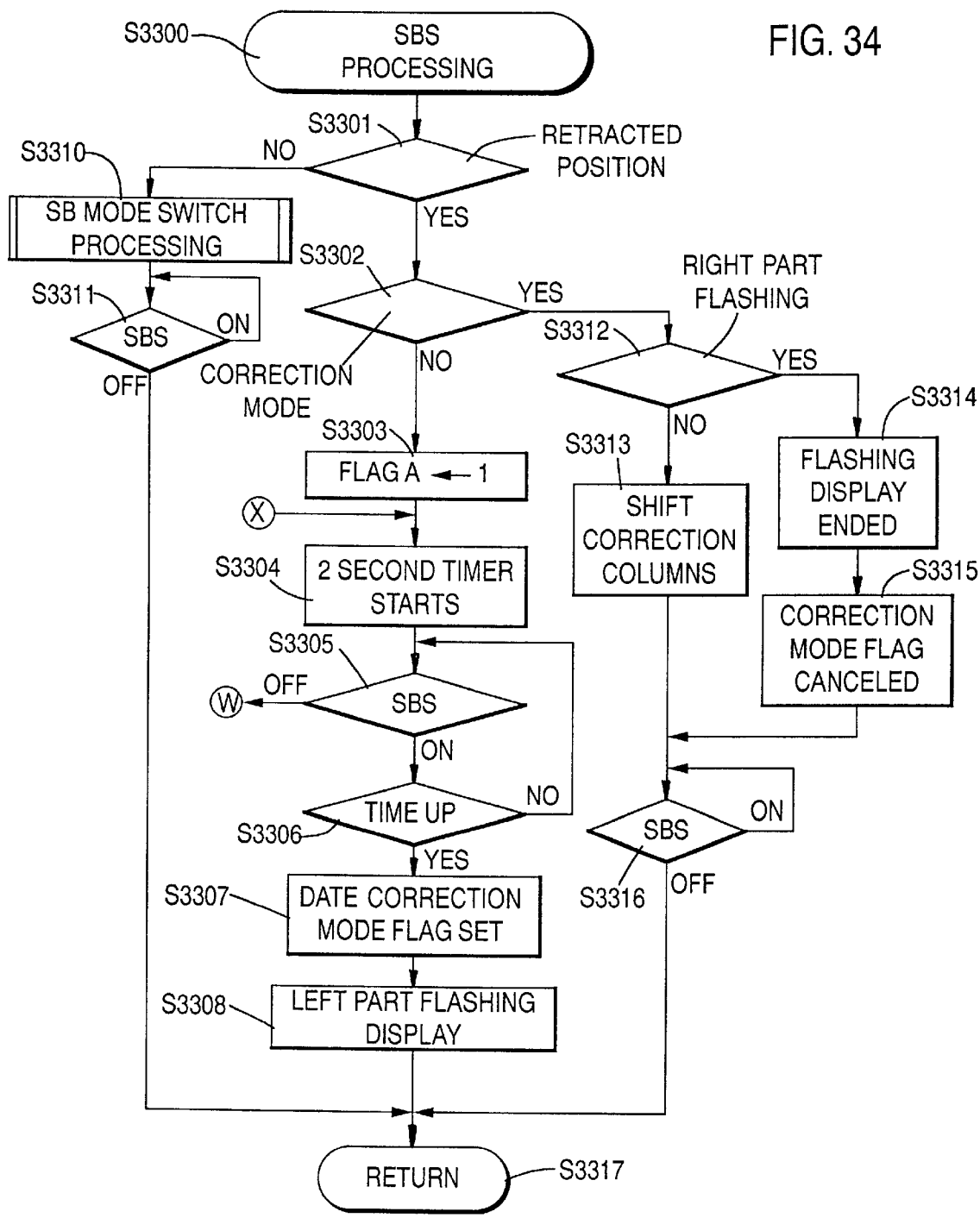
FIG. 34 is a flow chart of the SBS processing of FIG. 31.
Figure 35:
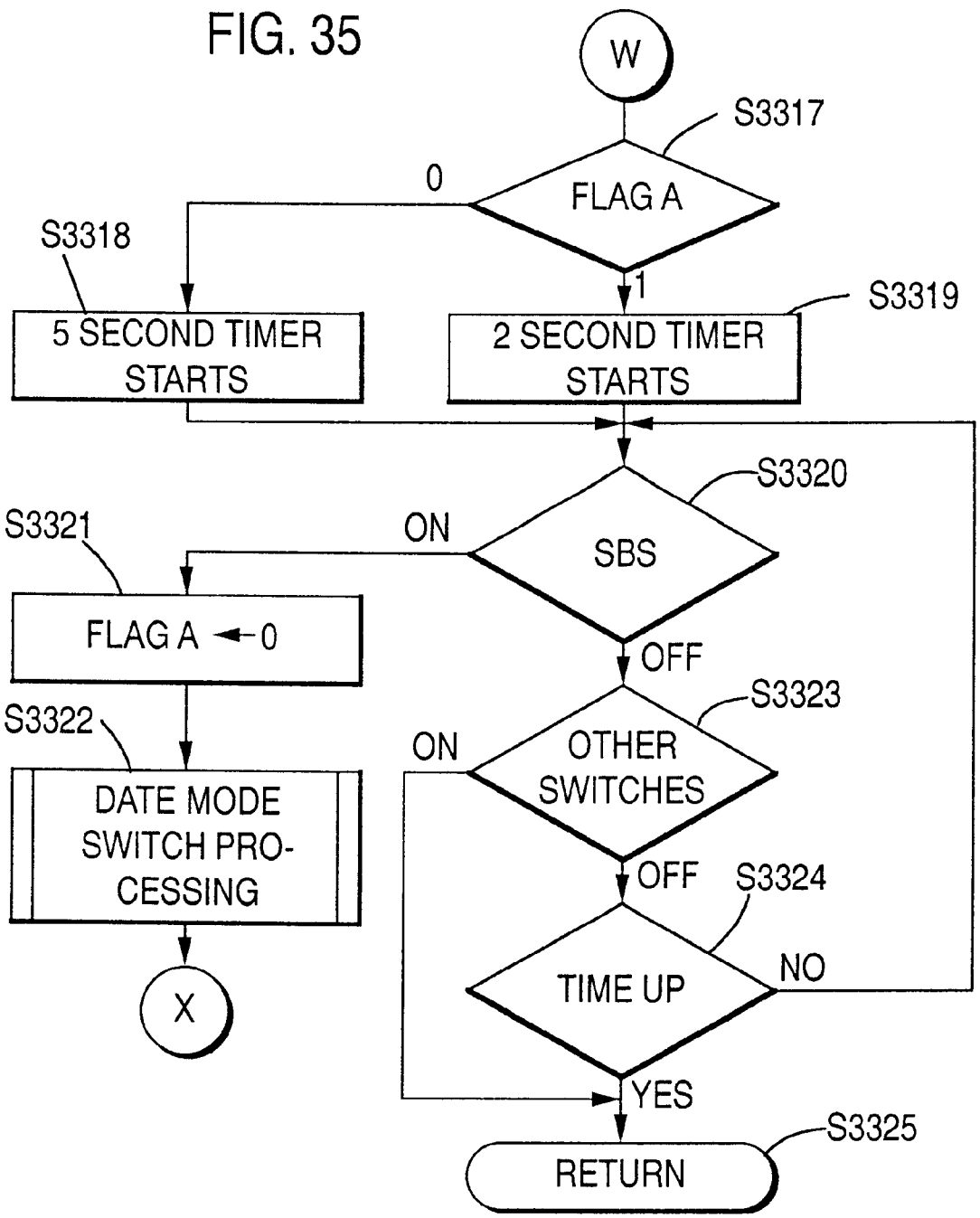
FIG. 35 is a continuation of the flow chart if FIG. 34.
Figures 42, 43:
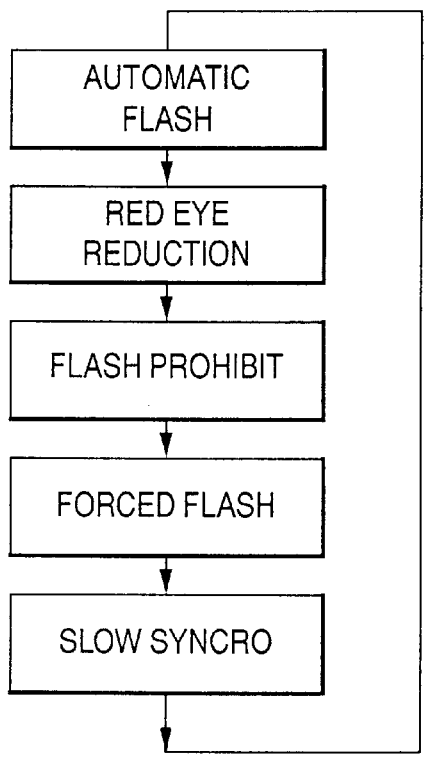
FIG. 42 is a diagram indicating strobe mode switching.
FIG. 43 is an alternate diagram indicating strobe mode switching.

FIGS. 34 and 35 indicate the details of the strobe switch processing of S3108 (FIG. 31). This processing interrupts and becomes active when strobe switch 22 is turned ON. If it is determined at S3301 that the lens barrel is not in the retracted position, the flow advances to S3310 by determining that the camera is in the active mode (first state) and the strobe modes are switched. Here, each time strobe switch 22 is turned ON, the strobe mode is switched in a cycle following the order indicated in FIG. 42; consequently, processing to shift the strobe mode from the currently set strobe mode in the direction of the arrow is executed by the processing at S3310. Specifically, for example, when the camera is currently the automatic flash mode, the mode is switched to the red eye reduction mode. Afterwards, the system waits until strobe switch 22 goes OFF at S3311 and the flow returns to the processing of FIG. 31. In addition, the mode display on LCD 4 is switched in the manner indicated in FIG. 43.

On the other hand, if it is detected at S3301 that the lens barrel is in the retracted position, the flow advances to S3302 and it is determined whether the date mode is in the correction mode or the selection mode. If it is in the selection mode, the flow advances to S3303 and flag A is set to "1," Here, flag A has the purpose of indicating that strobe switch 22 has been turned ON one time.

At S3304, the timer is activated and begins to measure two seconds, and next, the state of strobe switch 22 is determined at S3305. If strobe switch 22 is still ON, the flow advances to S3306 and it is determined whether or not the time is up. If time in not up at S3306, the flow returns to S3305; if it is affirmed, that is, if strobe switch 22 has been held ON for two seconds, the flow advances to S3307.

The correction mode flag is set at S3307 (the system switched from the selection mode to the correction mode), and next, the left most display part on LCD 4 is made to flash at S3308 as indicated in FIG. 44(a). This indicates that the system is in a mode to correct the display data related to the current "year." Actual data correction is executed by the processing of the previously described FIG. 20.

Afterwards, the flow returns from S3317 to the processing of FIG. 31.

On the other hand, if it is determined at S3305 that strobe switch 22 is OFF, that is, that the operation to turn strobe switch 22 ON has been canceled within two seconds, the flow advances to S3317 of FIG. 35. If it is determined at S3317 that flag A is "0," a five second interval begins to be measured by starting the timer at S3318; if it is determined that flag is "1," a two second interval begins to be measured at S3319. Afterwards, it is determined at S3320, whether strobe switch 22 is ON or OFF, and if it is determined that strobe switch 22 is still OFF, the flow advances to S3323. It is determined at S3323 whether or not any switches other than strobe switch 22 are ON. When affirmative, the flow returns to the processing of FIG. 31, and when negative, the flow advances to S3324. If it is determined at S3324 that the time is up, the flow returns to the processing of FIG. 31, but if the time is not yet up, the flow returns to S3320.

If it is determined at S3320 that strobe switch 22 has been turned ON again, flag A is reset to "0" at S3321, the flow advances to S3322 and the imprinting data is modified.

Figure 13:
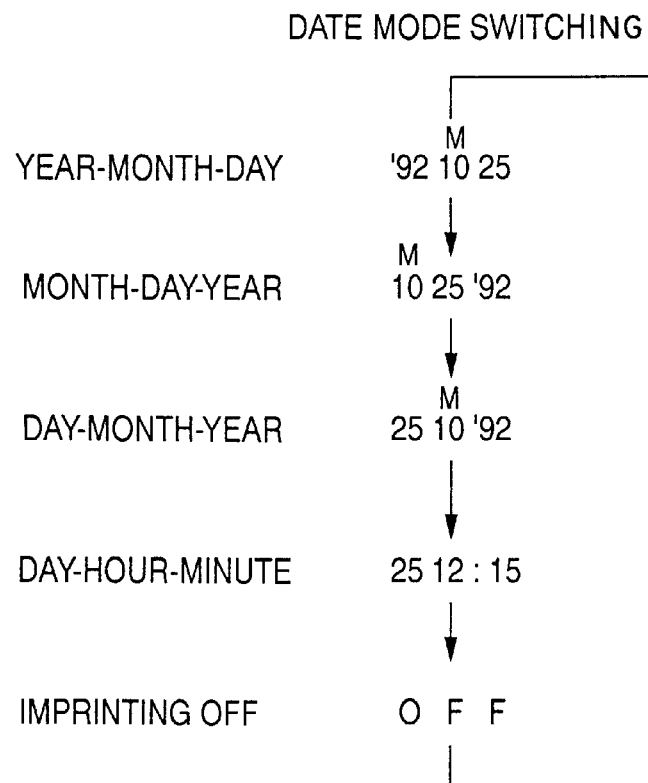
FIG. 13 is a diagram illustrating date mode switching.

In this embodiment, the imprinting data is switched in a cycle following the order indicated in FIG. 13 each time strobe switch 22 goes ON. Consequently, processing to shift the data from the currently set imprinting data one time in the direction of the arrow is executed by the processing at S3322. Specifically, for example, if it is currently "year-month-day," the mode is switched to "month-day-year." Afterwards, processing advances to S3304 of FIG. 34.

Moreover, if it is determined at S3320 that strobe switch 22 is OFF, the flow advances to S3323. If it is determined at S3323 that any other switch than strobe switch 22 is ON, the flow returns to the processing of FIG. 31; if it is determined that the other switches are OFF, the flow advances to S3324. If it is determined at S3324 that the time is not yet up, the flow returns to S3320; if the time is up, then the flow returns to the processing of FIG. 31.

On the other hand, if it is determined at S3302 that the current date mode is the correction mode, the flow advances to S3312 and it is determined whether or not the far right part of LCD 4 (the data relating to "day" in FIG. 44(c)) is flashing. If the right part is not flashing in S3312, the flashing display data is shifted one place to the right at S3313. For example, if the "year" is currently flashing as in FIG. 44(a), the "month" begins flashing as indicated in FIG. 44(b). Moreover, if the right part is flashing in S3312, the flow advances to S3314, the flashing display is terminated, and the correction mode flag is canceled at S3315 (the selection mode is set by canceling the correction mode flag). Afterwards, the system waits for strobe switch 22 to go OFF at S3316 and the flow returns to the processing of FIG. 31.

According to the sequence of operation in FIGS. 34 and 35 above, if strobe switch 22 is turned ON when the camera is in the active mode, strobe mode switching is executed. On the other hand, if strobe switch 22 is turned ON when the camera is in the inactive mode, the following date mode processing will occur.

Specifically, if strobe switch 22 is held ON continuously for two seconds, the date mode switches from the selection mode to the correction mode and it is possible to correct such display data as the year, month or day as previously described. Moreover, if strobe switch 22 is canceled within two seconds, the system enters a waiting state for strobe switch 22 to go ON again and, at this point, it is not possible to either modify the date mode or correct the date data. Then, if the waiting state for the strobe switch 22 to go ON continues for two seconds, the systems returns to the initial state (the state prior to when strobe switch 22 was initially turned ON). Moreover, if strobe switch 22 is turned ON again within the two second waiting state, date mode switching is executed. In addition, after this, if strobe switch 22 is not turned OFF within two seconds, the system returns to the correction mode; and if strobe switch 22 is turned OFF within two seconds, the system enters a state waiting for strobe switch 22 to go ON again. If this state continues for five seconds, the systems returns to the initial state; and if strobe switch 22 is turned ON again within five seconds, date mode switching is executed.

Specifically, in this embodiment, if the camera is in the active mode, the date modes are promptly switched by the operation of turning strobe switch 22 ON one time, but if the camera is in the inactive mode, to correct imprinting data, strobe switch 22 must be operated again within two seconds. Moreover, when selecting (modifying) imprinting data after strobe switch 22 has been operated, the operation is canceled within two seconds, unless mode switch 23 is operated a second time within two seconds. Consequently, if the camera is in the inactive mode, even if strobe switch 22 is operated by touching some other object, accidental date mode switching or modification of date data will rarely happen.

Details of the mode switch (MOS) processing of S3109 (FIG. 31) are illustrated in FIG. 20 and were previously discussed. Therefore, MOS processing of FIG. 20 will only briefly be summarized here. According to the sequence of operation in FIG. 20, if the camera is in the active mode when mode switch 23 is turned on, photographic mode switching is executed; and if the camera is in the inactive mode when mode switch 23 is turned ON, display data correction is executed. For example, if display data relating to "year" is flashing (as indicated in FIG. 47(a)), "1" is added to the data (as indicated in FIG. 47(b)) accompanying mode switch 23 being turned ON, and if mode switch 23 is turned ON again, 1 is again added (as indicated in FIG. 47(c)).

In this manner, mode switch 23 in this embodiment of the present invention has the two functions of photographic mode modification and data correction.

Figure 36:
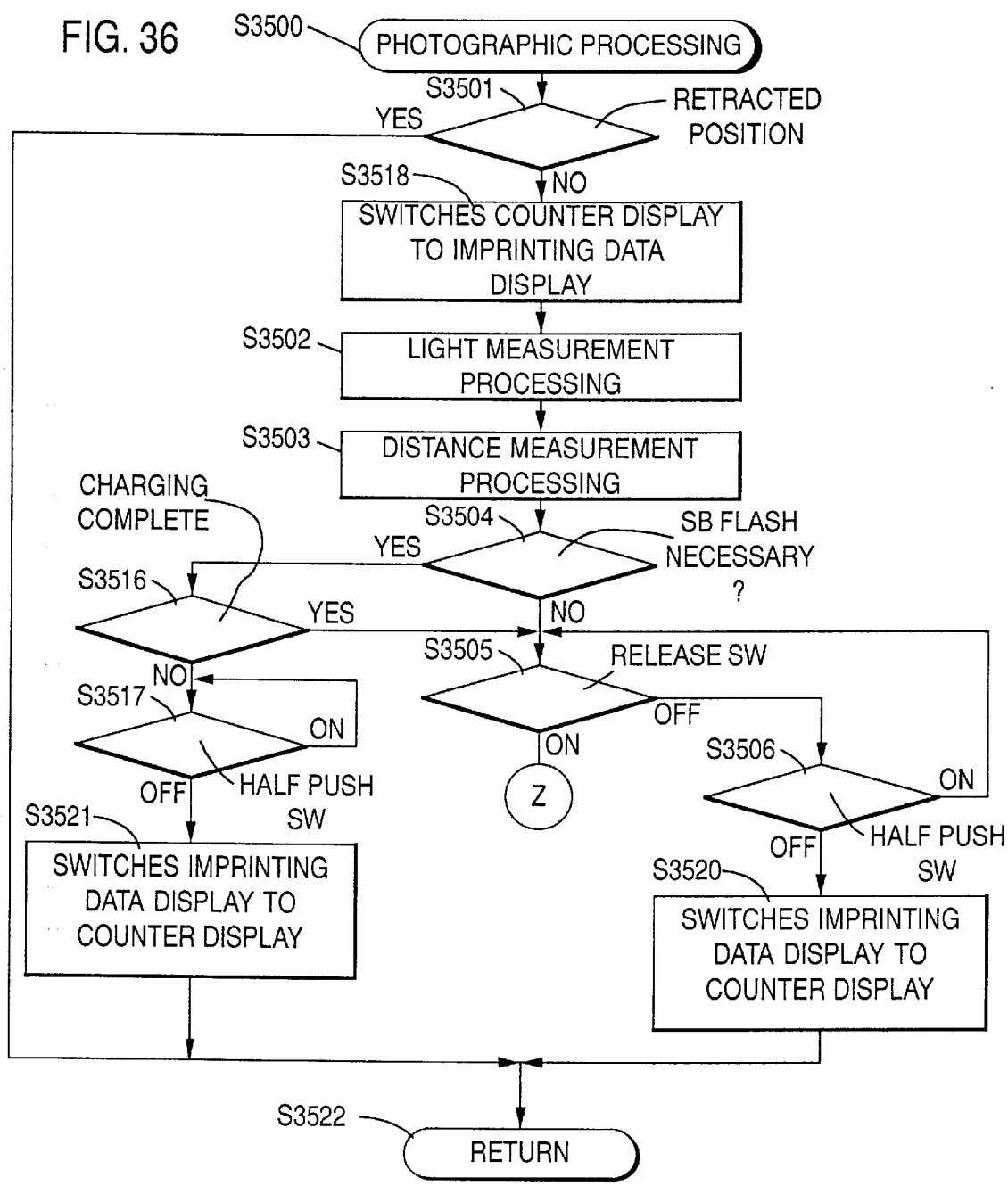
FIG. 36 is a flow chart of the photographic processing of FIG. 31.
Figure 37:
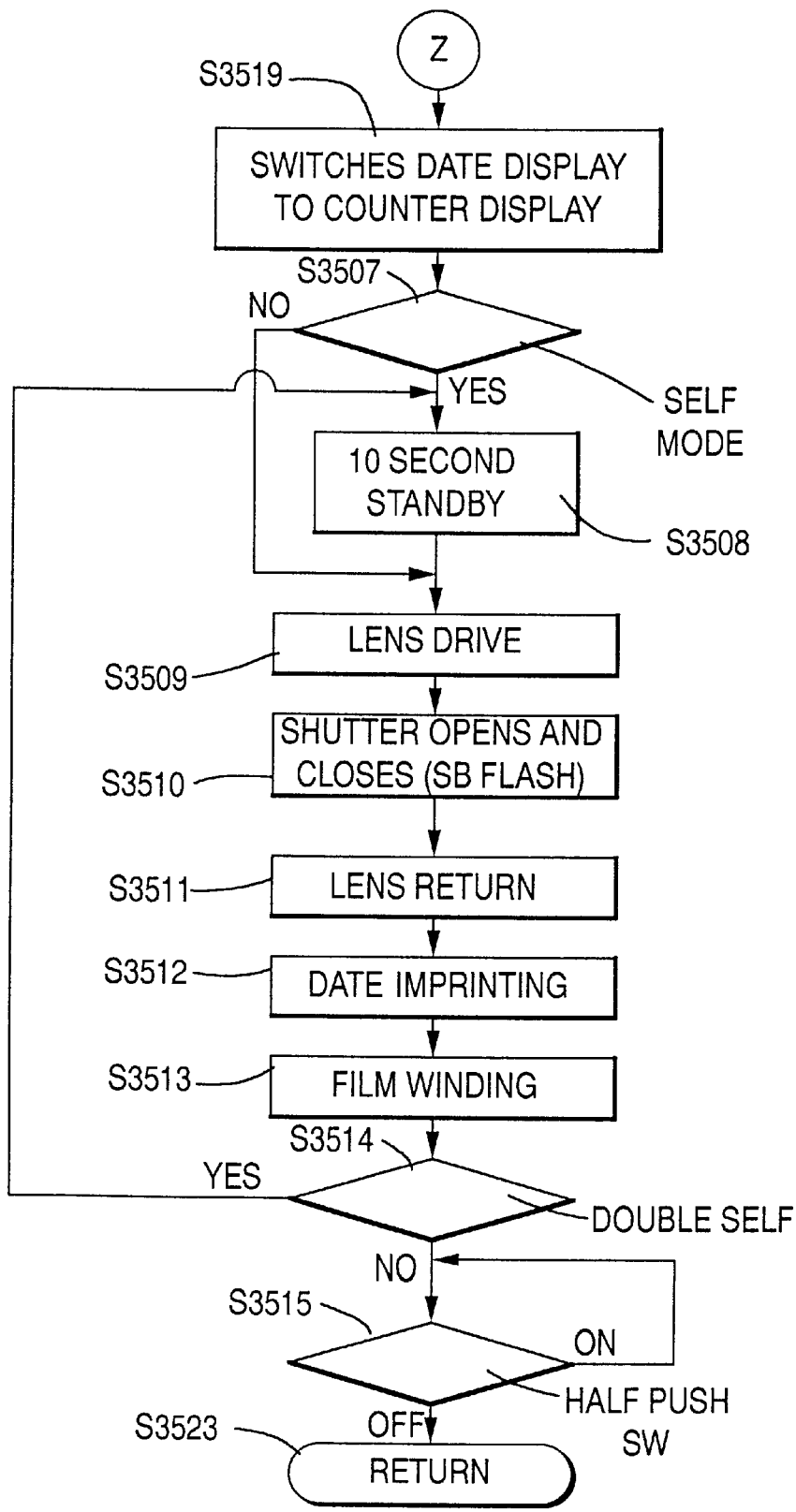
FIG. 37 is a continuation of the flow chart in FIG. 36.

FIGS. 36 and 37 indicate the details of the photographic processing in S3110 of FIG. 31. This processing begins at S3500 when half push switch 24 is turned ON, and if it is determined at S3501 that the lens barrel is in the retracted position (the camera is in the inactive mode), the flow immediately returns to the processing of FIG. 31. That is, in this situation, photograph taking is prohibited even if the release button is operated. If it is determined at S3501 that the lens barrel is not in the retracted position (the camera is in the active mode), the flow advances to S3518, and the film counter display CD is turned OFF (see FIG. 38) and the imprinting data is displayed on date display DD (see FIG. 39). Light measurement processing is executed at S3502. Distance measurement processing is executed at S3503. It is determined at S3504 whether or not it is necessary for the electronic flash device to flash. If the system is in forced flash mode, it is decided that a flash is necessary; and if the system is in flash prohibit mode, it is decided that a flash is unnecessary. When it is decided that a flash is necessary, it is determined at S3516 whether or not the charging of the main capacitor for the flash is complete, and if this is affirmed, the flow advances to S3505; and if charging is not complete, the flow advances to S3517. The system waits until half push switch 24 is turned OFF at S3517. If half push switch 24 is turned OFF, imprinting data DD is turned OFF and film counter display CD is lit at S3521 (see FIG. 38), and the flow returns to the processing of FIG. 31.

On the other hand, if it is determined at S3504 that a flash is unnecessary, the flow advances directly to S3505. If it is determined at S3505 that release switch 25 is OFF, it is then determined at S3506 whether half push switch 24 is ON or OFF; if half push switch 24 is ON, the flow returns to S3505; and if it is OFF, a display switch is executed at S3520 and the flow returns to the processing of FIG. 31. If it is determined at S3505 that release switch 25 is ON, the flow advances to S3519 of FIG. 37 and a display switch is executed. It is next determined at S3507 whether or not the system is in self mode. If it is determined that the system is not the self mode, the flow advances to S3509; and if it is determined that the system is in the self mode, the system enters standby at S3508 for a stipulated time period (here, for 10 seconds), and the flow advances to S3509.

At S3509, the photographic lens is driven to the focus position based on the distance to the subject that was detected, and the film is exposed by opening and closing the shutter at S3510. At this time, the electronic flash device is made to the flash at the necessary time. At S3511, the photographic lens is returned to a standard position; at S3512, the imprinting data (for example, year-month-day) is imprinted on the film surface through date imprinting circuit 10; and next at S3513, winding circuit 9 winds one frame of film. In addition, if imprinting is prohibited, imprinting is not executed. If it is determined at S3514 that the system is in double self mode, the flow returns to S3508, but in any other situation, the flow advances to S3515. The system waits at S3515 until half push switch 24 goes OFF, and afterwards, the flow returns to the processing of FIG. 31.

In the embodiment above, mode switch 23 is configured to be operational member 3101 (FIG. 30); and microcomputer 1 is configured to be first and second switching means 3102 (FIG. 30) and 3103 (FIG. 30), distinguishing means 3104 (FIG. 30), and control means 3105 (FIG. 30).

In addition, in the example above it is indicated that when the camera is in the inactive mode (second state), correction of the imprinting data is permitted when mode switch 23 is held ON continuously for two seconds or more, and once switch 23 goes OFF the operation will be canceled within two seconds. After mode switch 23 goes OFF, selection of the imprinting data is permitted if mode switch 23 is operated again within two seconds; however, for example, it would also be possible to correct or modify the imprinting data when switch 23 is operated two or more times within the stipulated time period. Or, it would also be possible to correct or modify the data when turning mode switch 23 ON a stipulated number of times irrespective of the time elapsed. Moreover, in the preferred embodiment, the correction of data itself was not executed by strobe switch 22, but rather by mode switch 23; however, it would also be possible to have mode switch 23 be jointly used for the data correction operation as well.

Furthermore, mode modification which is permitted when the camera is in the inactive mode is not limited to the imprinting data. For example, it would also be possible to select a mode in which the film is wound into the cartridge up to the end part during film rewinding, or a mode in which the rewinding is terminated by the status of the end part of the film being exposed. Moreover, a variety of modes other than the strobe mode could be considered for modes which are permitted during the active mode, and consequently, the operational member is not limited to the strobe switch 22. Additionally, the first state was taken to be the active mode, and the second state was taken to be the inactive mode, but it would also be possible to take the state in which a stipulated mode is set to be the first state, and to take the state in which the stipulated mode is canceled to be the second state. Or, it would also be possible to take a data input wait state to be the first state, and to take another data input wait state to be the second state.

According to the present invention, because the function of the operational member can be switched according to the state of the camera, a single operational member can have multiple functions, and the camera can be made more compact by reducing the number of operational members. Moreover, when it is discerned that the camera is in the second state, (for example, in the inactive mode), because switching modes or modifying data is permitted by operating the operational member in the stipulated situation, accidental switching of modes or modification of data can be kept to the very minimum even if the operational member is operated by touching some other object when the camera is being carried, etc. For this reason, the operational member can be made into a shape that operates easily, and operability can be improved.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera comprising:
   a display unit which switchably displays either the entire date or the entire frame number on the same portion of the display unit so that the date and the frame number are not simultaneously displayable on the display unit;
   a blank feeding mechanism for feeding blanks of film; and
   a control mechanism electrically detecting when blanks are being fed by the blank feeding mechanism and, when it is electrically detected that blanks are being fed, automatically displaying the frame number on said display unit.

2. A camera as in claim 1, wherein said control mechanism comprises:
   a mechanism controlling said display unit to display the date prior to feeding blanks by said blank feeding mechanism and, when it is electrically detected that blanks are being fed, to automatically display the frame number instead of the date.

3. A camera as in claim 1, further comprising a back cover which is openable and closeable, wherein said control mechanism comprises:
   a mechanism
      electrically detecting when the back cover is open and when the back cover is closed,
      controlling said display unit to display the date while it is electrically detected that said back cover is open, and
      controlling said display to automatically display the frame number when it is electrically detected that said back cover is closed.

4. A camera as in claim 2, further comprising a back cover which is openable and closeable, wherein said control mechanism comprises:
   a mechanism electrically detecting when the back cover is opened and when the back cover is closed, controlling said display unit to display the date while it is electrically detected that said back cover is open, and controlling said display unit to automatically display the frame number when it is electrically detected that said back cover is closed.

5. A camera comprising:

a display unit which switchably displays either the entire date or the entire frame number on the same portion of the display unit so that the date and the frame number are not simultaneously displayable on the display unit;

a blank feeding mechanism for feeding blanks of film; and a control mechanism electrically detecting when blank feeding is completed by the blank feeding mechanism and, when it is electrically detected that blank feeding is completed, automatically displaying the frame number on said display unit.

6. A camera as in claim 5, wherein the control mechanism detects when blank feeding has failed, and, when it is detected that blank feeding has failed, automatically displays an error display.

7. A camera as in claim 6, wherein the control mechanism detects when blank feeding has failed by setting a timer and determining that the timer has timed out before it could be detected that blank feeding is completed.

8. A camera as in claim 6, wherein the control mechanism detects when blank feeding has failed by determining that a set amount of time has elapsed during blank feeding.

9. A camera as in claim 6, wherein the error display is flashing.

10. A camera as in claim 7, wherein the error display is flashing.

11. A camera as in claim 8, wherein the error display is flashing.

* * * * *